United States Patent
de Waard et al.

(10) Patent No.: US 6,373,033 B1
(45) Date of Patent: Apr. 16, 2002

(54) MODEL-BASED PREDICTIVE CONTROL OF THERMAL PROCESSING

(75) Inventors: Henk de Waard, Tokyo (JP); James J. Donald, Phoenix; Zhimin Lu, Mesa, both of AZ (US); Robin M. de Keyser, Aalter (BE)

(73) Assignee: ASM America, Inc., Phoenix, AZ (US)

( * ) Notice: Subject to any disclaimer, the term of this patent is extended or adjusted under 35 U.S.C. 154(b) by 0 days.

(21) Appl. No.: 09/605,381

(22) Filed: Jun. 27, 2000

Related U.S. Application Data

(63) Continuation of application No. 08/791,134, filed on Jan. 30, 1997, now Pat. No. 6,207,936, which is a continuation-in-part of application No. 08/597,438, filed on Jan. 31, 1996, now abandoned.

(51) Int. Cl.⁷ .................................................. H05B 1/02
(52) U.S. Cl. ........................ 219/497; 219/483; 219/486; 392/416; 364/150
(58) Field of Search .......................... 219/497, 483–486, 219/499, 501, 506; 392/416; 364/150

(56) References Cited

U.S. PATENT DOCUMENTS

| | | | |
|---|---|---|---|
| 3,836,751 | A | 9/1974 | Anderson |
| 4,255,133 | A | 3/1981 | Tanifuji et al. |
| 4,349,869 | A | 9/1982 | Prett et al. |
| 4,358,822 | A | 11/1982 | Sanchez |
| 4,616,308 | A | 10/1986 | Morshedi et al. |
| 4,634,946 | A | 1/1987 | Moulds, III et al. |
| 4,639,853 | A | 1/1987 | Rake et al. |
| 4,680,451 | A | 7/1987 | Gat et al. |
| 4,688,180 | A | 8/1987 | Motomiya |
| 4,694,390 | A | 9/1987 | Lee |
| 4,714,988 | A | 12/1987 | Hiroi et al. |
| 4,720,807 | A | 1/1988 | Ferran et al. |
| 4,736,316 | A | 4/1988 | Wallman |
| 4,761,538 | A | 8/1988 | Chiba et al. |
| 4,769,799 | A | 9/1988 | Tung |
| 4,904,912 | A | 2/1990 | Yamamoto |
| 4,959,767 | A | 9/1990 | Buchner et al. |
| 4,975,561 | A | 12/1990 | Robinson et al. |
| 5,032,977 | A | 7/1991 | Beller et al. |
| 5,099,442 | A | 3/1992 | Furuta et al. |
| 5,291,514 | A | 3/1994 | Heitmann et al. |
| 5,301,101 | A | 4/1994 | MacArthur et al. |
| 5,488,561 | A | 1/1996 | Berkowitz et al. |
| 5,660,472 | A | 8/1997 | Peuse et al. |
| 5,755,511 | A | 5/1998 | Peuse et al. |
| 5,790,750 | A | 8/1998 | Anderson |
| 5,793,022 | A | 8/1998 | Klinck et al. |
| 6,207,936 | B1 | 3/2001 | de Waard et al. |

FOREIGN PATENT DOCUMENTS

| | | |
|---|---|---|
| CA | 2054423 | 2/1993 |
| EP | 0037579 | 10/1981 |
| EP | 0 829 784 A1 | 5/1998 |

OTHER PUBLICATIONS

Terence Breedijk, et al., "Nonlinear Model Predictive Temperature Control Of A Batch Polymerization Reactor," ICHEME—Advances in Process Control 4, XP–002081211.

(List continued on next page.)

Primary Examiner—Mark Paschall
(74) Attorney, Agent, or Firm—Knobbe, Martens, Olson & Bear LLP

(57) ABSTRACT

A nonlinear model-based predictive temperature control system is described for use in thermal process reactors. A multivariable temperature response is predicted using a nonlinear parameterized model of a thermal process reactor. The nonlinear parameterized model is implemented using a neural network. Predictions are made in an auto-regressive moving average fashion with a receding prediction horizon. Model predictions are incorporated into a control law for estimating the optimum future control strategy. The high-speed, predictive nature of the controller renders it advantageous in multivariable rapid thermal processing reactors where fast response and high temperature uniformity are needed.

35 Claims, 28 Drawing Sheets

OTHER PUBLICATIONS

J. Bordeneuve, et al., "Long–range predictive control of a rapid thermal processor," XP–60281214, Int. J. Systems SCI., 1991, vol. 22, No. 1232377–2391.

William L. Brogan, et al., "Control Systems," Systems Chapter X, Section 93, Electrical Engineering Handbook, Richard C. Dorf, Editor–in–Chief, 1993, pp. 2099–2153.

David W. Clarke, "Application of Generalized Predictive Control to Industrial Processes," IEEE, Control Systems Rajatine, vol. 8, pp. 49–55, 1988.

D.W. Clarke, et al., "Generalized Predictive Control—Part I. The Basic Algorithm," Automatica vol. 23, No. 2, pp. 137–148, 1987.

D.W. Clarke, et al., "Generalized Predictive Control—Part II. Extensions and Interpretations," Automatica, vol. 23, No. 2, pp. 149–160, 1987.

D.J. Cloud, et al., "Characteristic decomposition and the multivariable generalisation of predictive self–tuning control."

Mohammed Douas, et al., "Adaptive Predictive Control Of The First Spanish Installation For The Official Approval Of Nuclear Equipment," Presented at the Cambridge Workshop on "Industrial Applications of Model Based Predictive Control," Jul. 6–7, 1992.

J.C. Engrand, "Applications Of Multivariable Control In A Refinery And Implementation On A Dedicated Minicomputer," C.F.R. Raffinerie de Normandie, Harfleur, France, FA9–D.

Bruce P. Gibbs, et al., "Application Of Nonlinear Model-Based Predictive Control To Fossil Power Plants," T3–5–4:20; Proceedings of the 30$^{th}$ IEEE Conference On Decision And Control, Dec. 11–13, 1991, Metropole Hotel, Brighton, England; vol. 2 of 3; Ch3076–7/91/000–1850; 1991 IEEE.

A. Karaduman, et al., "Nonlinear Model Predictive Temperature Control Of A Batch Polymerization Reactor", ICHEME—Advances in Process Control 4:XP–002081211.

V.R. Karla, et al., "Neural–network–based Model Predictive Control: A Case Study," XP–002081213, 0–8186–7174–2/95M, 1995, IEEE.

Robin De Keyser, et al., "Opportunities for Model Based Predictive Control in Semiconductor Processing Industry," presented at seminar in Brussels, Belgium, Sep. 24–25, 1996.

F. Lebourgeois, "IDCOM Applications And Experiences On A PVC Production Plant," Rhone–Poulenc Industries, St–Fons, France, FA9–C.

J. Richalet, et al., "Model Predictive Heuristic Control: Applications to Industrial Processes," Automatica, vol. 14, pp. 413–428, 1978.

F. Roozeboom, et al., "Rapid thermal processing systems: A review with emphasis on temperature control," J.Vac.Sci. Technol. B 8 (6), Nov./Dec., 1990, pp. 1249–1259.

J.A. Rossiter, et al., "Application of generalised predictive control to a boiler–turbine unit for electricity generation."

S.L. Shah, et al., "Multivariable adaptive control without a prior knowledge of the delay matrix," Systems & Control Letters 9 (1987), pp. 295–306.

Kwaku O. Temeng, et al., "Model predictive control of an industrial packed bed reactor using neural networks," Butterworth Heinemann, J. Proc., Cont. vol. 5, No. 1, 1995 Elsevier Science Ltd.

Deng Xiaosong, et al., "Real–Time Identification And Control Of A Continuous Stirred Tank Reactor With Neural Network," XP–002081212, 0–7803–2081–6/95, 1995, IEEE.

MODEL-BASED PREDICTIVE CONTROL OF THERMAL PROCESSING

RELATED APPLICATION

This application is a continuation of Ser. No. 08/791,134, filed Jan. 30, 1997, now U.S. Pat. No. 6,207,936, continuation-in-part of U.S. patent application Ser. No. 08/597,438, filed on Jan. 31, 1996 now abandoned, assigned to the same assignee of this application.

BACKGROUND OF THE INVENTION

1. Field of the Invention

The invention relates to automatic feedback control of thermal processing. In particular, the invention pertains to model-based predictive temperature control of thermal process reactors such as used in semiconductor processing.

2. Description of the Related Art

Until recently, most of the high temperature processing necessary for integrated circuit fabrication was performed in hot-wall, resistance-heated batch reactors. Controlling the wafer temperature uniformity (within-wafer, point-to-point) in these reactors was generally not considered an issue, because the reactors were substantially isothermal. The down-boat (wafer-to-wafer) temperature uniformity could be controlled effectively by dividing the cylindrical heating coil into several zones, each with its own temperature sensor controller and power supply. The outer zones were typically adjusted to compensate for heat losses at the furnace ends. Independent, single-loop, off-the-shelf PID controllers suffice for these purposes. The trend to larger wafer diameters, the demanding uniformity requirements for ULSI applications, and the demands for reduced thermal budget all led to an increased use of single-wafer process reactors. For commercially feasible throughput, it is highly desirable to minimize the process cycle time by heating substantially only the wafer and its immediate environment. In many cases, single-wafer reactors are of the cold-wall or warm-wall type, in which quartz or stainless steel process chambers are water or air cooled. Under such circumstances, the system is no longer isothermal and temperature uniformity control becomes an issue of considerable concern and technical difficulty. A recent technical review of the field is provided in "Rapid Thermal Processing Systems: A Review with Emphasis on Temperature Control," F. Roozeboom, N. Parekh, *J. Voc. Sci. Technol.* B 8(6), 1249–1259, 1990.

Specific physical process characteristics serve to exemplify the need for precise temperature uniformity. Homoepitaxial deposition of silicon should be performed in a manner which minimizes crystalline growth defects, such as lattice slip. Such defects are induced by thermal gradients in the wafer during high temperature processing, becoming more sensitive to gradients as temperature increases. For example, while gradients of about 100° C. across an 8-inch wafer may be tolerable at a process temperature of 900° C., respective gradients of only 2–3° C. are allowable at process temperatures of 1100° C. There is some experimental evidence to indicate that gradients of approximately 10° C. may be tolerable for a few seconds. The deposition of polycrystalline silicon (polysilicon) typically takes place at 600–700° C. where as a rule of thumb a 2% uniformity degradation is incurred for every degree of temperature gradient. Moreover, in heterodeposition processes such as polysilicon deposition, multiple reflections and optical interference within the deposited overlayers can give rise to emissive or absorptive changes with overlayer thickness, exacerbating the problem of maintaining temperature uniformity (J. C. Liao, T. I. Kamins, "Power Absorption During Polysilicon Deposition in a Lamp-Heated CVD Reactor, J. Appld. Phys., 67(8), 3848–3852 (1990)). Furthermore, patterned layers can also lead to variations in light absorption across the wafer, creating local temperature gradients. (P. Vandenabeele, K. Maex, "Temperature Non-Uniformities During Rapid Thermal Processing of Patterned Wafers," *Rapid Thermal Processing* SPIE, Vol. 1189, pp. 84–103, 1989).

The aforementioned factors complicating the control system design are not only manifest for rapid thermal chemical vapor deposition (RTCVD) systems, but apply to thermal processing (TP) systems in general, where the need for precise process control is balanced by the demand for minimal process cycle times. The generally short process cycle times and fast dynamics of the single-wafer systems render dynamic control of temperature uniformity a necessity of considerable technical difficulty. The radiant heating systems used for rapid wafer heating comprise either arc lamps or banks of linear tungsten-halogen lamps divided into several independently-controllable heating zones. The wafer itself, in principle, represents a complex thermal system whose interaction with the radiant energy is inherently nonlinear. Furthermore, since the requirements for power distribution over the wafer are different for dynamic compared to steady-state uniformity, it does not suffice to deduce the required power settings from a wafer temperature measurement at a single point. In general, multiple sensors are required to measure and maintain a uniform temperature distribution over the wafer. These considerations render temperature control an essentially multi-input, multi-output (MIMO) or multivariable problem. Due to the large interaction between zones inherently present in radially heated systems, the conventional control techniques, for example, using single-loop, coupled or master-slave type PID control, cannot be expected to provide thermal process reactor systems with the required control specifications for all operating conditions. Conventional PID control techniques are susceptible to lag, overshoot and instability at the desirable process rates, and therefore become limiting factors in single-wafer process reactors. Thus, there is a clear need in electronic materials processing for systems which can maintain precise, dynamic multivariant control while providing commercially viable wafer throughput.

The foregoing discussion has clearly outlined the need for effective uniformity control in thermal process reactors using a multivariable approach. This view is endorsed by many authors. See, for instance, several contributions in the *Rapid Thermal and Integrated Processing Symposium*, ed. J. C. Gelpey, et al., *Mater. Res. Soc. Symp. Proc.,* Vol. 224, 1991. In particular, articles by Moslehi et al. (pp. 143–156), Apte, et al. (pp. 209–214), and Norman et al. (pp. 177–183), discuss various aspects of multivariable temperature control. Several attempts to develop models for RTP and RTCVD systems are reported in the literature. Two examples, Norman and Gyurcsik, et al., developed different models, both using a first-principles approach, and applied the models to uniformity optimization (S. A. Norman, "Optimization of Wafer Temperature Uniformity in Rapid Thermal Processing Systems,"0 ISL Tech. Rep. No. 91-SAN-1, Subm. to IEEE Trous. on Electron Devices, 1991; R. S. Gyurcsik, T. J. Riley, R. Y. Sorrel, "A Model for Rapid Thermal Processing: Achieving Uniformity Through Lamp Control," IEEE Trans. on Semicon. Manf., Vol. 4(1), 1991). The model of Norman (1991) consists of two components. The first component models the (two-dimensional) heat balance of the wafer and is used to compute the steady-state wafer temperature profile for a given heat flux from the lamps. The second component models the heat flux from the lamps as a function of the individual lamp powers. A least-squares method is used to fit a quadratic relationship between the desired temperature at discrete radial positions on the wafer and the flux density due to the lamps. Next, the lamp model is used to determine optimal relative power settings for the lamps that approximate the required flux. This method only applies to the uniformity control in steady-state, i.e., constant input. However, Norman, et al. (1991), consider not only the steady-state optimization problem, but also the problem of designing an optimal trajectory. For this purpose the dynamic model is a finite-difference approximation to the one-dimensional heat equation, including the effects of conduction in the wafer, convective heat loss from the wafer, and radiative transfer. A minimax solution is chosen for the steady-state uniformity optimization and trajectory following.

Dynamic system modeling is an essential ingredient of predictive control laws, which provide the fundamental structure for a unique class of contemporary control algorithms. In essence, system or plant control strategies are based on predicted future plant behavior predicated on a suitably accurate dynamic plant model. The future control strategies are not static and do not extend arbitrarily to future time slots; but rather are periodically updated in accordance with the plant model in a so-called receding horizon fashion. For a number of years, predictive control has been the subject of extensive research and development. Indeed, predictive control is the central theme behind the benchmark works of Cutler and Ramaker in their Dynamic Matrix Control (DMC) algorithm (C. Cutler, B. L. Ramaker, "Dynamic Matrix Control—A Computer Control Algorithm," *Joint Automatic Controls Conference Proceedings,* San Francisco, 1980) and Richalet, et al., in their Model Algorithmic Control (MAC) algorithm (J. A. Richalet, A. Rault, J. D. Testud, J. Papon, "Model Predictive Heuristic Control: Application to Industrial Processes," *Automatica,* Vol. 14, No. 413, 1978). Further predictive and adaptive characteristics are incorporated by R. M. C. de Keyser, et al., "Self-Tuning Predictive Control," *Journal A,* Vol. 22, No. 4, pp. 167–174, 1981; and more recently by Clarke, et al., in their Generalized Predictive Control (GPC) algorithm (D. W. Clarke, C. Mohtadi, P. S. Tuffs, "Generalized Predictive Control. Part I: The Basic Algorithm," *Automatica,* Vol. 23, No. 2, pp. 137–148, 1987). Much of the contemporary control work in the literature is to some extent based on these approaches.

In DMC and other similar approaches, plant models are identified and cast in the form of deterministic impulse-response or step-response models. While these model forms are well-understood, they are often computationally cumbersome and present significant compromises between accuracy and response for long-range model predictions. Further, DMC appears to be incapable of handling non-minimum phase and open-loop unstable plants. A significant redeeming feature of DMC is that of the receding horizon, after which control increments are assumed to be zero. This advantageous assumption is incorporated in GPC, which in various derivations also utilizes extensions of Auto-Regressive Moving Average (ARMA) plant models such as CARMA or CARIMA (Controlled Auto-Regressive Moving Average, CAR-Integrated-MA). The ARMA plant models are generally represented by expressions involving polynomials A, B and C of the time-shift operator $q^{-1}$. The shift operator $q^{-1}$ acts on a function of a discrete time variable f(t), such that $q^{-1}f(t)=f(t-1)$ and in general $q^{-u}f(t)=f(t-u)$.

The model polynomials A, B and C act on process inputs u(t), process outputs y(t) and process disturbances e(t) such that:

$$A(q^{-1})y(t)=B(q^{-1})u(t)+C(q^{-1})e(t)$$

Such models represent both the plant dynamics via the polynomials A,B and the disturbance via A,C. A particular advantage is that the number of parameters in the model is minimal so that they can be estimated with high efficiency. As outlined by Clarke, et al., the long-range plant predictions are best accomplished by recursion of an associated Diophantine equation involving the model parameters. A similar ARMA model and recursive model prediction is also found in U.S. Pat. No. 5,301,101 by MacArthur, et al., which discloses an adaptive receding horizon-based controller incorporating means for operating cost minimization.

Nevertheless, in spite of the recent effort to develop new, useful multivariant control techniques, until now there has been little success in applying them to the demanding conditions imposed by commercial thermal process reactors. The only apparent successes to date has involved the use of physical models rather than the black box models employed herein (see e.g. Cole Porter et. al., "Improving Furnaces with Model-Based Temperature Control", *Solid State Technology* November 1996, page 119).

SUMMARY OF THE INVENTION

It is an object of the present invention to provide a method and apparatus for a more effective temperature control system in multivariant thermal processes.

In accordance with one aspect of the present invention, a temperature controlled thermal process reactor comprises a chamber within which a thermal process is executed, a source of thermal energy, a thermal sensor, and a model-based predictive temperature controller. One preferred embodiment of the temperature controlled thermal process (TP) reactor comprises a multivariable temperature controlling arrangement. The temperature controller preferably comprises a multivariable thermal process model that relates multivariable process input thermal energy to multivariable process output temperature. The temperature controller also preferably comprises a prediction calculator that uses the process model to calculate a predicted temperature output over a predetermined future time period or prediction horizon. The preferred temperature controller additionally comprises a control calculator that uses the predicted temperature output to calculate an optimum control strategy by which to control the source of thermal energy. The control calculator preferably calculates an optimum future control strategy by comparing the predicted process output variables to a set of desired future process output variables.

In accordance with another aspect of the present invention, a temperature control system for controlling a thermal process comprises a controllable source of thermal energy, a temperature sensor, and a model-based predictive temperature controller. The model-based predictive temperature controller comprises a thermal process model that relates process input thermal energy to process output temperature and a prediction calculator that uses the thermal process model to calculate a predicted nominal temperature output over a predetermined future time period. The temperature controller further comprises a control calculator that uses the predicted nominal temperature output to calculate an optimum strategy by which to control the source of thermal energy. Preferably, the control calculator compares the predicted temperature output to the desired temperature output to derive the optimum control strategy. In a preferred temperature control system, the prediction calculator periodically updates the predictions in accordance with an auto-regressive moving average calculator. In a preferred arrangement, predictions are executed over a predetermined future time period, which is updated in accordance with the auto-regressive moving average.

In still another aspect of the present invention, a method of controlling a thermal process comprises the steps of measuring a process output temperature and using this information in predicting a future process output temperature. The method further comprises calculating an optimum process input control strategy and controlling a process input thermal energy using the calculated optimum process input control strategy. In a preferred embodiment of the method, predicting a future process output temperature comprises identifying a thermal process model relating process input thermal energy to process output temperature. The preferred method of prediction further comprises recursive application of the thermal process model over a predetermined future time period, or prediction horizon. The predictions are furthermore periodically updated in accordance with an auto-regressive moving average calculator. Another preferred method of rapid thermal process control comprises calculating an optimum process input control strategy by comparing the predicted future process output temperature to a desired future process output temperature.

In accordance with another aspect of the present invention, a temperature control system for controlling a thermal process comprises a controllable source of thermal energy, a temperature sensor, and a nonlinear, model-based predictive temperature controller. The model-based predictive temperature controller comprises a nonlinear thermal process model that relates process input thermal energy to process output temperature and a prediction calculator that uses the thermal process model to calculate a predicted nominal temperature output over a predetermined future time period. The nonlinear model further comprises a neural network. In a particularly preferred embodiment, the neural network cmprises hidden neurons that are of the sigmoid type.

In accordance with yet another aspect of the present invention, a temperature control system for controlling a thermal process comprises a controllable source of thermal energy, a temperature sensor, a model-based predictive temperature controller, and a softsensor model that relates susceptor temperatures to wafer temperatures. The softsensor model provides an estimate of the unmeasurable wafer surface temperatures. In a preferred embodiment, the softsensor model is an FIR model. The model coefficients for the softsensor FIR filter are obtained through the use of an instrumented wafer.

In accordance with yet another aspect of the present invention, a temperature control system for controlling a thermal process comprises a controllable source of thermal energy, a temperature sensor, a model-based predictive temperature controller, a softsensor model that relates susceptor temperatures to wafer temperatures and a setpoint generator that uses the output of the softsensor model, and the recipe to adjust the setpoints so that the wafer surface temperatures will be closer to the values specified in the recipe.

The model-based predictive temperature controller comprises a nonlinear thermal process model that relates process input thermal energy to process output temperature and a prediction calculator that uses the thermal process model to calculate a predicted nominal temperature output over a predetermined future time period. The nonlinear model further comprises a neural network. In a particularly preferred embodiment, the neural network cmprises hidden neurons that are of the sigmoid type.

DETAILED DESCRIPTION OF THE PREFERRED EMBODIMENTS

Overview of RTP Process Control

The model-based predictive control system of the present invention is herein illustrated in the context of rapid thermal processing (RTP) systems, and in particular a rapid thermal chemical vapor deposition (RTCVD) system, which itself makes advantageous use of the superior degree of temperature uniformity provided by the present invention. In the description and drawings, the apparatus is shown in generally schematic fashion, and only those portions necessary to illustrate the inventive concepts disclosed herein have been included. In particular, it is to be understood that the apparatus is intended to be enclosed within and supported by a surrounding enclosure (not shown) in and on which necessary gaseous reactant flow controls, process controls, instrumentation, and other attendant mechanisms are intended to be housed and mounted.

Figure 1:
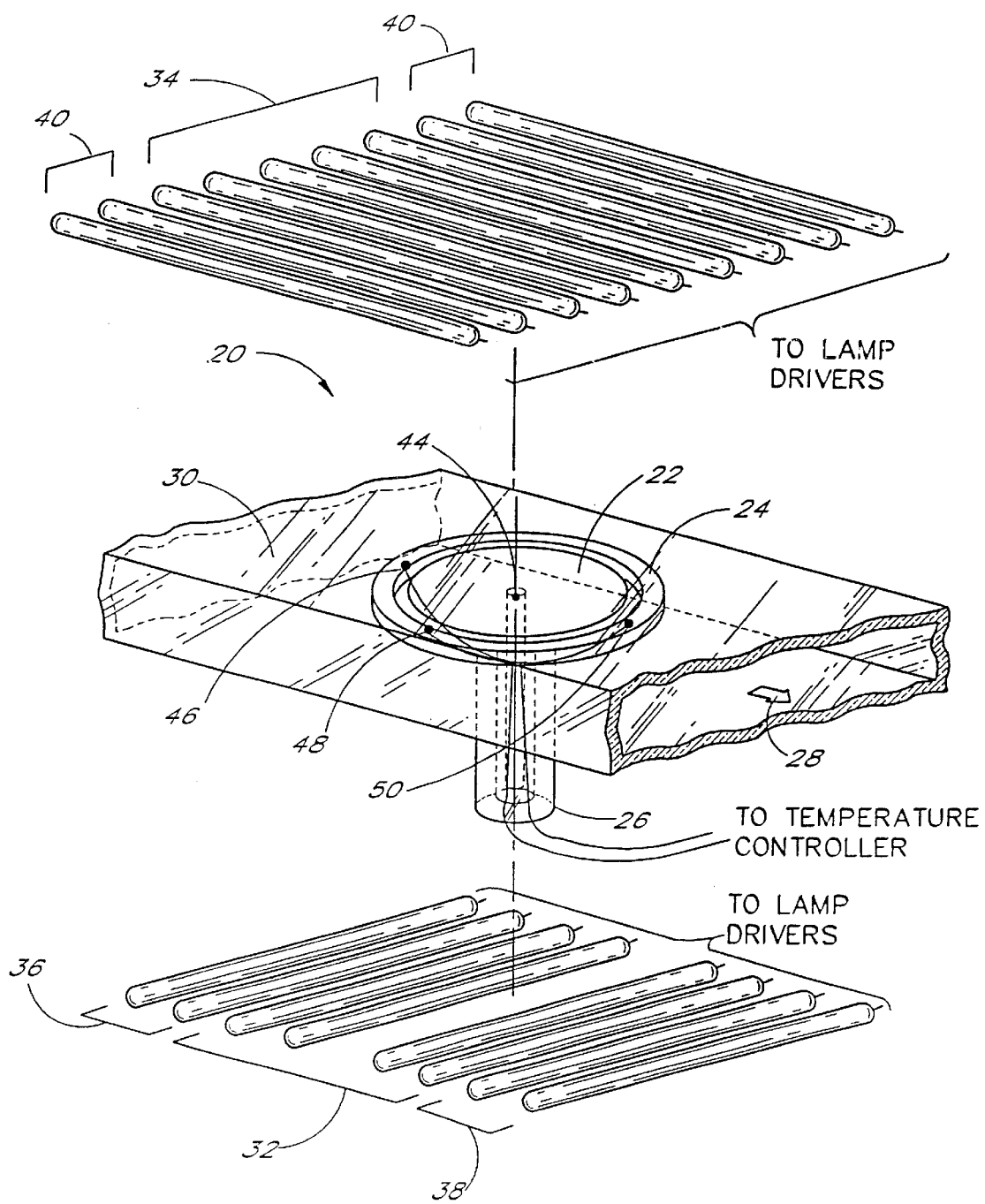
FIG. 1 is a schematic perspective view of a single-wafer rapid thermal chemical vapor deposition reactor.

The RTCVD system 30 illustrated in FIG. 1 comprises a reaction chamber 30 of the horizontal flow type formed of a material transparent to radiant heat energy, such as fused quartz. The reaction chamber 30 may comprises a tubular shaft having a cross-section defining a reactant gas flow passage 28. The substrate or wafer 22 may be supported in the center of reaction chamber 30 by a circular, slab-like susceptor 24 held in place by a rotatable driveshaft assembly 26 extending out of the reaction chamber 30. The susceptor 24 is generally fabricated from a material which is opaque to the radiant heat energy supplied from the radiant heat source, and is preferably thermally conductive. For example, the susceptor 24 may be fabricated from a material such as graphite. A plurality of thermocouples 44, 46, 48, 50 are imbedded in the susceptor 24 for determining the local substrate temperature at predetermined positions on the substrate 22, shown here at respective wafer locations center 44, front 46, side 48, and rear 50. The thermocouple signals are supplied to the temperature controller discussed below.

The radiant heating systems used for rapid wafer heating in general comprise either arc lamps or banks of elongated tungsten-halogen lamps divided into several independently-controllable heating zones. The radiant heat source shown in FIG. 1 comprises two banks of high-power elongated tungsten-halogen lamps located above and below the reaction chamber 30. The upper bank of lamps is oriented parallel to the process gas flow 28 and the plurality of upper bank lamps are divided into portions comprising a center zone 34 and two side zones 40, corresponding to their relative proximity with respect to the wafer 22 and gas flow 28. Analogously, the lower bank of lamps is oriented orthogonal to the process gas flow 28, and the plurality of lower bank lamps are divided into portions comprising a center zone 32, a front zone 38 and a rear zone 36, corresponding to their relative proximity with respect to the wafer 22 and gas flow 28. The electrical power supplied to the lamps by lamp drivers (discussed below) is typically controlled by a plurality of SCR power packs (discussed below) configured to control the duty cycle or phase angle over which the electrical power is supplied to combinations of lamps affecting specific heating zones. The SCR firing phase angle is preferably adjusted to render a linearized power input to the lamps as done, for example, in so-called $V^2$ or $V*I$ modes of operation.

In operation, the substrate 22 is placed into the reaction chamber 30 and onto the susceptor 24 at the beginning of a process cycle. A reactant gas flows through the reaction chamber 30 in the direction indicated by the gas flow arrow 28 to deposit materials on the substrate 22. During a process cycle, a desired sequence of thermal process steps proceeds in concert with the reactive gas processing. The thermal processing sequence is performed by adjusting the power level of the lamps to achieve a desired wafer temperature at a specific time in the process cycle. The radiant heat energy supplied to various heating zones is controlled on the basis of temperature measurements within the respective heating zones, which information is supplied to the temperature control system discussed below. The substrate 22 is removed from the reaction chamber 30 upon completion of the process cycle.

As discussed earlier, the cold-wall and warm-wall reaction chambers such as that shown in FIG. 1 are inherently non-isothermal. Thus, achieving a uniform temperature distribution is complicated by non-uniform heat flow, wafer geometry and attendant optical properties. The position, orientation and power level of lamps shown in FIG. 1 are in principle configured to provide a uniform temperature distribution over the wafer 22 by supplying an appropriate spatial and temporal distribution of heat energy. The plurality of lamps comprising different zones, for example, the side zones 40, as well as those of front and back zones 38 and 36, are supplied with varying electrical power levels comprising the multivariable control inputs. These control inputs produce varying radiant power levels in different heating zones to affect the temperature distribution over the substrate 22 during wafer processing. The various lamp operating powers are adjusted by a temperature controller operating on the basis of real-time temperature feedback provided by thermocouples 44, 46, 48 and 50 comprising the multivariable control output. The action of the temperature control system preferably compensates the aforementioned non-uniform thermal characteristics of the wafer 22 and the reactor 20 to affect a uniform wafer temperature distribution.

Figure 2:
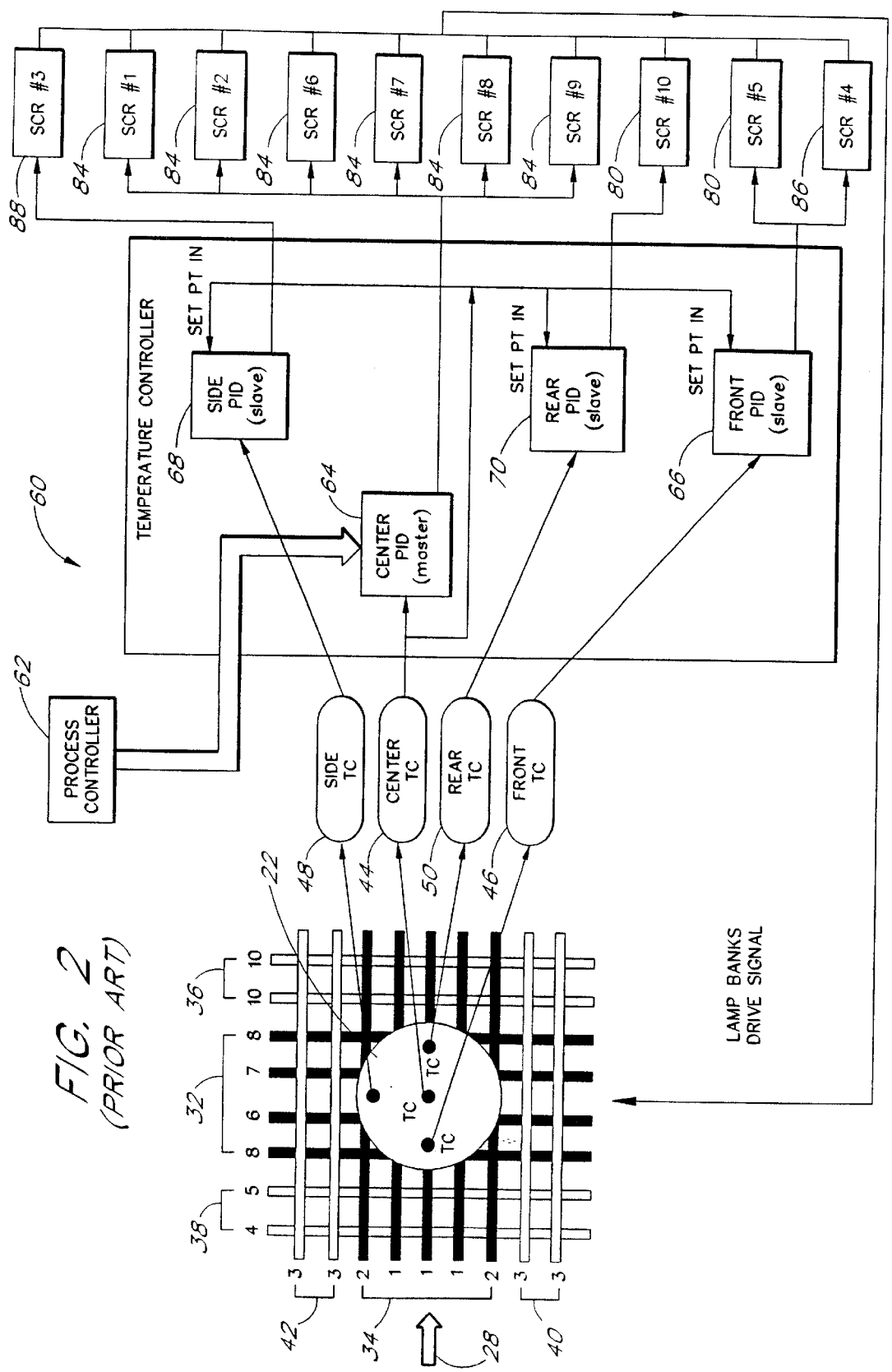
FIG. 2 is a schematic diagram of a prior art temperature control system used in single-wafer reactors.

As shown in FIG. 2, an exemplary prior art multivariable temperature control system for an RTCVD reactor may comprise a plurality of Proportional-Integral-Differential (PID) controllers well-known in the art, and configured in a so-called master-slave arrangement. A top view of the wafer 22 shows the relative positions of the lamp heating zones 32, 34, 36, 38, 40 and 42 and the sensing thermocouples 44, 46, 48 and 50 with respect to the wafer 22 and the gas flow vector 28, as previously described. The temperature sensors 44, 46, 48 and 50 are connected to supply respective PID controllers 64, 66, 68, and 70 with signals indicative of the local wafer 22 temperature. The PID controllers 64, 66, 68 and 70 are also connected to sources of reference signals, which supply each PID controller with a respective temperature reference signal or set-point. In the so-called master-slave arrangement shown here, a process controller 62 is connected to supply the center PID controller 64 with the global or master set-point information, while the PID controllers 66, 68 and 70 are connected and referenced to the center temperature sensor 44 of the wafer 22. The output signals of the PID controllers 64, 66, 68 and 70 are in turn connected to respective sets of Silicon Controlled Rectifier (SCR) power packs 84, 86, 88 and 80, which control the lamp electrical power for respective heating zones 32/34, 36, 40/42 and 38.

Figure 3:
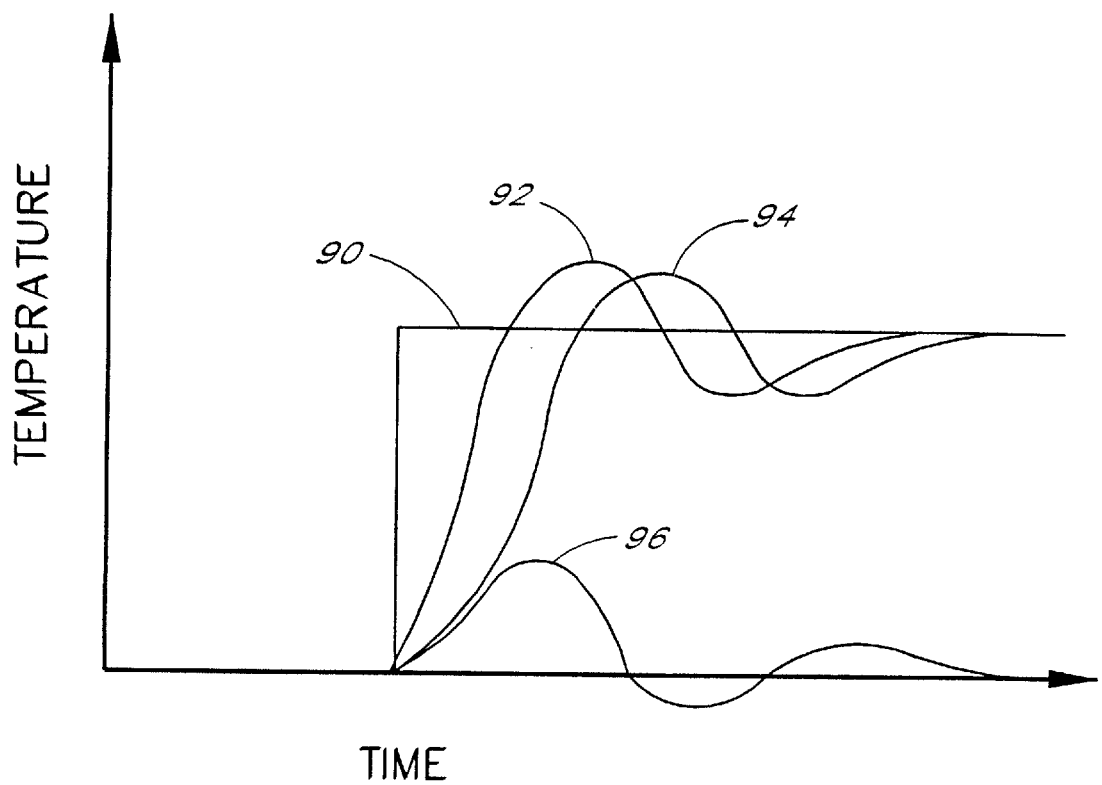
FIG. 3 shows representative data characterizing the tracking and response of a prior art multivariable temperature control system.

In general, the PID controllers shown in FIG. 2 operate to minimize the error signals which are the differences between the respective reference temperatures and the respective measured temperatures by a negative feedback adjustment of the respective lamp powers. The feedback signal produced by a particular PID controller is determined by the response characteristics of the controller and reactor, and, as such, generally represent a considerable challenge to optimize. Several measures may be employed to characterize the dynamic system response, such as speed of response, accuracy, relative stability and sensitivity. For example, such a controller will provide a feedback signal consisting of three terms, a first term proportional to the error signal, a second term proportional to the time-integral of the error signal and a third term proportional to the time-derivative of the error signal. All three proportionality constants require adjustment. Under static or steady state conditions, it would be expected that the center PID controller 64 maintain the center wafer temperature at a predetermined reference value, and the slave PID controllers 66, 68, 70 maintain the peripheral zones at the center zone temperature. As shown in FIG. 3, the curve 90 depicts a step in the set-point wafer temperature, and the curve 92 represents the time response of the center zone 44 to that step, indicating a stable steady-state center zone temperature after a sufficiently long settling time period. A peripheral zone time response is represented by the curve 94, which also displays stable steady-state behavior at long times. However, even an optimally adjusted PID controller system is limited by inherent time delays, characteristic response times and overshoot, as indicated by the transient time response of the curve 92. Moreover, since the heating zones are strongly coupled, a change in one zone will influence the transient control of other zones, at least temporarily inducing temperature gradients as shown by the curve 96. Coupled PID systems, such as shown in FIG. 2, exacerbate the response challenge and are commonly detuned to avoid instability at a sacrifice to wafer throughput.

Overview of Model-based Predictive Controller

Figure 4:
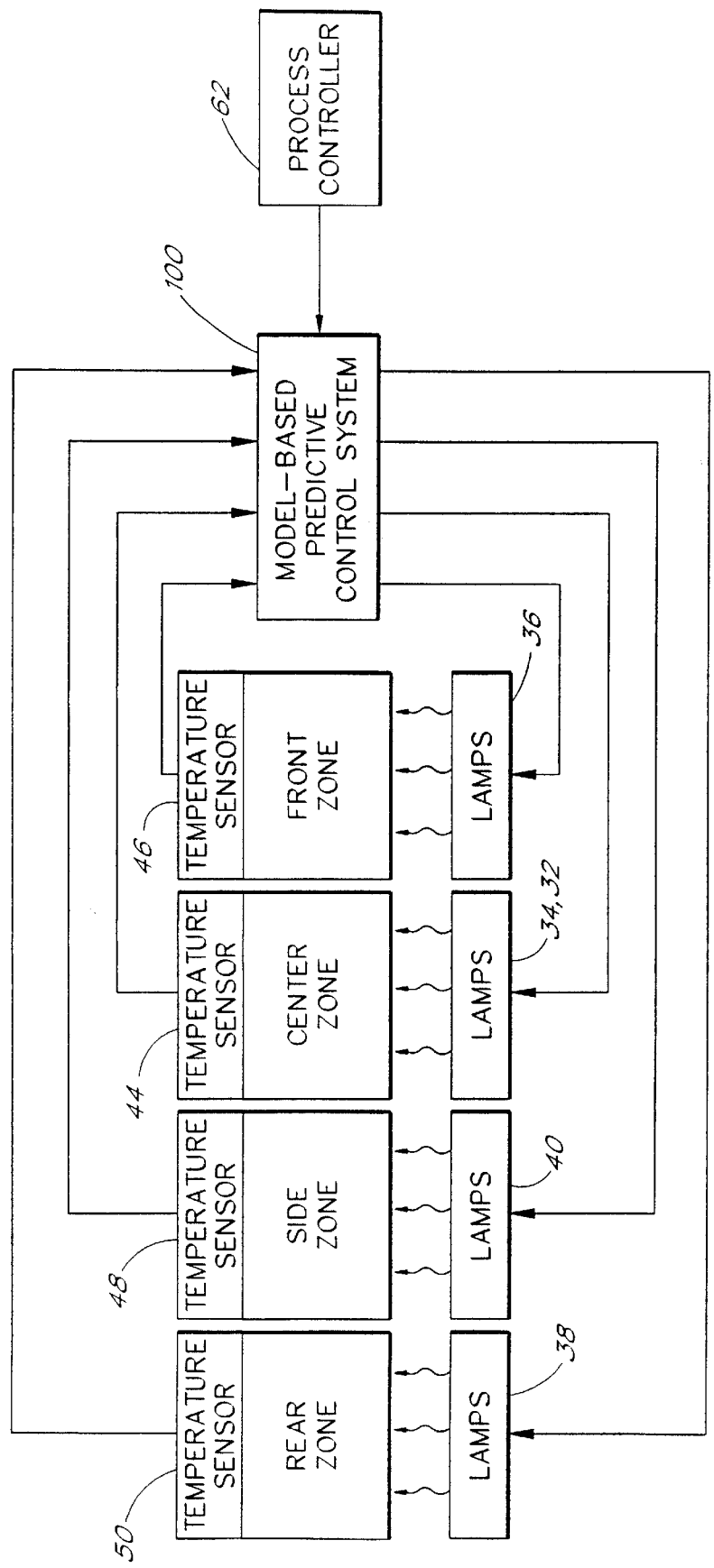
FIG. 4 is a basic block diagram of a model-based multivariable temperature control system.

As shown in the basic block diagram of FIG. 4, a thermal process reactor incorporating a preferred embodiment of the model-based predictive control system of the present invention utilizes heat zone temperature sensors 44, 46, 48, 50 as the multivariable control inputs. The temperature sensors provide a model-based predictive controller 100 with information about the state of the system, namely the zone temperatures of the substrate 22. Based on this information the model-based predictive controller 100 computes an optimum sequence of future control strategy comprising electrical power inputs to the separate heat zone lamps 32, 34, 36, 38, and 40. The process controller 62 is connected to the model based predictive control system 100 and provides it with the desired process temperature sequence.

The multivariable control techniques disclosed herein exhibit improved control performance in comparison to conventional PID-type controllers because they contain more information about the system dynamics. This information is utilized in an Auto-Regressive Moving Average (ARMA) model, hence the name model-based predictive control. Feedforward or predictive compensation up to a predetermined receding prediction horizon provides improved control performance since it allows the controller to react before a measurable disturbance has effected the system. The sequence of control predictions is established in a recursive fashion vis a vis the ARMA model, thus increasing controller response time and flexibility.

Figure 5:
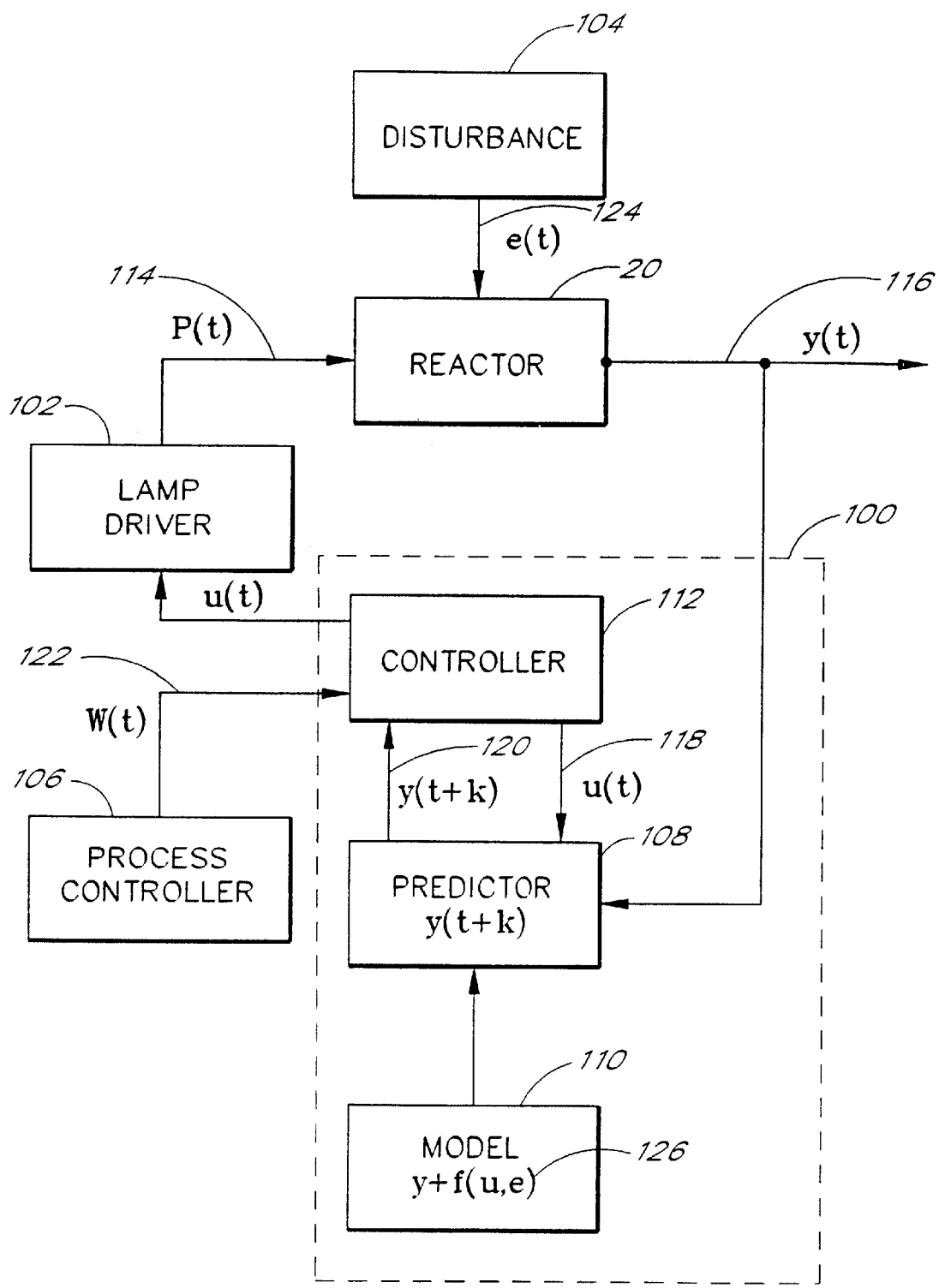
FIG. 5 is a block diagram of a multivariable model-based predictive temperature control system.

One embodiment of the control system of the present invention is described with reference to the block diagram of FIG. 5, which shows that the temperature controller 100 (FIG. 4) comprises several interacting components. The overall block diagram of the dynamic system (e.g., the controller, the reactor, the lamps and the sensors) comprises both the controller 100 and the plant or reactor 20 for which the controller is responsible. The reactor 20 may be exposed to uncontrolled disturbances 104 which influence the reactor state response through disturbance signal input e(t) 124. The disturbance signal 124 may affect the state of the reactor 20, as measured by the plurality of process control inputs y(t) 116 (or process outputs), in this case comprising an array of the measurements made by temperature sensors 44, 46, 48, 50 at the discrete time variable t. The control input 116 is provided to the temperature controller 100 through the predictor 108. The temperature controller comprises principally interacting components: the predictor 108, the model 110, a controller or control law processor 112, and is supplied with a command sequence W(t) 122 from a process controller 106 in accordance with the predefined sequence of desired process temperatures. The predictor 108 computes a sequence of future reactor states y(t+k|t) (120), where k is a discrete time index referenced to time t. As defined herein, a predicted functional value f(t+k) made at time t is denoted by f(t+k|t). The predictions y(t+k|t) are made through any formulation based on the model 126, coupled with the control input 116 and control strategy u(t) 118. The predictor output 120 extends forward in time from t to t+N, where N is the prediction horizon. The predictions y(t+k|t) are reciprocally supplied as input to the control law processor 112. The control law processor 112 computes an optimal control strategy u(t) 118 based on a predetermined control criterion (discussed later), the supplied predictor output 120 and the supplied command sequence W(t) 122. The optimal control strategy 118 is supplied as a process input to a lamp driver 102 which converts the control signals 118 to electrical power input signals P(t) 114. The lamp input signals 114 are supplied to the reactor lamps, thereby affecting the radiant heat distribution within the reactor 20.

Model-based Predictive Control Algorithm

The following detailed description provides a functional explanation of the algorithm used in the model-based predictive controller. A brief derivation of the algorithm serves to exemplify the application to temperature control in general, as well as to the preferred embodiments of RTP temperature control. For clarity, the derivation begins with a single-input, single-output (SISO) process model, subsequently generalized to the multi-input, multi-output (MIMO) case.

The SISO Process Model

In this section the general formulation for the linear single-input, single-output (SISO) polynomial model will be described.

A preferred SISO polynomial model has the following general form:

$$A(q^{-1})y(t) = \frac{B(q^{-1})}{F(q^{-1})}u(t) + \frac{C(q^{-1})}{D(q^{-1})}e(t) \tag{1}$$

where y(t) is the control input, u(t) is the process input, e(t) is a zero-mean gaussian white noise sequence, t is the discrete time index (t= . . . −2, −1, 0, 1, 2, . . . ), $q^{-1}$ is the backward-shift operator $q^{-1}y(t)=y(t-1)$, and $A(q^{-1})$, $B(q^{-1})$, $C(q^{-1})$, $D(q^{-1})$, and $F(q^{-1})$ are the polynomials $$A(q^{-1})=1+a_1q^+ \ldots a_\alpha q^{-\alpha}$$

$$B(q^{-1})=b_1q^{-1}+ \ldots b_\beta q^{-\beta}$$

$$C(q^{-1}) = 1 + c_1 q^{-1} + \ldots c_\chi q^{-\chi}$$

$$D(q^{-1}) = 1 + d_1 q^{-1} + \ldots d_\delta q^{-\delta}$$

$$F(q^{-1}) = 1 + f_1 q^{-1} + \ldots f_\eta q^{-\eta}$$

Here the polynomials $C(q^{-1})$ and $F(q^{-1})$ are asymptotically stable polynomials with all their zeros strictly inside the unit circle, and $D(q^{-1})$ is a stable polynomial with its zeros inside or on the unit circle. The $A(q^{-1})$ polynomial may contain unstable process poles, and the $B(q^{-1})$ polynomial may contain nonminimum-phase zeros. The $C(q^{-1})$ and $D(q^{-1})$ polynomials are herein defined as design polynomials. An advantageous feature of the present preferred model formulation is the definition and inclusion of polynomials $D(q^{-1})$ and $F(q^{-1})$. Their influence in the model behavior more effectively decouples any correlation between the noise input e(t) and process input u(t). It is believed that such decoupling more accurately reflects the true behavior of a thermal process reactor.

The SISO Multistep Predictor

To facilitate the model predictions, the filtered signals $y_f(t)$ and $u_f(t)$ are defined as $$y_f(t) = \frac{A(q^{-1})D(q^{-1})}{C(q^{-1})} y(t), \text{ and} \quad (2)$$

$$u_f(t) = \frac{B(q^{-1})D(q^{-1})}{F(q^{-1})C(q^{-1})} u(t). \quad (3)$$

Consequently, Equation (1) can be rewritten as $$y_f(t) = u_f(t) + e(t). \quad (4)$$

Hence, another advantageous feature of the present preferred model formulation is the definition and use of the filtered signals $y_f(t)$ and $u_f(t)$. As disclosed herein, the filtered signals $y_f(t)$ and $u_f(t)$ provide convenient closed-form solutions for the predicted response $y(t+k|t)$. As previously defined, $y(t+k|t)$ denotes the predicted value of $y(t+k)$ based on measurements available at time t, i.e., $\{y(t), y(t-1), \ldots, u(t-1), u(t-2), \ldots\}$ and (postulated) future values of the process input $\{u(t|t), u(t+1|t), \ldots u(t+k|t)\}$. From the expression for the filtered output at time t+k, namely $$y_f(t+k) = u_f(t+k) + e(t+k)$$

it follows that the optimal k-step-ahead predictor is simply given as $$y_f(t+k|t) = u_f(t+k|t), \text{ for } k>0 \quad (5)$$

where e(t) is assumed to be pure white noise. For $k \leq 0$ the predictor is given by $$y_f(t+k|t) = y_f(t+k), \text{ for } k \leq 0 \quad (6)$$

In terms of the unfiltered process output, Equations (5) and (6) can be written as $$A(q^{-1})D(q^{-1})y(t+k|t) = Cy_f(t+k|t), \text{ for } k>0 \quad (7)$$

$$y(t+k|t) = y(t+k), \text{ for } k \leq 0 \quad (8)$$

and Equation (8) plays an essential role in the proper initialization of the difference equation (7). The filter $y_f(t+k|t)$ is re-initialized at each step t and gives consecutively all values in the whole prediction range $\{y(t+k|t)\}$ for $k=1 \ldots N$, where N is the prediction horizon.

Figure 6:
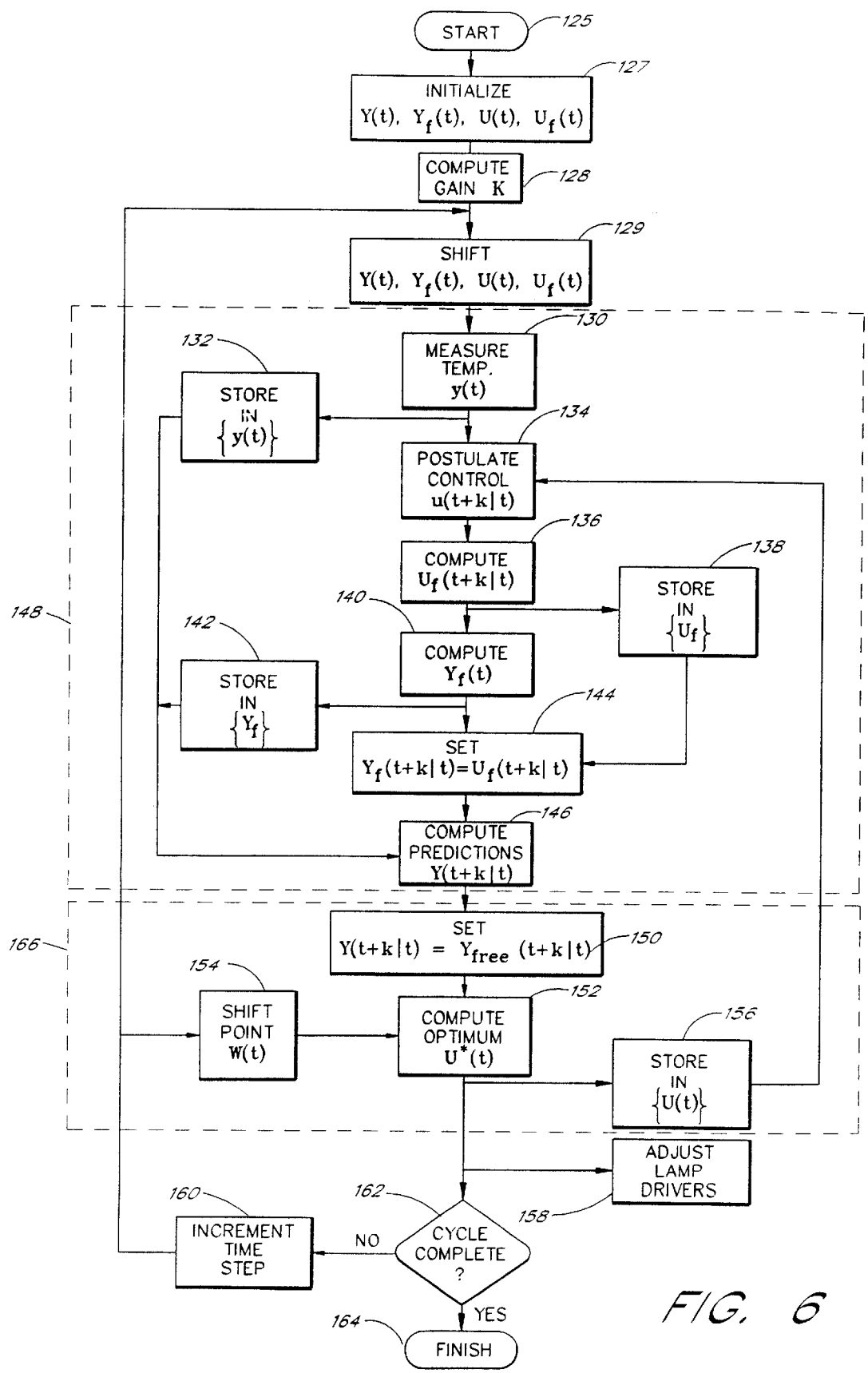
FIG. 6 is a flow chart representing a preferred predictor and controller algorithm.

The structure of the predictor algorithm is substantially as that shown in the dashed block 148 of the flow chart shown in FIG. 6. The process control begins with an initialization block 127 followed by a computation of the forced response gain vector K 129 (to be discussed below in connection with the control law). At each time step t, the process input y(t) and output u(t) vectors, as well as the filtered vectors $y_f(t)$ and $u_f(t)$, are shifted in the time index as indicated by the shift block 128, in accordance with the receding horizon formulation. The following process steps exemplify the predictor structure:

(1) Measure y(t) at a process block 130 and store the data in a database $\{y(t), y(t-1), \ldots ; u(t-1), u(t-2), \ldots\}$, as indicated by a process block 132;

(2) Postulate the future control policy $\{u(t|t), u(t+1|t), \ldots u(t+N|t)\}$ in a process block 134.

The simplest assumption to make about the future process inputs is that they will remain constant. Thus, $u(t-1) = u(t|1) = u(t+1|t) = \ldots = u(t+N|t)$.

As elaborated in the next section C, the assumptions made here lead to a computation of the free response of the system, which is subsequently compared to the desired response in order to deduce an optimal control strategy.

(3) Compute the vector of filtered inputs $\{u_f(t|t), u_f(t+1|t), \ldots u_f(t+N|t)\}$ in a process block 136 in accordance with Equation (3) using:

$$u_f(t|t) = u_f(t|t) = -fc_1 u_f(t-1) - fc_2 u_f(t-2) - \ldots + bd_0 u(t|t) + bd_1 u(t-1) + \ldots$$

$$u_f(t+1|t) = -fc_1 u_f(t|t) - fc_2 u_f(t-1) - \ldots + bd_0 u(t+1|t) + bd_1 u(t|1) + \ldots$$

$$u_f(t+N|t) = -fc_1 u_f(t+N|t) - fc_2 u_f(t+N-2|t) - \ldots + bd_0 u(t+N|t) + bd_1 u(t+N-1|1) + \ldots$$

where $$B(q^{-1})D(q^{-1}) = bd_0 + bd_1 q^{-1} + bd_2 q^{-2} + \ldots$$

and $$F(q^{-1})C(q^{-1}) = fc_0 + fc_1 q^{-1} + fc_2 q^{-2} + \ldots$$

and where $b_{d0} = 0$ (since $b_0 = 0$) and $f_{c0} = 1$ (since $f_0 = 1$, and $c_0 = 1$).

Store the result in a data base $\{u_f(t)\}$ in a process block 138;

(4) Compute $y_f(t)$ in a process block 140 in accordance with Equation (2) using $$y_f(t) = -c_1 y_f(t-1) - c_2 y_f(t-2) - \ldots + y(t) + ad_1 y(t-1) + \ldots,$$

where $$a(q^{-1})D(q^{-1}) = ad_0 + ad_1 q^{-1} + ad_2 q^{-2} + \ldots$$

and $a_{d0} = 1$ (since $a_0 = 1$, and $d_0 = 1$);

Store the result in a database $\{y_f(t)\}$, as indicated by a process block 142;

(5) Set the filtered process output $y_f(t+k|t)$ equal to the filtered process input $u_f(t+N|t)$ in a process block 144 in accordance with Equation (5):

$$y_f(t+1|t) = u_f(t+1|t),$$

$$y_f(t+N|t) = u_f(t+N|t).$$

(6) Compute the predictions $\{y(t+1|t), y(t+2|t), \ldots, y(t+N|t)\}$ in process block 146 from Equations (7) and (8) using:

$$y(t+1|t) = -ad_1 y(t) - ad_2 Y(t-1) - \ldots + y_f(t+1|t) + c_1 y_f(t) + \ldots,$$

$$y(t+2|t) = -ad_1 y(t+1|t) - ad_2 Y(t) - \ldots + y_f(t+2|t) + c_1 y_f(t+1) + \ldots,$$

$$y(t+N|t) = -ad_1 y(t+N-1|t) - ad_2 y(t+N-2|t) - \ldots + y_f(t+N|t) + c_1 y_f(t+N-1|t) + \ldots,$$

Note that only $u_f(t)$ and $y_f(t)$ have to be saved for the next time step (t+1). All other predicted data, indicated with (t+k|t), can be forgotten after time t. The set of predictions y(t+k|t) is supplied to the predictive controller, described in the following section.

The SISO Predictive Controller

The predictive controller of the present invention determines the control strategy u(t) which minimizes the cost function H, defined as:

$$H = \sum_{k=0}^{N} ([w(t+k\mid t) - y(t+k\mid t)])^2 + \lambda \sum_{k=0}^{N_u-1} ([\Delta u(t+k\mid t)])^2, \quad (9)$$

subject to $$\Delta u(t+k\mid t)=0 \text{ for } k \geq N_u, \quad (10)$$

where w(t) is the actual set point, N is the prediction horizon, and $N_u$ is the control horizon, $\Delta u(t)=u(t)-u(t-1)$, and $\Delta u(t+k\mid t)=u(t+k\mid t)-u(t+k-1\mid t)$. The cost function H comprises terms quadratic in [w(t+k)-y(t+k)] and [u(t+k)-u(t+k-1)]. The set of terms involving the control input y(t) reflects the predicted controller tracking error, which is desirably minimized with respect to future control moves u(t+k|t). The set of terms involving the control strategy u(t) reflects the effort to achieve a given level of tracking error. The prefactor $\lambda$ is preferably tuned to provide the desired level of controller response. In a presently disclosed exemplary embodiment, $\lambda=0$.

Since the model of the system is linear, the future response y(t+k|t) can be considered as a superposition of two separate contributions:

$$y(t+k\mid t)=y_0(t+k\mid t)+y_p(t+k\mid t). \quad (11)$$

Here, the free response, $y_0$(t+k|t), is the result of past process inputs {u(t-1), u(t-2), ...,} assuming that all future control moves are zero (i.e., $\Delta u(t\mid t)=\Delta u(t+1\mid t)= \ldots =0$, or equivalently, u(t|t)=u(t-1), u(t+1|t)=u(t), ...), and of the disturbances acting on the system. The free response is computed with the procedure given in the previous section, using the prediction horizon N, and u(t|t)=u(t+1|t)= ... =u(t+N|t)=u(t-1).

The forced response, $y_p$(t+k|t) is the result of future control moves $\Delta u(t\mid t), \Delta u(t\mid t), \Delta u(t+1\mid t), \ldots, \Delta u(t+N_u-1\mid t)$. It is the effect of a sequence of step inputs to the system: a step with amplitude $\Delta u(t\mid t)$ at time t, resulting in a contribution $g_k \Delta u(t\mid t)$ to the predicted output at time (t+k), plus a step with amplitude $\Delta u(t+1\mid t)$ at time (t+k), etc. The total effect is thus $$y_p(t_k\mid t)=g_k\Delta u(t\mid t)+g_{k-1}\Delta u(t+1\mid t)+ \ldots +g_{k-N_u-1}\Delta u(t+N_u-1\mid t)$$

where $$G(q^{-1})=g_0+g_1 q^{-1}+g_2 q^{-2}+ \ldots$$

is the step response of the system $B(q^{-1})/(A(q^{-1})F(q^{-1}))$. Since $b_0=0$, then $g_0=0$. Moreover $g_k=0$ for k<0. Using matrix notation and assuming $N \geq N_u$ results in the following expression for the vector of forced response contributions to the predictions:

$$\begin{bmatrix} y_p(t+1\mid t) \\ y_p(t+2\mid t) \\ \vdots \\ y_p(t+N\mid t) \end{bmatrix} = \begin{bmatrix} g_1 & 0 & 0 & \cdots & 0 \\ g_2 & g_1 & 0 & \cdots & 0 \\ \vdots & \vdots & \vdots & \vdots & \vdots \\ g_N & g_{N-1} & g_{N-2} & \cdots & g_{N-N_u-1} \end{bmatrix} \begin{bmatrix} \Delta u(t\mid t) \\ \Delta u(t+1\mid t) \\ \vdots \\ \Delta u(t+N_u-1\mid t) \end{bmatrix}$$

In matrix notation, the vector of predicted errors can be written as:

$$\begin{bmatrix} w(t+1\mid t)-y(t+1\mid t) \\ \vdots \\ w(t+N\mid t)-y(t+N\mid t) \end{bmatrix} = \begin{bmatrix} w(t+1\mid t)-y_0(t+1\mid t) \\ \vdots \\ w(t+N\mid t)-y_0(t+N\mid t) \end{bmatrix} +$$

$$\begin{bmatrix} g_1 & 0 & \cdots & 0 \\ \vdots & \vdots & \vdots & \vdots \\ g_N & g_{N-1} & \cdots & g_{N-N_u+1} \end{bmatrix} \begin{bmatrix} \Delta u(t\mid t) \\ \vdots \\ \Delta u(t+N_u-1\mid t) \end{bmatrix}$$

Or, equivalently, with obvious definitions for the newly introduced variables, as $$W-Y=W-Y_0-GU \quad (12)$$

In the same fashion, and at the same time using Equation (12), the cost function (9) can be written as $$H=(W-Y)^T(W-Y)+\lambda U^T U=[(W-Y_0)-GU]^T[(W-Y_0)-GU]+\lambda U^T U$$

Minimizing H with respect to U gives the solution $$U^*=(G^T G+\lambda I)^{-1} G^T(W-Y_0) \quad (13)$$

Only the first element of U* is actually required to compute the control input:

$$u(t)=u(t-1)+\Delta u(t\mid t)$$

At the next time slot (t+1), the whole procedure is repeated, taking into account the new measurement information y(t+1) and new set point data w(t+N+1), in accordance with the receding horizon principle.

Denoting the first row of $(G^T G+\lambda I)^{-1} G^T$ by K, the control law is given by $$u(t)=u(t-1)+K(W-Y_0) \quad (14)$$

The gain vector K is computed in accordance with the foregoing matrix expression. Note that this gain vector has to be computed only once in the non-adaptive case, i.e., the case in which the model parameters remain fixed. This computation can be done in the initialization phase of the algorithm as previously mentioned and shown in process block 128 of FIG. 6. Alternatively, the gain vector can be pre-computed off-line and stored in memory. Adaptive extension of the foregoing control law would, in essence, provide for periodic adjustment of the gain vector K.

A dashed portion 166 of the flow chart in FIG. 6 corresponds to the predictive controller and is supplied with the process output predictions y(t+k|t) 120 generated in the dashed portion 148. Because the postulated future control input u(t+k|t) is assumed constant and equal to u(t-1) (process block 134), then the predicted output y(t+k|t) is equivalent to the future free response of the system $y_0$(t+k|t). In a process block 150, the system free response is set to the previously computed predictions y(t+k|t) (block 146). The system free response is supplied to a process block 152, along with the current set point information from a block 154. At the process block 152, the optimum process control input U*(t) is computed using y$_0$(t+k|t), W(t), u(t−1) and the gain vector K initially computed in block 128. The optimum control input U*(t) is used to adjust the lamp drivers at time=t in a process block 158. Additionally, the value of U*(t) is incorporated in the process input matrix {u(t)} in the block 156 which is subsequently supplied to the process block 134 in preparation for the next time-step operation. Following the lamp bank control adjustment in the block 158, a decision block 162 may test to determine whether the process cycle is complete. If not, then a time-step increment is made in a block 160, which then shifts the set-point matrix in the block 154, as well as process input/output matrix at the block 129.

The MIMO Predictive Controller

It will be appreciated that the formulation of the model-based predictive control algorithm for multi-input, multi-output (MIMO) systems is an extension of the SISO case. Those skilled in the art of control systems will know how to extend the previously described computational formalism to multivariant systems.

The MIMO control systems modeled by the methods of the present invention are those characterized by a plurality of input $u_i(t)$ variables and output $y_j(t)$ variables, where the variable indices i, j run up to the number of respective input and output variables m, n. Each output of the MIMO is related to all inputs via a dynamic relationship of the form (1):

$$A_j(q^{-1})y_j(t) = \sum_{i=1}^{m} \frac{B_{ji}(q^{-1})}{F_{ji}(q^{-1})} u_i(t) + \frac{C_j(q^{-1})}{D_j(q^{-1})} e(t), \text{ for } j = 1 \ldots n. \quad (15)$$

Here, m denotes the number of inputs and n denotes the number of outputs. Both m and n are four in the case of the exemplary RTCVD system shown in FIG. 1. The MIMO multistep predictor is conveniently considered as a consecutively applied predictor of a multi-input, single-output (MISO) model. Therefore, equations (15) can be considered as a set of coupled MISO models. Defining the filtered signals as $$(y_f)_j(t) = \frac{A_j(q^{-1})D_j(q^{-1})}{C_j(q^{-1})} y_j(t), \, j = 1 \ldots n \quad (17)$$

and $$(u_f)_{ji}(t) = \frac{B_{ji}(q^{-1})D_j(q^{-1})}{F_{ji}(q^{-1})C_j(q^{-1})} u_i(t), \, i = 1 \ldots m, \, j = 1 \ldots n \quad (18)$$

the filtered process output signal is written as:

$$(y_f)_j(t) = \sum_{i=1}^{m} (u_f)_{ji}(t) + e(t), \, j = 1 \ldots n \quad (19)$$

analogous to that shown in Equation (4).

Thus, the k-step-ahead predictor for the j$^{th}$ process output is given by $$(y_f)_j(t+k|t) = \sum_{i=1}^{m} (u_f)_i(t+k|t), \, k > 0 \quad (20)$$

$$(Y_f)_j(t+k|t) = (y_f)_j(t+k), \, k \leq 0 \quad (21)$$

Similarly, the MISO equivalent of Equations (7) and (8) is given by $$A_j(q^{-1})D_j(q^{-1})y_j(t+k|t) = C_j(y_f)_j(t+k|t), \text{ for } k>0 \quad (22)$$

$$y_j(t+k|t) = Y_j(t+k), \text{ for } k \leq 0 \quad (23)$$

The action produced by the MIMO predictive controller preferably minimizes the multivariant cost function analogous to Equations (9) and (10):

$$H = \sum_{j=1}^{n} \sum_{k=0}^{N} [w_j(t+k|t) - y_j(t+k|k)]^2 + \lambda \sum_{i=1}^{m} \sum_{k=0}^{Nu-1} [\Delta U_i(t+k|t)] \quad (24)$$

with respect to $\Delta U_i$(t+k|t) and subject to:

$$\Delta u_i(t+k|t) = 0 \text{ for } k \geq M, \, i=1,\ldots,m \quad (25)$$

Introducing the following notation for the step response coefficients related to input j and output j $$G_{ji}(q^{-1}) = \frac{B_{ji}(q^{-1})}{A_j(q^{-1})F_{ji}(q^{-1})(1-q^{-1})} = g_0^{ji} + g_1^{ji} q^{-1} + g_2^{ji} q^{-2} + \ldots \quad (26)$$

the forced response of output j due to postulated future variations of the control inputs $$\{\Delta u_i(t|t), \Delta u_i(t+1|t), \ldots, \Delta u_i(t+N_u|t), \, i=, \ldots, m\}$$

can be written as:

$$\begin{bmatrix} y_{j,p}(t+1|t) \\ y_{j,p}(t+2|t) \\ \vdots \\ y_{j,p}(t+N|t) \end{bmatrix} =$$

$$\sum_{i=1}^{m} \begin{bmatrix} g_1^{ji} & 0 & 0 & \cdots & 0 \\ g_2^{ji} & g_1^{ji} & 0 & \cdots & 0 \\ \vdots & \vdots & \vdots & \vdots & \vdots \\ g_N^{ji} & g_{N-1}^{ji} & g_{N-2}^{ji} & \cdots & g_{N-N_u-1}^{ji} \end{bmatrix} \begin{bmatrix} \Delta u_j(t|t) \\ \Delta u_j(t+1|t) \\ \vdots \\ \Delta u_j(t+N_u-1|t) \end{bmatrix}$$

with similar expressions for the other zones. The vector of predicted errors for the first process output in the time frame of interest can now be written as:

$$\begin{bmatrix} w_j(t+1|t) - y_j(t+1|t) \\ \vdots \\ w_j(t+N|t) - y_j(t+N|t) \end{bmatrix} = \begin{bmatrix} w_j(t+1|t) - y_{j,0}(t+1|t) \\ \vdots \\ w_j(t+N|t) - y_{j,0}(t+N|t) \end{bmatrix} +$$

$$\sum_{i=1}^{m} \begin{bmatrix} g_1^{ji} & 0 & 0 & \cdots & 0 \\ g_{1+1}^{ji} & g_1^{ji} & 0 & \cdots & 0 \\ \vdots & \vdots & \vdots & \vdots & \vdots \\ g_N^{ji} & g_{N-1}^{ji} & g_{N-2}^{ji} & \cdots & g_{N-N_u+1}^{ji} \end{bmatrix}$$

$$\begin{bmatrix} \Delta u_1(t \mid t) \\ \Delta u_1(t+1 \mid t) \\ \vdots \\ \Delta u_1(t+N-1 \mid t) \end{bmatrix}$$

or, equivalently, using matrix notation by analogy to Equation (12), $$W_j - Y_j = W_j - Y_{j,0} - \sum_{i=1}^{m} G_{ji} U_i, \text{ for } j = 1 \ldots n \quad (27)$$

with similar expressions for the other process outputs. Using the same notation, the cost function (24) can be written as:

$$H = \sum_{j=1}^{n} (W_j - Y_j)^T (W_j - Y_j) + \lambda \sum_{i=1}^{m} (U_i^T U_i) \quad (28)$$

The general solution to the minimization of Equation (28), subject to the criteria of Equation (27) and similar equations for the other process outputs, is found to be $$U^* = \left( \left[ \sum_{j=1}^{n} G_j^T G_j + \lambda I \right] \right)^{-1} \left[ \sum_{j=1}^{n} G_j^T (W_j - Y_{j,0}) \right] \quad (29)$$

with I the identity matrix of appropriate dimension, and $$G_j = [G_{j1} G_{j2} \ldots G_{j,m}]$$

$$U = [U_1^T U_2^T \ldots U_m^T]^T$$

Finally, the control output is calculated via $$u_i(t) = u_i(t-1) + U_i^*(1), i=1, \ldots, m \quad (30)$$

In practice, exemplary model parameters may for example comprise multi-input, multi-output (MIMO) 3rd order polynomial model coefficients defined by $$A_j(q^{-1}) y_j(t) = \sum_{i=1}^{m} \frac{B_{ji}(q^{-1})}{F_{ji}(q^{-1})} u_i(t) + \frac{C_j(q^{-1})}{D_j(q^{-1})} e(t), \text{ for } j = 1 \ldots n$$

with $A_j=1$, $D_j=1-q^{-1}$, $C_j=(1-C_1 q^{-1})(1-C_1 q^{-1})$ for all j, and n=m=4 for the exemplary embodiment described earlier. Empirical testing of a particular reactor will determine the most appropriate values for the coefficients as outlined below.

Rapid Thermal Process Predictive Control System

The foregoing description of a preferred model and algorithm for a multivariable model-based predictive control system is general in nature. It can be applied to a variety of systems having input/output relationships characterized by a suitably accurate model implemented in an ARMA fashion. The long-range predictive nature of the model-based control algorithm provides fast response and robust behavior in addition to the flexibility afforded by the ARMA model.

The following system description incorporates the foregoing algorithm, model and model implementation to provide static and dynamic temperature uniformity control in rapid thermal processing reactors.

Figure 7:
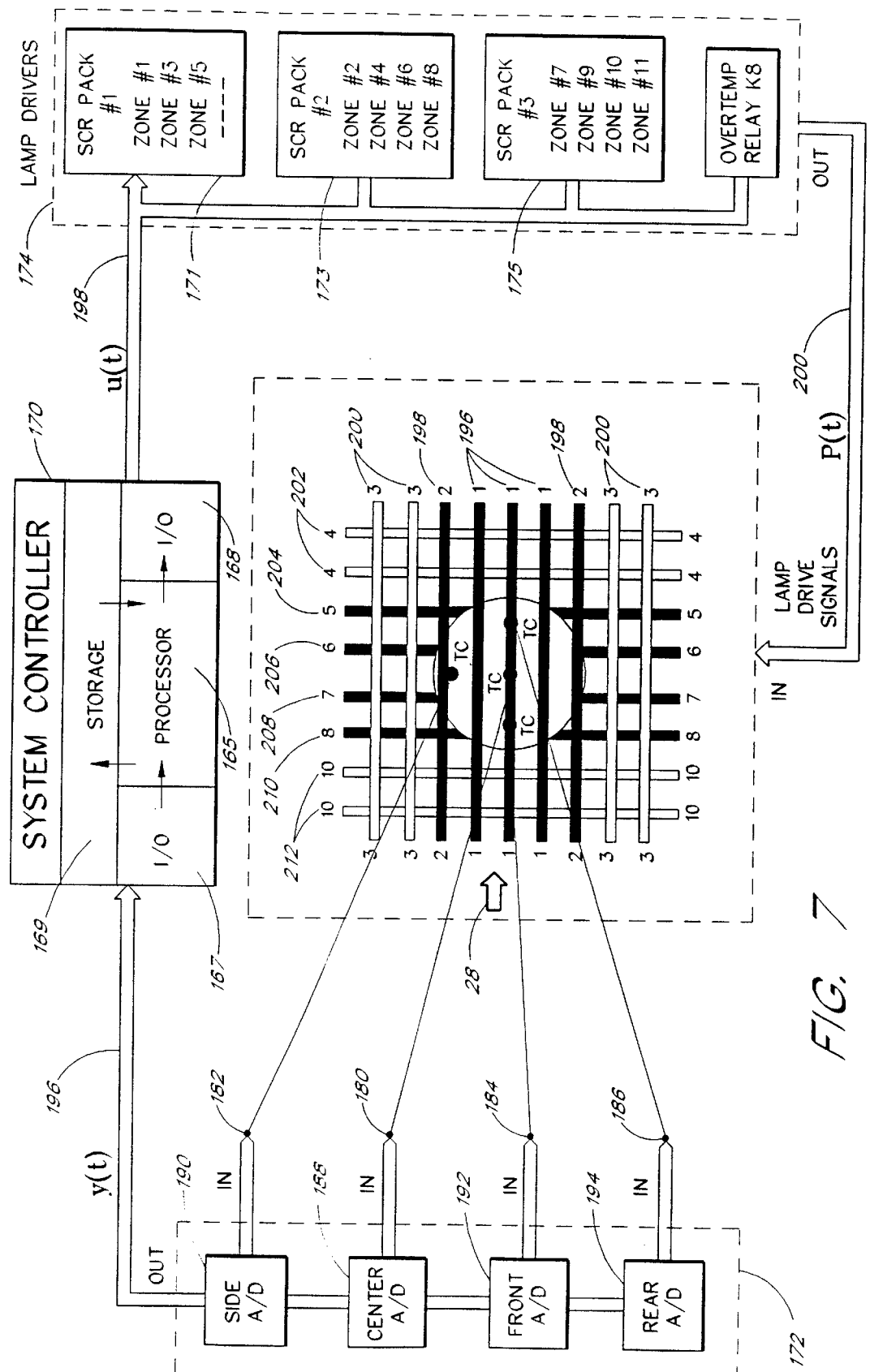
FIG. 7 is a system diagram of a preferred multivariable model-based predictive temperature control system.

As shown in FIG. 7, a multivariable temperature control system for a rapid thermal process reactor comprises a temperature sensor array disposed within the process reactor 20. The temperature sensors may comprise thermocouples or other such equivalents. In the present embodiments, thermocouples 180, 182, 184, and 186 or other such temperature sensors are connected to the susceptor 24 as previously described in FIG. 1. The temperature sensors 180, 182, 184, 186 are each connected to a data bus via input/output devices such as buffer amplifiers and analog-to-digital (A/D) converters 188, 190, 192 and 194. The temperature sensor input/output devices 188, 190, 192 and 194 are preferably housed in a temperature data acquisition assembly 172 and are located in the vicinity of the reactor 20 to minimize measurement error. The outputs of the A/D converters 188, 190, 192, 194 are connected to a data bus 195 which in turn connects to an input/output port 167 of the system temperature controller 170. The temperature controller 170 comprises a processor 165, a data storage device 169, and data input/output devices 167, 168 which provide hardware/software implementation of the foregoing model-based predictive control algorithm. The output of system controller 170 are connected to a plurality of lamp drivers 174 via a data bus 198 and provide the lamp drivers with their respective control signals U*(t). As previously mentioned, the plurality of lamp drivers may comprise a bank of SCR power regulators configured in a predetermined manner to supply electrical power to the plurality of lamps in reactor 20. Preferably, the SCR's and lamps are connected to supply radiant energy to the plurality of reactor heat zones in accordance with the preferred radiant heat distribution within the reactor 20. The lamp driver outputs P(t) 200 are connected to the lamps in accordance with this plan, thereby completing the temperature control loop.

In operation, the temperature sensors 180,182, 184 and 186 provide analog signals indicative of the wafer temperature in respective zones center, side, front and rear. As shown in FIG. 7, the analog signals are filtered (buffered) and converted to digital signals by the respective A/D converters 188, 190, 192 and 194. The digitized temperature information Y(t) is transmitted via the data bus 196 to the system controller 170 which computes the optimal control strategy U*(t) using the foregoing model-based predictive control algorithm and dynamic system model. The information necessary for future processing, namely Y(t) and U*(t), is retained in the controller data storage device. The system controller 170 transmits the control input U*(t) via the data bus 198 to the lamp driver assembly 174 whereupon the control signals U*(t) are distributed to the appropriate SCR packs 171, 173, 175. The SCR's convert the control signals U(t) to the lamp drive signals P(t) as previously discussed in connection with the prior art system of FIG. 2. The lamp drive signals P(t) are transmitted to and distributed among the lamp banks in reactor 20 via the bus 200. The lamp banks and lamp drive signals are configured spatially and temporally, in part by the temperature controller 170, to provide a predetermined spatial and temporal temperature profile over wafer 22.

Reactor Model Identification and Parameterization

The present section discloses exemplary identification and modeling procedures in order to arrive at a model that accurately describes the dynamics of a multivariable rapid thermal reactor. The ensuing model resides at the core of the model-based predictive temperature control system of the present invention. The test arrangement and conditions are first described, after which the model structure and order selection procedures are discussed. The model is then presented along with exemplary model validation.

Modeling and Identification

For modeling and identification, a PC-based Data Acquisition and Control (DA&C) system (not shown) is connected to the RTCVD reactor. A software based system is used to provide the interface between the DA&C hardware and the user. The PC is used to control the temperature in the reactor, for example, by using a conventional software-based PID algorithm. The DA&C system is also capable of injecting stimuli, in the form of appropriate test signals, into the system in open-loop mode and detecting the response of the temperature sensors. This open-loop mode comprises a substantial portion of the system operation during the identification experiments. The inputs to the system, such as SCR drive signals, and the outputs, such as thermocouple readings, are stored in a data file. Analysis of the signals and modeling are performed off-line using software-based analysis familiar to those skilled in the art of model identification. The identification experiments will result in a model for the transfer function from the four control signals for the center, front, side, and rear zones to the center 44, front 46, side 48, and rear 50 thermocouples.

Identification experiments on the RTCVD reactor are conducted at atmospheric pressure and at a temperature between 600° C.–800° C., which is a typical temperature range for polysilicon deposition. The controller zone ratio settings are optimized for steady-state uniformity at 650° C. and are maintained constant during the experiment. The system is set for 6" wafer processing. A nitrogen purge flow of 20 slm is used throughout the experiment. Identification experiments are also performed in $H_2$ ambients both at 1 atm and reduced pressure at about 200° C. for typical epitaxial deposition conditions. The lamp-bank configuration may be adjusted and in general may differ from that previously shown in FIG. 2 in terms of zone distribution and lamp power. Those skilled in the art of reactor design will appreciate that a variety of lamp bank distributions are possible. In particular, an exemplary lamp distribution may have all lamps operating at the same nominal power rating of between 3 kW and 7 kW, with some modification in the distribution of SCR lamp drivers to lamp heating zones. Additionally, the SCR/lamp wiring may differ between zones to facilitate the power distribution between lamps. The preferred lamp bank distribution, power and wiring will in general depend on the desired thermal processing and reactor geometry. For the purposes of the present preferred embodiments, the preferred design criteria result in a lamp bank configuration having better controllability of the peripheral zones and having reduced temperature differences across the wafer as well as between wafer and susceptor.

Careful experimental design for dynamic system identification is paramount to obtaining a good model. Several design variables must be considered: the type and shape of input signal, its spectrum, the sample rate, the number of samples, and the antialiasing presampling filters. Essentially, the experiment must be designed such that it is informative, i.e., that it provides the experimenter with the desired information about the system. For an experiment to be informative, the input stimuli must be persistently exciting. Basically, this means that the input signals must have enough spectral content to excite all relevant modes of the system. A detailed treatment on system identification and experiment design is provided in L. Ljung, *System Identification: Theory for the User*, Prentice-Hall, Englewood Cliffs, N.J. (1987). Classical system identification makes use of step-signals, pulses or sine waves as test signals for identification purposes. The modem equivalent of these signals for identification of multivariable systems is the Pseudo-Random Binary Signal (PRBS), having a signal level that alternates between two levels at random times. In the exemplary test shown here, the PRBSs are allocated peak-to-peak amplitudes of about 1.5 V in order to provide sufficient system excitation. Mean signal levels are chosen to correspond to the steady-state controller output voltage levels corresponding to a temperature of about 650° C. The sampling rate is taken to be about 0.5 Hz. A one-hour run is recorded. The resulting data set is split in two, the first half being used for identification purposes and the second half for model validation purposes. DC-offsets are eliminated from all input and output signals.

Figure 8A:
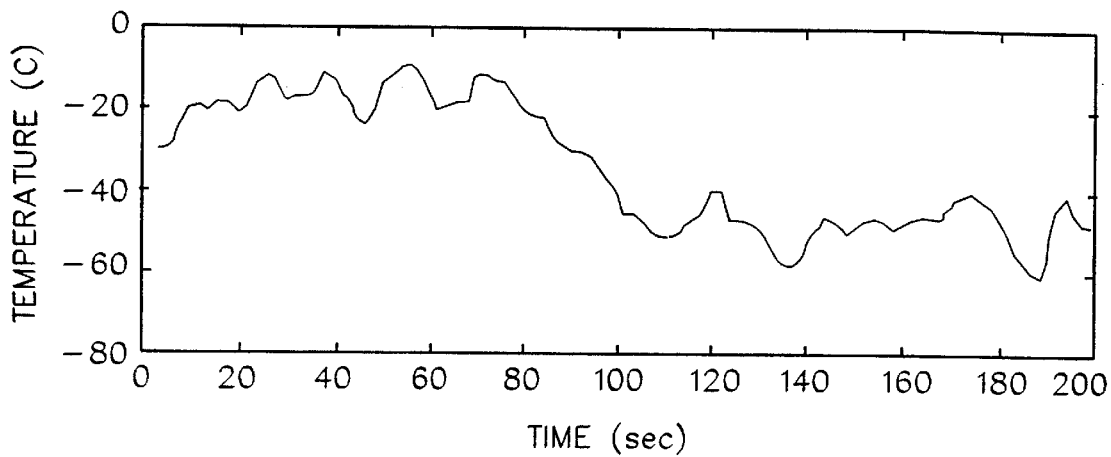
FIGS. 8A and 8B illustrate an exemplary input/output identification data set for the center zone, showing system stimuli (B) and response (A).
Figure 8B:
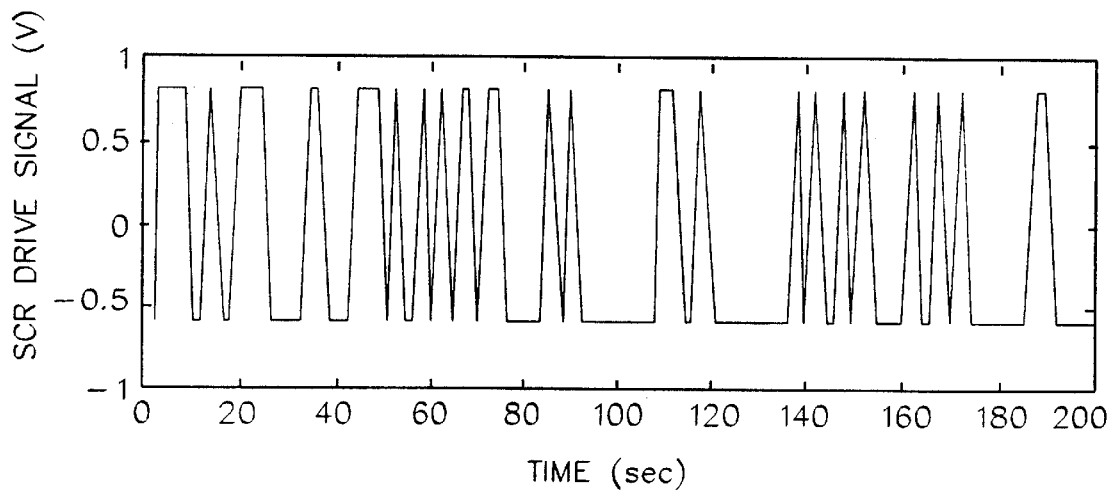

An exemplary input/output identification data set for the center zone is shown in FIGS. 8A and 8B, showing the first 200 seconds of system stimuli (FIG. 8B) and response (FIG. 8A). Corresponding identification data sets for the front, side, and rear zones are obtained in the same manner and display substantially similar characteristics.

Reactor Model Structure

Once the identification data set has been collected, the next step is to choose a model structure. Generally, this involves three steps:

1. Choosing the type of model set (e.g., linear or nonlinear, input-output, black-box or physically parameterized state-space models).
2. Choosing the size of the model set. This is called the model-order selection and determines the number of free parameters in the model description.
3. Choosing the model parameterization. That is, choosing the positions of the free parameters in the selected model structure.

The choice of model structure will likely involve a trade-off between flexibility and parsimony. A higher-order model will be more flexible, but may lead to unnecessarily many parameters being used to describe the true system. Moreover, a high-order model is more difficult for on-line use in a model-based controller. The principles and guidelines for system modeling are well-known to those skilled in the art of system control. Again, for a more in-depth treatment of the topic of model structure selection one is referred to Ljung (1987).

As described above in Section III.D., the present embodiment of the multi-input, multi-output, model-based predictive controller utilized a multi-input, multi-output polynomial model in an auto-regressive moving average representation in Equation (15). The model is advantageously considered as a set of coupled linear multi-input, single-output polynomials which allow convenient description of the filter process signals $(Y_f)_j$ and $(U_f)_j$ (see Equations (17) and (18)).

The exemplary model parameters provided in Table I below refer to a multi-input, multi-output (MIMO) 3rd order polynomial model coefficients defined by $$A_j(q^{-1})y_j(t) = \sum_{i=1}^{m} \frac{B_{ji}(q^{-1})}{F_{ji}(q^{-1})} u_i(t) + \frac{C_j(q^{-1})}{D_j(q^{-1})} e(t), \text{ for } j = 1 \ldots n$$

with $n=m=4$, and $A_j=1$, $D_j=1-q^{-1}$, $C_j=(1-C_1q^{-1})(1-C_1q^{-1})$ for all j.

TABLE I

| | | |
|---|---|---|
| $F_{11}$ = [ 1.000 | −1.7566 | 0.7613], |
| $B_{11}$ = [ 0 0.2226 | 0.0617], | |
| $F_{12}$ = [ 1.000 | −1.8167 | 0.8197], |
| $B_{12}$ = [ 0 0.1158 | 0.0281], | |
| $F_{13}$ = [ 1.000 | −1.8577 | 0.8599], |
| $B_{13}$ = [ 0 0.0974 | −0.0038], | |
| $F_{14}$ = [ 1.000 | −1.8297 | 0.8325], |
| $B_{14}$ = [ 0 0.2638 | 0.0386], | |
| $F_{21}$ = [ 1.000 | −1.8813 | 0.8832], |
| $B_{21}$ = [ 0 0.0231 | 0.0622], | |
| $F_{22}$ = [ 1.000 | −1.8433 | 0.8470], |
| $B_{22}$ = [ 0 0.3518 | 0.2178], | |
| $F_{23}$ = [ 1.000 | −1.8728 | 0.8748], |
| $B_{23}$ = [ 0 −0.0629 | 0.1559], | |
| $F_{24}$ = [ 1.000 | −1.8889 | 0.8903], |
| $B_{24}$ = [ 0 0.0031 | 0.0773], | |
| $F_{31}$ = [ 1.000 | −1.8516 | 0.8543], |
| $B_{31}$ = [ 0 0.0430 | 0.0723], | |
| $F_{32}$ = [ 1.000 | −1.8633 | 0.8656], |
| $B_{32}$ = [ 0 0.0686 | 0.0617], | |
| $F_{33}$ = [ 1.000 | −1.8507 | 0.8537], |
| $B_{33}$ = [ 0 −0.0404 | 0.1992], | |
| $F_{34}$ = [ 1.000 | −1.8772 | 0.8798], |
| $B_{34}$ = [ 0 0.0610 | 0.2238], | |
| $F_{41}$ = [ 1.000 | −1.7650 | 0.7696], |
| $B_{41}$ = [ 1.000 | −1.7650 | 0.7696], |
| $B_{41}$ = [ 0 0.1305 | 0.0149], | |
| $F_{42}$ = [ 1.000 | −1.7605 | 0.7643], |
| $B_{42}$ = [ 0 0.0878 | −0.0020], | |
| $F_{43}$ = [ 1.000 | −1.8488 | 0.8520], |
| $B_{43}$ = [ 0 0.2827 | −0.1662], | |
| $F_{44}$ = [ 0 −1.6447 | 0.6587], | |
| $B_{44}$ = [ 0 2.1642 | 0.3143]. | |

In the present exemplary system, i and j may correspond to the zone number (i.e., 1=center, 2=front, 3=side, 4=rear).

Reactor Model Validation

Once a model structure has been selected and a parameterization has been found, the proposed model is preferably validated. Standard techniques for model validation include simulation, residual analysis, and cross-correlation analysis.

Figure 9:
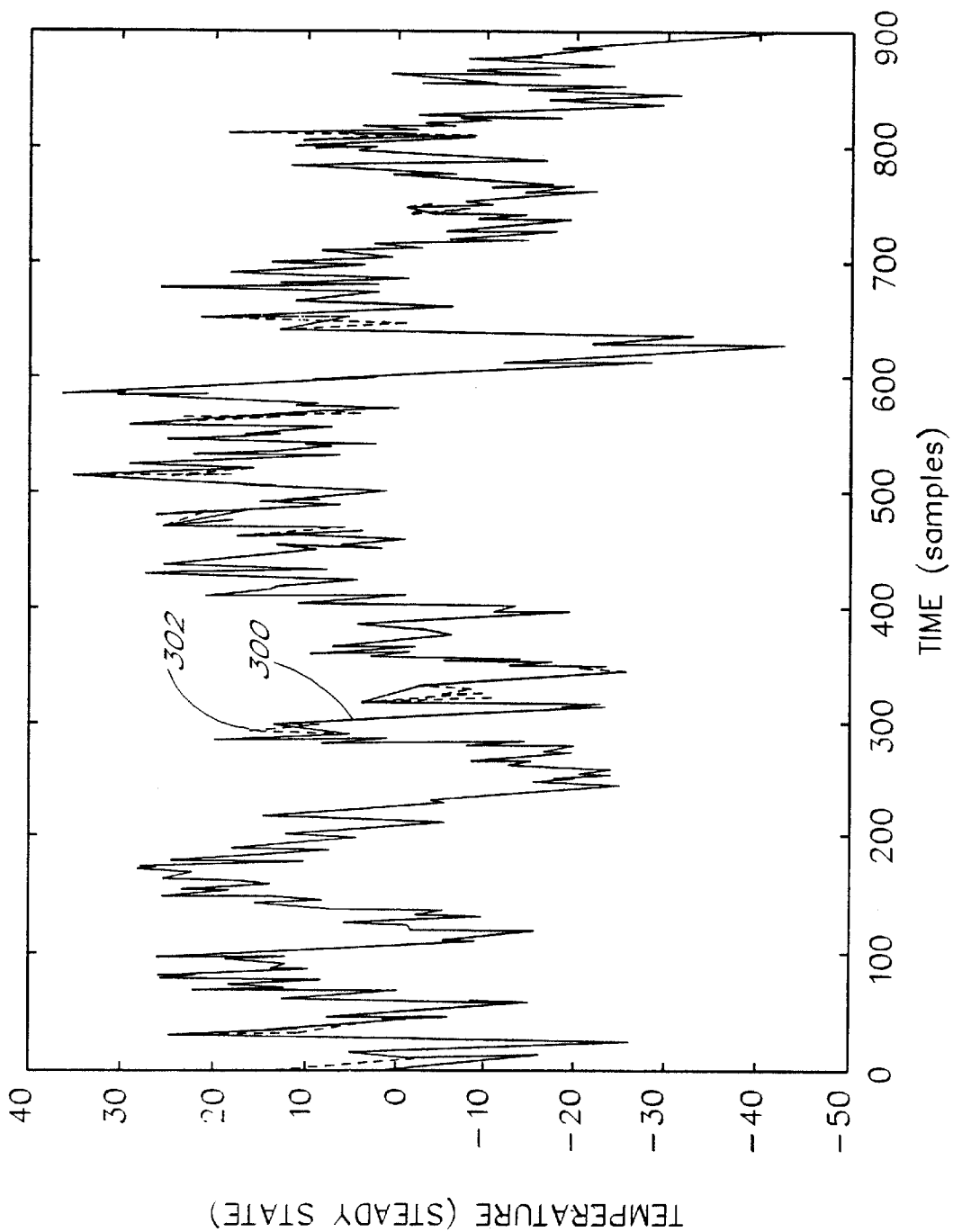
FIG. 9 illustrates an exemplary system output simulation using system input data for the center zone.

In simulation, usually a fresh data set is used, i.e., data from the real system that was not used in the identification phase. The model is fed with the same inputs as the actual system and a comparison is made between model outputs and system outputs. Such an exemplary comparison is made in FIG. 9, again for the center zone, using the data of the last 30 minutes of the experiment which were not used for model building purposes. In FIG. 9, both model output 302 and system output 300, in this case the center thermocouple reading after subtraction of the steady-state value, are plotted versus time (measured in samples, where the sampling interval is a fixed time interval). A measure of fit is derived from curves 300 and 302. The curves shown have a mean-square-deviation of about 3.5, where a lower value indicates a better fit. Corresponding validation for the front, side, and rear zones should obtain substantially the same degree of fit.

Figure 10:
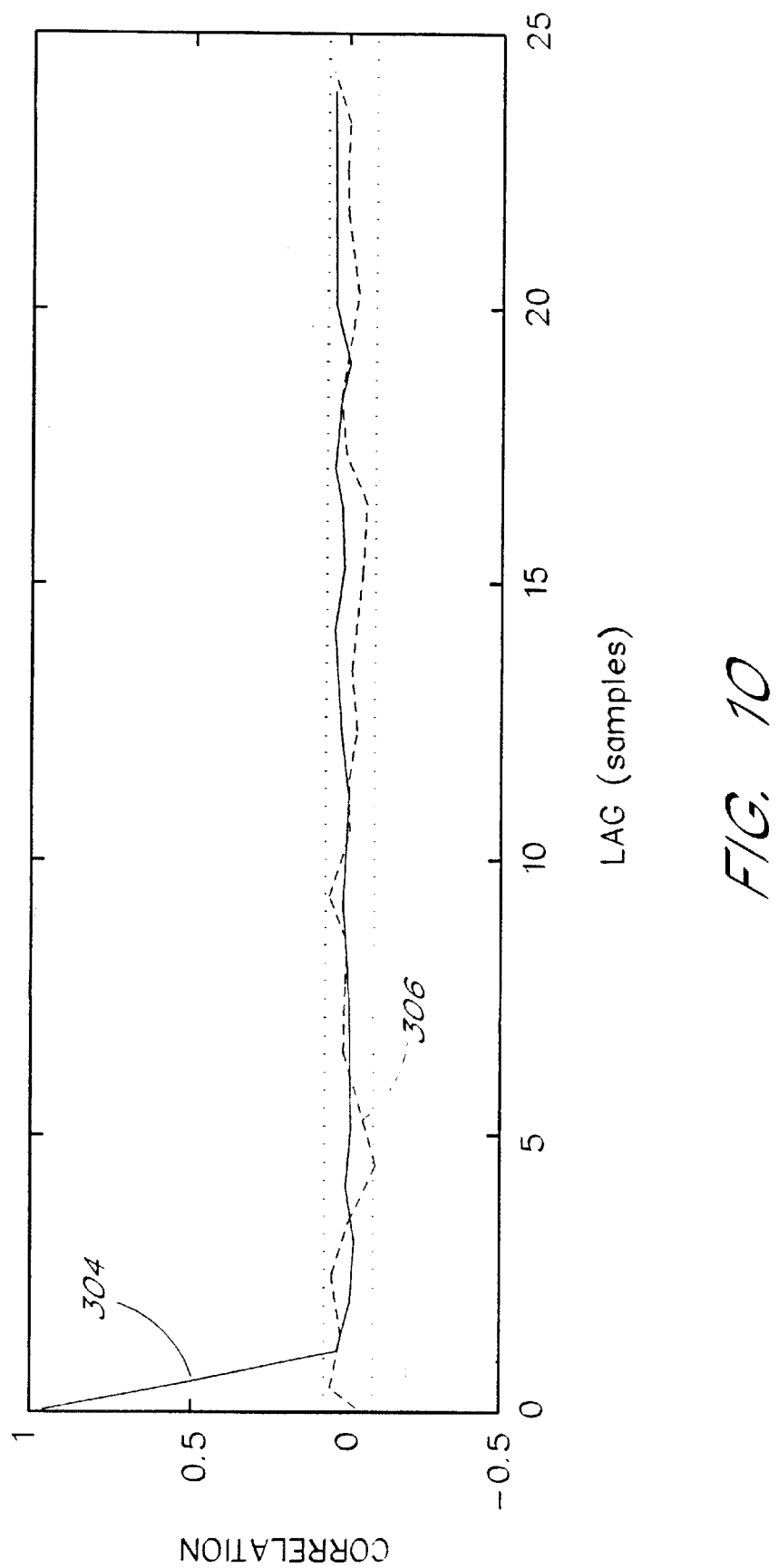
FIG. 10 illustrates an exemplary residual correlation for the system center zone input/output data set.

Residual analysis is used to check whether there is any structural information left unexplained by the model. Ideally, the residuals (difference between model predictions and system output) should be white or random with time and independent of the inputs for the model to correctly describe the system. The curve 304 in FIG. 10 shows the correlation function of the residual for the center zone output for time lags up to 25 sampling intervals. Dotted lines indicate 99% confidence limits, assuming the residuals are indeed white. Cross-correlation between system inputs and residuals should also show a zero mean with an RMS deviation staying well below the 99% confidence. Such behavior, as indicated by a curve 306 in FIG. 10, should be observed for all cross-correlated quantities, which indicates there is no significant systematic unaccounted input/output correlation.

Figure 11:
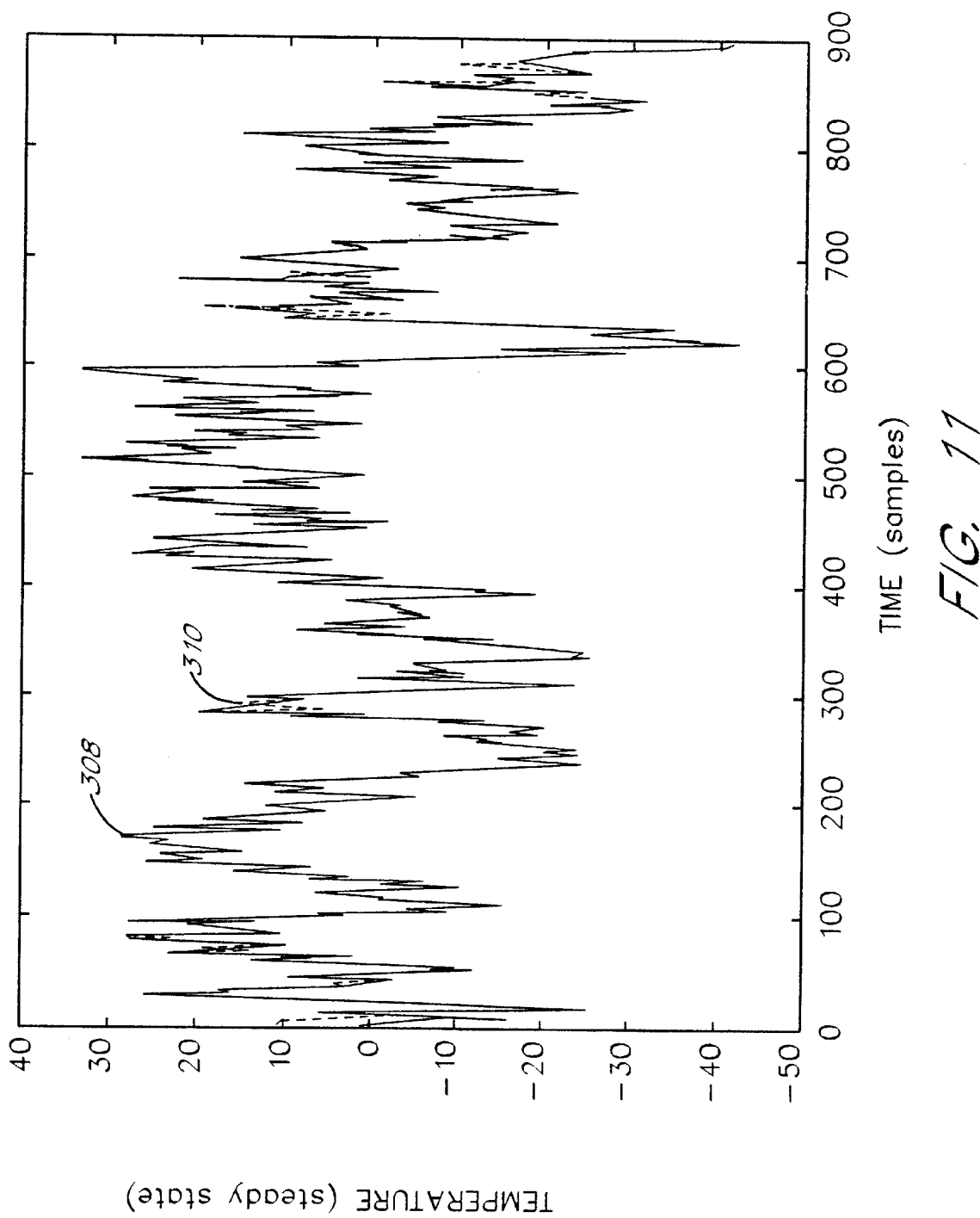
FIG. 11 illustrates an exemplary model prediction data set compared to system output data.

As a final test for the model validation, the model is used to predict thermocouple readings using information on past inputs and outputs. A fresh data set, as used in FIG. 9, is also used in the present comparison shown in FIG. 11. FIG. 11 shows the system output (center thermocouple) and the one-minute ahead predictions of the system output made using the model predictor. Notice that the predictive capabilities of the model are excellent. Prediction results for the front, side, and rear zones (not included) show similar behavior.

Using identification and verification techniques described herein, the model described above has been found to provide a very accurate description of system dynamics for an exemplary RTP reactor at atmospheric pressure and in a temperature range of 600–800° C. The ARMAX model is shown to have predictive capabilities particularly advantageous for the present preferred embodiment of a model-based predictive controller. The look-ahead feature of the model can be used, for instance, to minimize overshoot, thus improving recovery time and minimizing recipe cycle times. It will be appreciated that the precise form of the model can vary appreciably without departing from the spirit and scope of the present invention. In general, the model form will be dictated by demands on a variety of factors including flexibility, accuracy, sensitivity, robustness and speed. One alternative preferred embodiment is to reduce the model order for minimizing computational overhead, without significant loss of accuracy. Additional preferred embodiments comprise:

Extending the predictive controller to include adaptive behavior, whereby model parameters are themselves subject to real-time assessment and modification.

Utilizing constraint input optimization. The optimal control strategy (29) does not take into account constraints on input energy to the system (linearity assumption). This may lead to less-than-optimal behavior during fast heat-up and cool-down. This situation is improved by checking the proposed control moves for constraint violations. If a control move violates a constraint, it is set to the limit value and the remaining "free" future moves are recomputed. This process is iterative and ends when all future moves are at their limit value or an iteration no longer adds new constraint moves. This simple new technique is substantially easier to implement than the conventional quadratic programming solution.

Extending the linear model to a nonlinear model, preferably by utilizing neural networks to model the static gain (nonlinear) in series with the ARMAX model.

Reactor Testing

Figure 12A:
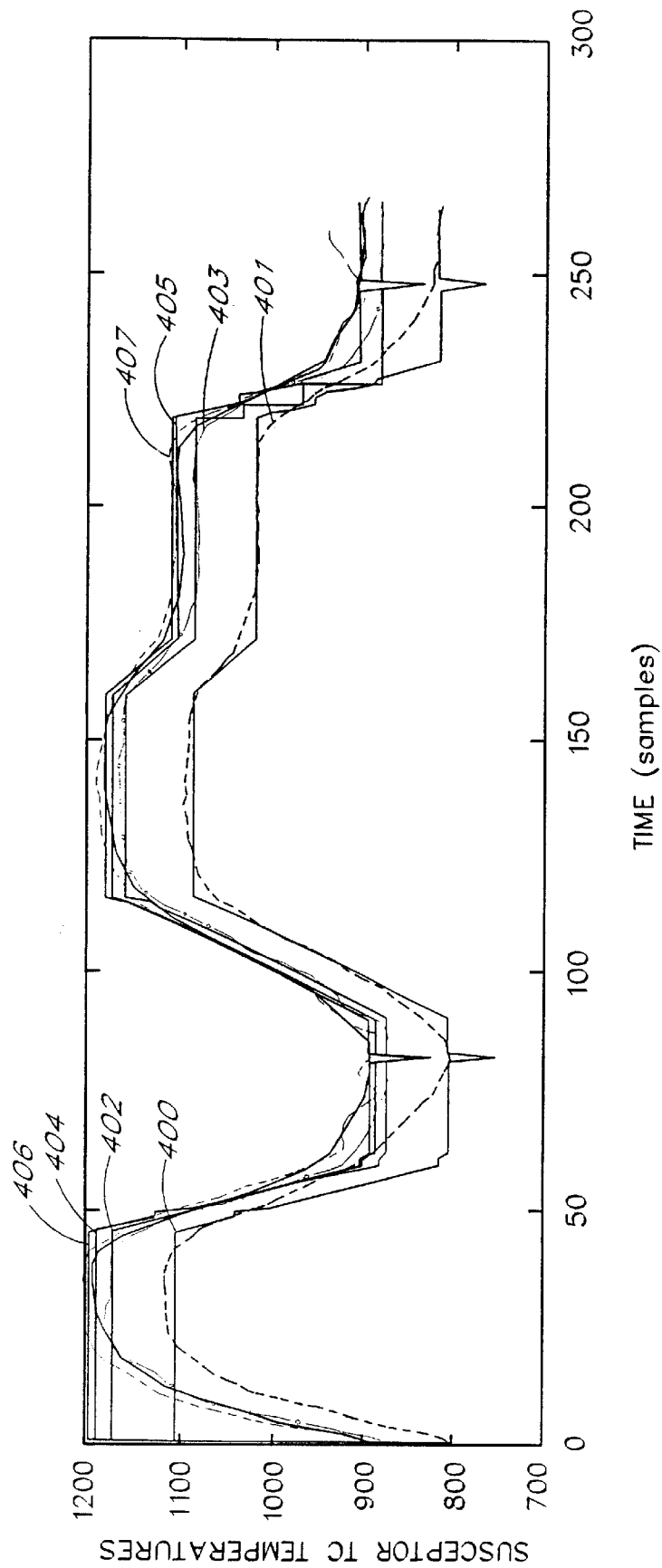
FIG. 12A illustrates an exemplary command sequence and output response for each reactor zone.
Figure 12B:
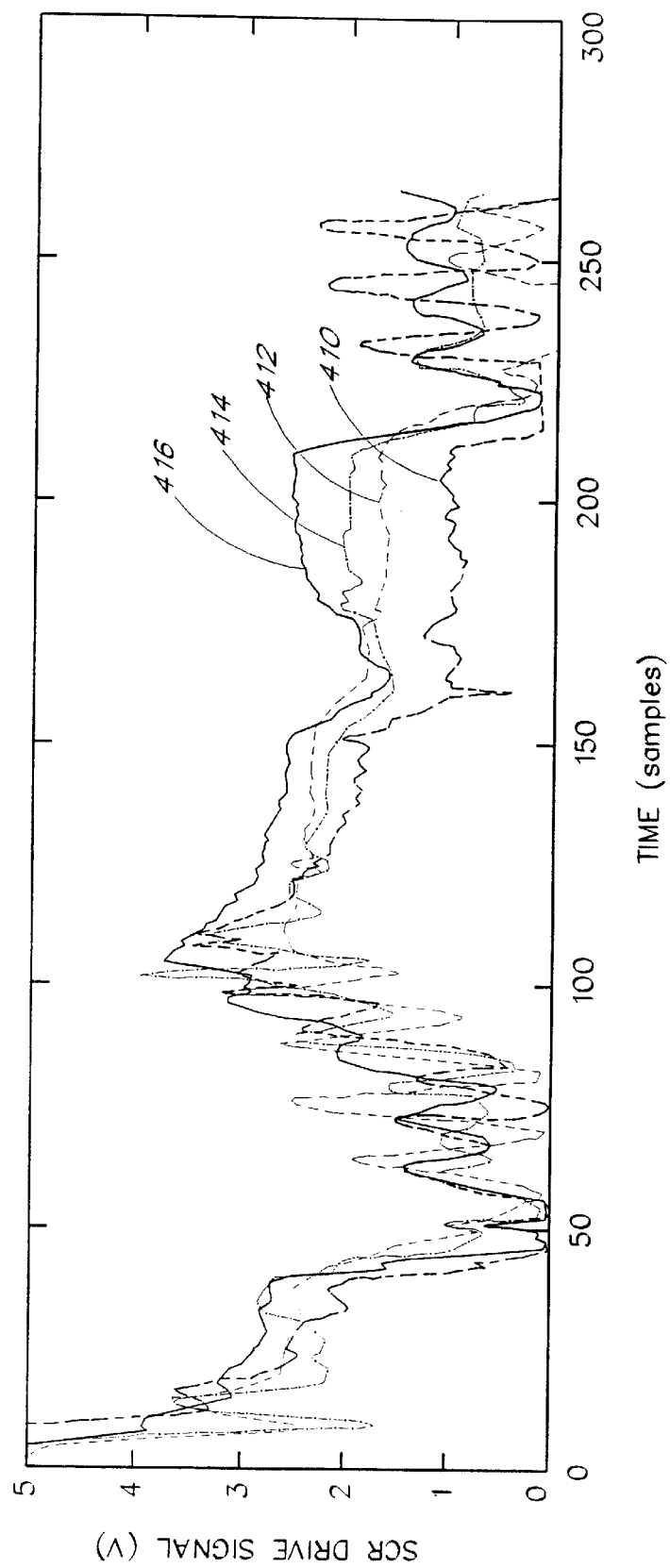
FIG. 12B illustrates an exemplary input response to the command sequence of FIG. 12A.

As previously seen, a preferred embodiment of the dynamic system model is capable of tracking and predicting the dynamic behavior of multiple heat zones within reactor 20. Likewise, a preferred multivariant temperature control system of the present invention is capable of maintaining a predetermined temporal sequence of temperatures for each heat zone of the reactor 20 as exemplified by FIG. 12A. The solid curves 400, 402, 404, 406 of FIG. 12A indicate the temperature set-point sequence to be followed by independent heat zones: center, side, front and rear respectively. The dashed curves 401, 403, 405 and 407 are the respective temperature profiles followed by the center, side, front and rear heat zones as a result of action by the temperature controller 170. Time lag between zones is substantially eliminated due to the predictive action by controller 170 operating on all zones in parallel. Furthermore, temperature differences between zones, as intentionally programmed in FIG. 12A, become a relatively simple matter of zone-to-zone offset control. As shown in FIG. 12B, the temperature controller 170 supplies the plurality of SCRs with drive signals appropriate for the respective heat zones at a given time. The curves 410, 412, 414 and 416 correspond to the center, side, front and rear SCR drive signals respectively. Thus, while the temporal setpoint sequence and actual temperature profile is qualitatively similar for each of the four heat zones (FIG. 12A), the SCR drive signals for each zone display very different behavior as determined by the temperature controller 170.

Figure 13A:
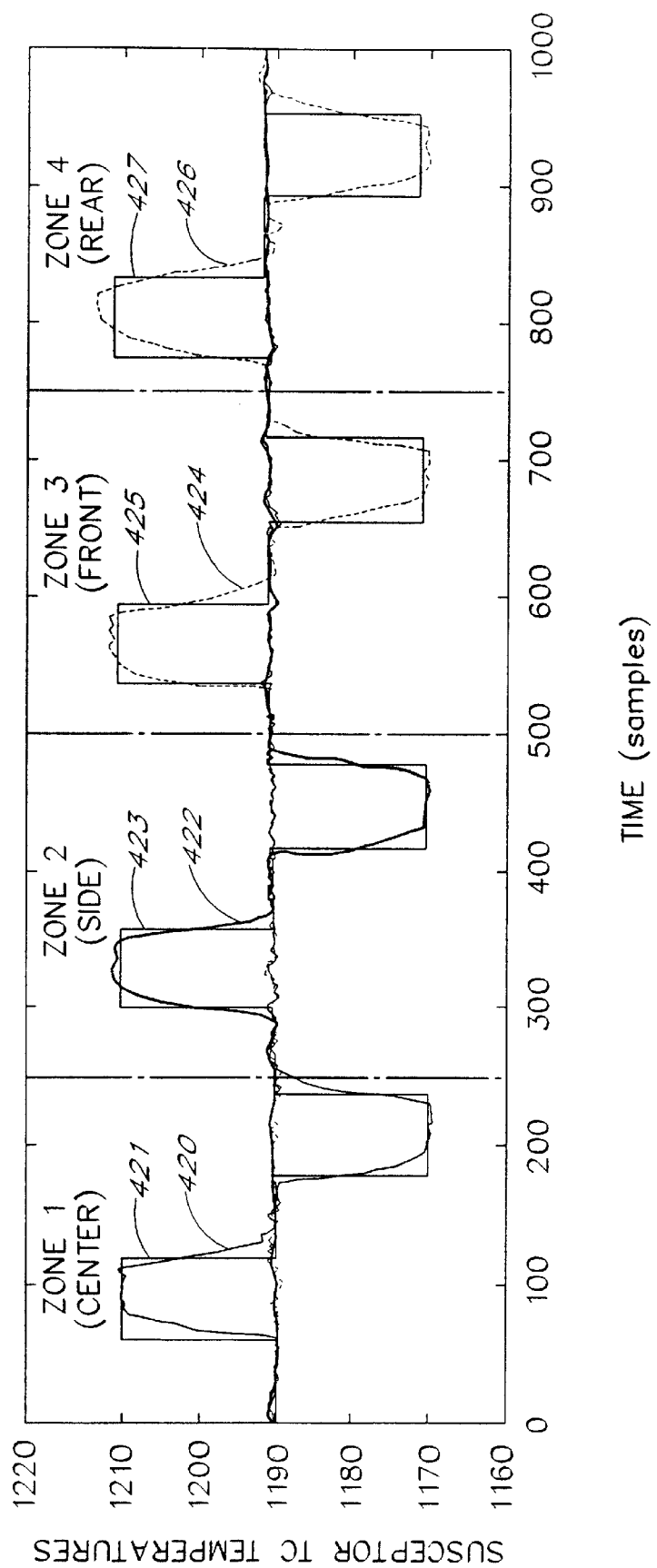
FIG. 13A illustrates exemplary data characterizing the tracking and response to each system output variable.
Figure 13B:
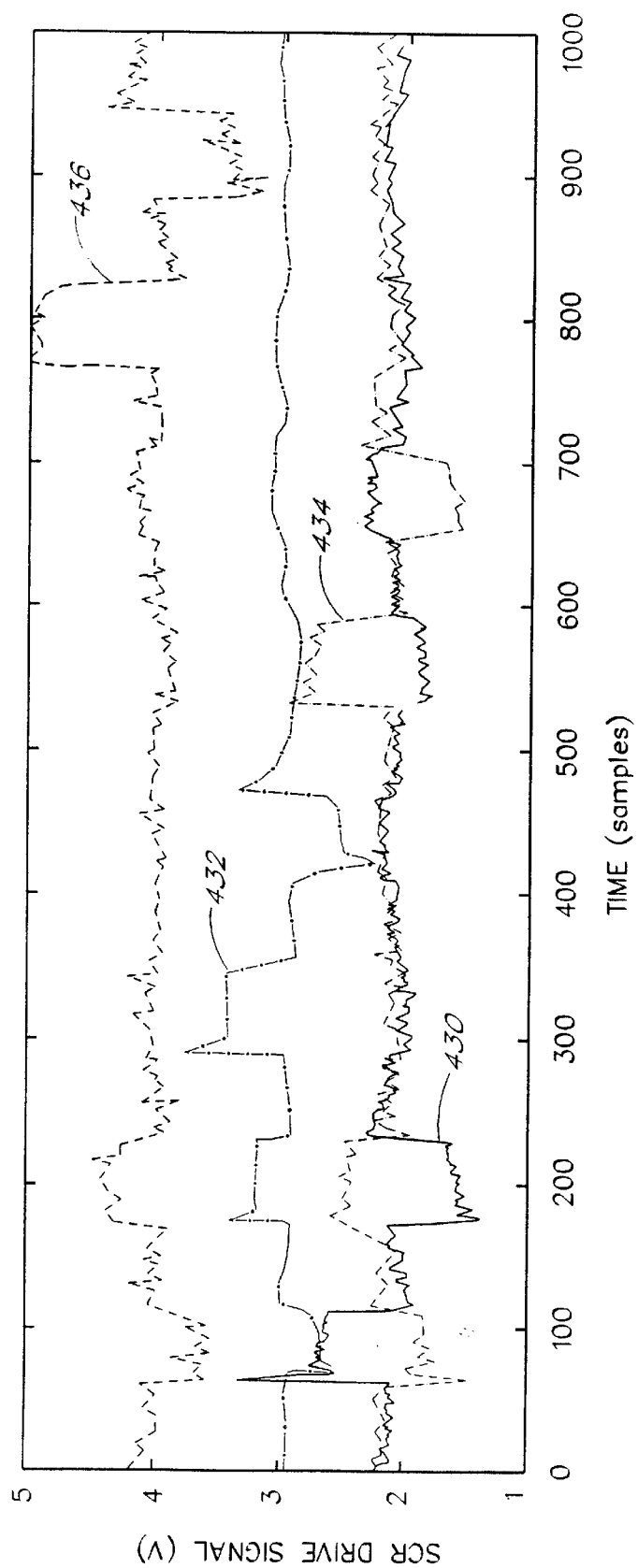
FIG. 13B illustrates exemplary data characterizing the tracking and response of each system input variable to the command sequence of FIG. 13A.

An exemplary demonstration of predictive control versatility is seen in FIG. 13A, wherein each zone separately is provided with a temperature step sequence, initially positive then negative. As seen in FIG. 13A, initially the center zone (1) is programmed for a positive temperature excursion, then a negative temperature excursion, followed in succession by the side (2), front (3) and rear (4) zones. The controller 170 provides the necessary control signals concurrently to all four zones such that each zone, independently, maintains the programmed temperature profile. Note that while a specific zone is ramped up or down, the other zone temperatures are substantially unchanged, indicating the substantially complete decoupling of heat zones as a result of the model-based predictive control. As shown in FIG. 13B, the exceptional temperature control displayed by the preferred embodiment is also manifest in the control signals. To account for the strong thermal coupling between zones, the controller compensates by driving each zone with a signal appropriate to maintain the prescribed temperature profile, both spatially and temporally. Evidently, the model-based predictive control system of the present invention, implemented in a rapid thermal process reactor, substantially optimizes process cycle time as well as spatial temperature uniformity.

Detailed Description of the Nonlinear and Neural Network Embodiments
Overview of Nonlinear RTP Process Control In yet another embodiment of model based-predictive controllers, the linear model disclosed above can be further enhanced by using a nonlinear model of the process reactor. A preferred method for implementing the nonlinear model involves the use of neural networks. A preferred embodiment of the neural network based nonlinear predictive controller is a Neural Extended Prediction control (NEPco) neural model based predictive controller for the susceptor temperature control of the ASMA reactor.

Figure 14A:
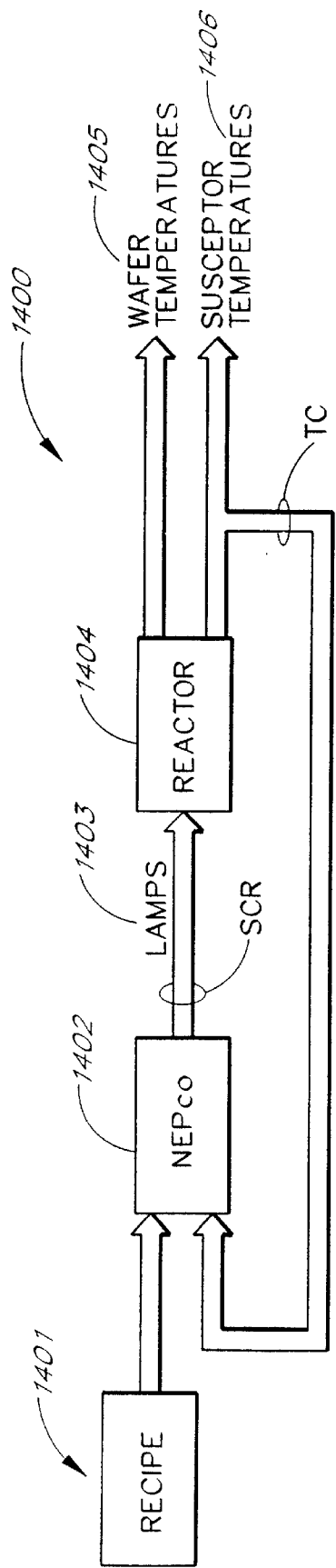
FIG. 14A is a block diagram that illustrates an overview of a fabrication system.

FIG. 14A is a block diagram that illustrates a fabrication system 1400. A recipe block 1401 provides input into a NEPco process block 1402. The NEPco process 1402 outputs control signals to one or more SCR's that operate one or more lamps 1403. The lamps 1403 provide heat to a reactor 20 which is represented by a reactor process block 1404. A group of unmeasurable outputs from the reactor process block 1404 are the wafer surface temperatures 1405. A group of measurable outputs from the reactor process block 1404 are the susceptor temperatures 1406. The susceptor temperatures are fed back into the NEPco process block 1402 to facilitate temperature control of the wafer 22 and the susceptor 24.

The temperature of the wafer surface is of major importance for the deposition process. However, the wafer temperature is not measured during normal operation. The only signals which are directly measured for control purposes are the susceptor temperatures. Experiments have indicated that these susceptor temperatures provide a reasonable approximation of the unknown wafer temperature distribution. Experimental results indicate that good susceptor control alone is not sufficient to obtain very tight wafer control.

The NEPco embodiment of the present invention discloses a procedure for improved control of the susceptor temperature signals 1406. This improvement provides the immediate benefits of improving the temperature control of the susceptor 24 and therefore the wafer 22, and it sets the stage for improvements using various models based on the soft sensor principle.

Figure 14B:
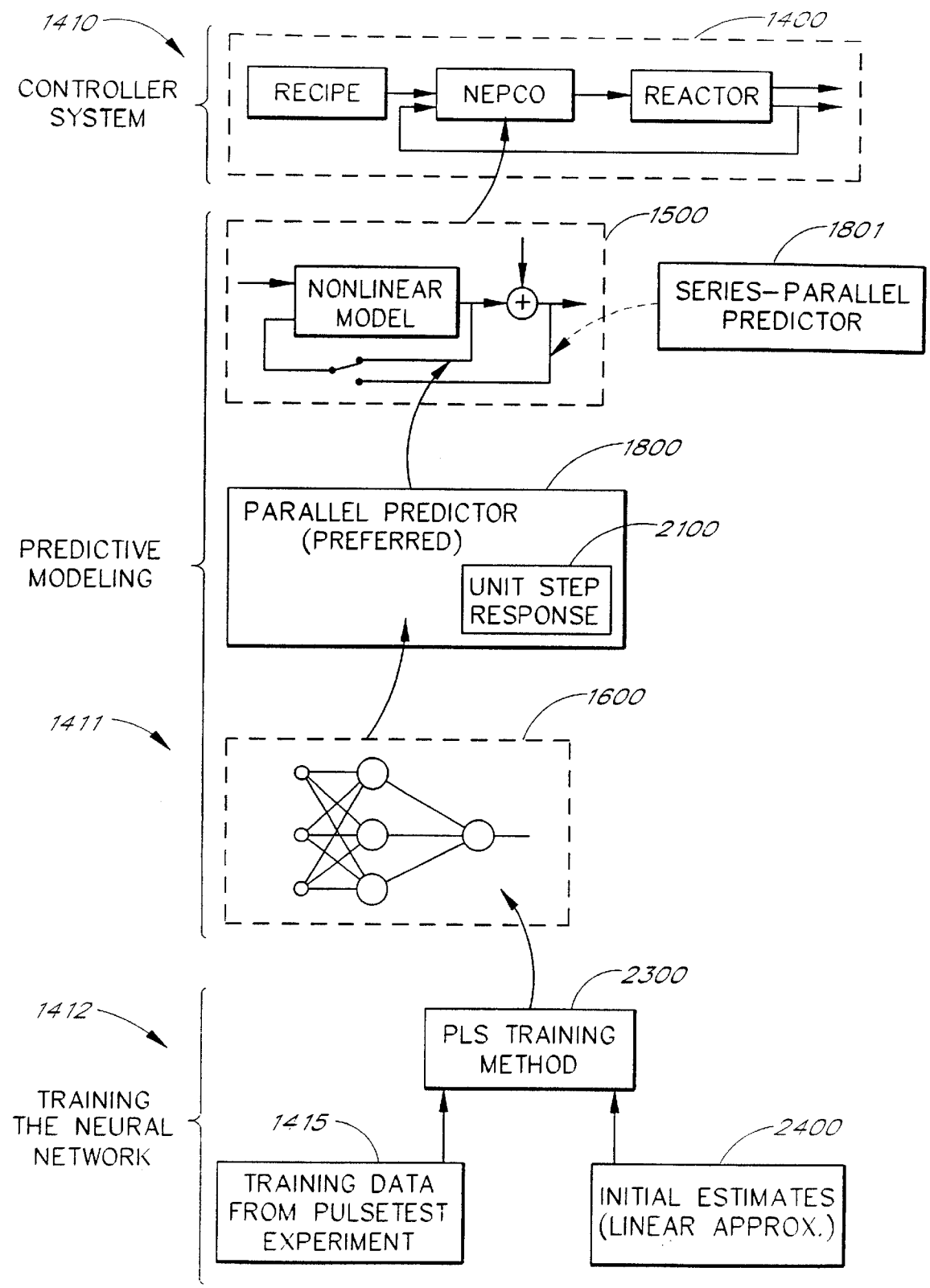
FIG. 14B is a block diagram that illustrates, in greater detail than FIG. 14A, the various hardware, software, and conceptual components of a fabrication system comprising a nonlinear, neural network based controller.

FIG. 14B illustrates an overview of the hardware, software, and conceptual components that comprise the system 1400. The reader is urged to refer back to FIG. 14B before reading each section below in order to place the section about to be read in context. FIG. 14B shows a three layer structure of elements that comprise the system 1400. Lower levels in the structure represent, at greater levels of detail, the internal elements of the upper layers. A controller system layer 1410 comprises the system 1400 and is the topmost level of the system 1400. Working downward, the next level is the predictive modeling level 1411 which comprises a predictor process 1500, a series parallel predictor 1801, a parallel predictor 1800, and a neural network 1600. The lowest of the three levels is a training layer 1412 which comprises a pseudo least squares (PLS) block 2300, a pulsetest experiment block 1900, and an initial estimate block 2400.

Returning to the predictive modeling layer 1411, the predictor process 1500 is shown as being part of the NEPco process block 1402. The series-parallel predictor 1801 and the parallel predictor 1800 are shown as being different implementations of the predictor process 1500. A unit step response 2100 is shown as being an internal component of the parallel-predictor 1800. The neural network 1600 is shown as being a part of the parallel predictor 1800.

Returning to the training layer, the PLS training method block 2300 is shown as applying to the neural network 1600. The pulsetest experiment block 1900 and the initial estimate block 2400 are shown as being inputs to the PLS training method block 2300.

The Nonlinear Process Model

Figure 15:
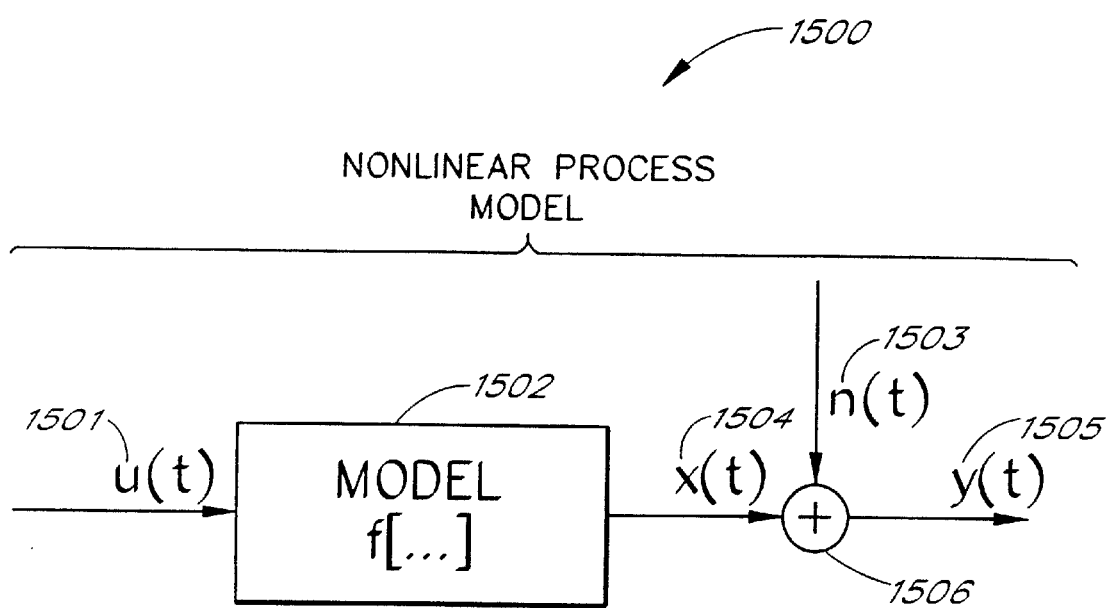
FIG. 15 illustrates a block diagram of the nonlinear process model.

FIG. 15 illustrates a block diagram of the nonlinear process model 1500. A process input u(t) 1501 is the sole input to a model process block 1502. The process input 1501 appears in the equations as u(t) and is typically a voltage to the lamp driver SCRs. The model process block 1502 exhibits a nonlinear transfer function $f(\ldots)$. A model output x(t) 1504 is an output of the process block 1502. The model output x(t) 1503 appears in the equations that follow as x(t) and is typically a temperature expressed in ° C. The model output x(t) 1503 and a process disturbance n(t) 1503 are added together at a summing junction 1506. The output of the summing junction 1506 is a process output y(t) 1505. The process disturbance 1503 is expressed in the equations that follow as n(t) and is typically expressed as a temperature in ° C. The process output 1505 is expressed in the equations that follow as y(t) and is typically the susceptor temperature measurements expressed as a temperature in ° C. Thus, as shown in FIG. 15, the process output 1505 can be expressed mathematically as $y(t)=x(t)+n(t)$.

The process disturbance n(t) 1503 includes all effects in the process output y(t) 1505 which do not come from the model output x(t) 1504. The process disturbance n(t) 1503 is a fictitious (unmeasurable) signal which includes such disturbance effects as deposition, gas flow, measurement noise, model errors, etc. These disturbances typically have a stochastic character with nonzero average value. The disturbances can usually be modeled by a colored noise process given by:

$$n(t) = \frac{C(q^{-1})}{D(q^{-1})} e(t) \qquad (31)$$

where:

e(t)=white noise (uncorrelated noise with zero mean value)

$$C(q^{-1}) = 1 + c_1 q^{-1} = \ldots + c_{n_c} q^{-n_c} \qquad (32)$$

$$D(q^{-1}) = 1 + d_1 q^{-1} + \ldots + d_{n_d} q^{-n_d}$$

As in the linear case, $q^{-1}$ is the backward shift operator where $q^{-n}s(t)=s(t-n)$ and s(t) is a time-dependent signal were t denotes a discrete time index (t=0, 1, 2, ...). The filter $C(q^{-1})/D(q^{-1})$ is a disturbance model. While many acceptable disturbance models are possible, in the preferred embodiment for the ASMA application it has the structure:

$$\frac{C(q^{-1})}{D(q^{-1})} = \frac{(1+cq^{-1})^2}{(1+dq^{-1})(1-q^{-1})}$$

where c and d are design parameters (preferred values are: c=d=0).

The model output x(t) 1504 represents the effect of the power input u(t) 1501 on the susceptor (thermocouple) temperature. This is an unmeasurable signal, as only the combined effect of control action plus disturbances is measurable via the thermocouple sensors 44, 46, 48, and 50.

The relationship between the input u(t) and the output x(t) is a dynamic relationship in that the present temperature x(t) does not depend on the present input u(t), but on the previous temperatures {x(t-1), x(t-2), ... } and the previous inputs {u(t-1), u(t-2), ... }. Moreover, experimental measurements show that for a typical ASMA reactor, the relationship between u(t) and x(t) is also strongly nonlinear. For example, in one experiment the effect of a specific power input variation on the resulting temperature was found to be quite different around 800° C. as compared to 1100° C. These temperatures are by way of example only since different reactors will exhibit different properties.

The effect u(t)→x(t) can thus be represented by a nonlinear dynamic model where the transfer function $f[\ldots]$ 1502 is an unknown nonlinear function, such that:

$$x(t) = f[x(t-1), x(t-2), \ldots, u(t-1), u(t-2), \ldots].$$

In the preferred embodiment, the function $f[\ldots]$ is implemented as a neural network.

Figure 16:
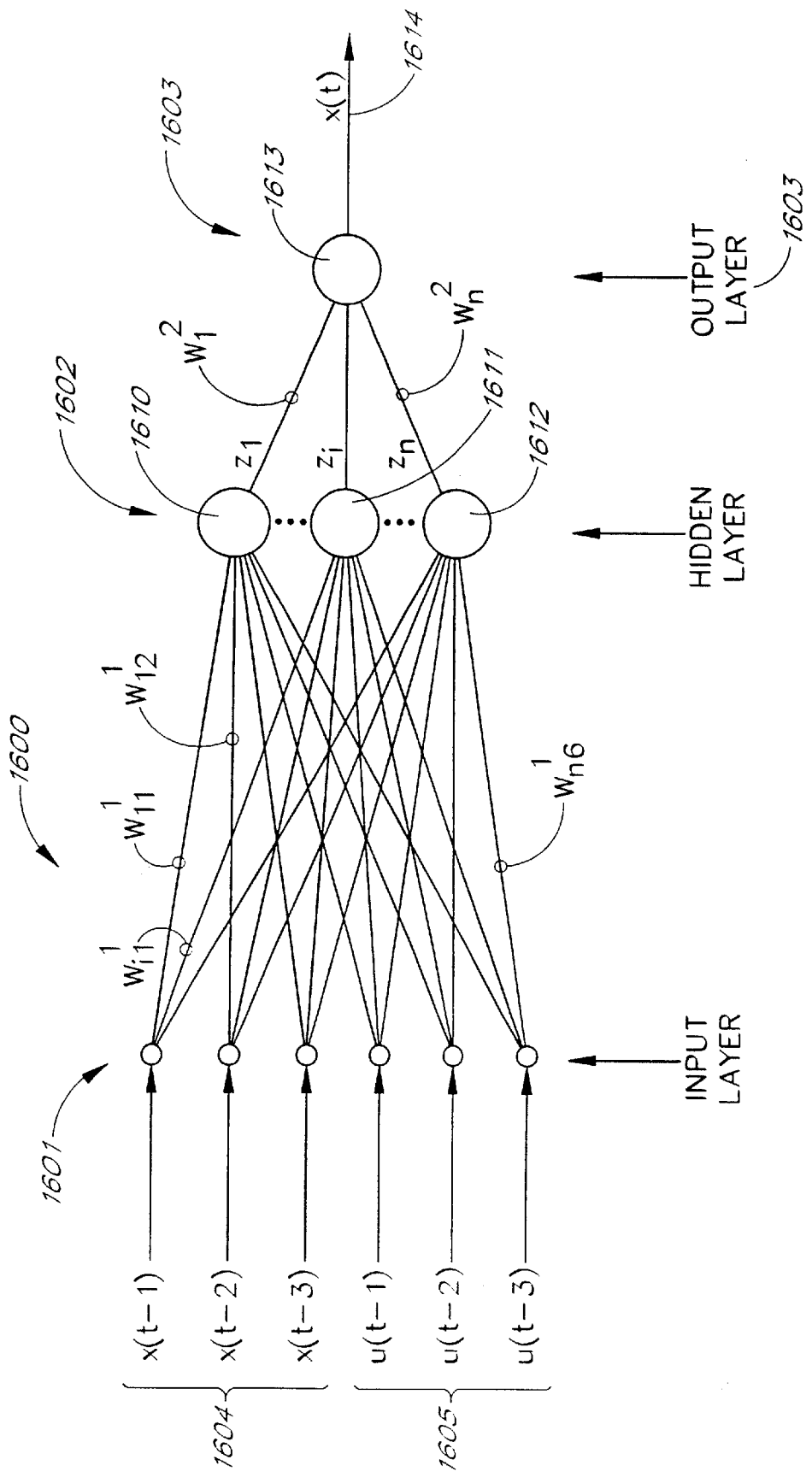
FIG. 16 illustrates a typical typical neural network.

FIG. 16 illustrates a typical typical neural network. In FIG. 16, the set of past model outputs 1604 {x(t-1), x(t-2), ... } and the set of past model inputs {u(t-1), u(t-2), ... } are shown as inputs to a layer of input neurons 1601. The input neurons 1601 are connected to a layer of hidden neurons 1602 such that every one of the input neurons 1601 is connected to every one of the hidden neurons 1602. The hidden layer 1602 contains three hidden neurons 1610, 1611, and 1612. The hidden neurons 1602 have outputs labeled $z_1 \ldots z_i \ldots z_n$ such that $z_1$ is the output of the first hidden neuron 1610 and $z_n$ is the output of the last hidden neuron 1612. The connections between the input neurons 1601 and the hidden neurons 1602 are labeled $w_{ij}^{[1]}$ where i indicates the hidden neuron having the output $z_i$ and j indicates which of the input neurons 1601 is being connected. The superscript [1] indicates the connection starts from the first layer of neurons. All of the hidden neurons 1602 are connected to an output neuron 1613 by connections labeled $w_i^{[2]}$ where i indicates the hidden neuron output $z_i$ that is being connected to the output neuron 1613. The superscript [2] indicates the connections from the second layer of neurons of neurons.

The input neurons 1601 are non-active neurons in that the neurons do not perform any computation, they only distribute the input signals to the hidden neurons 1602. In the preferred embodiment of the ASMA application, a third order model is used, meaning the six input neurons 1601 corresponding to the three previous values of x(t), namely x(t-1), x(t-2) and x(t-3), and the three previous values of u(t), namely u(t-1), u(t-2), and u(t-3), are provided as inputs to the input layer 1601.

The hidden layer preferably contains nonlinear sigmoid-type neurons. Sigmoid neurons are well known in the art (see e.g., James A. Freeman and David M. Skapura, "Neural Networks" Addison Wesley, 1991). The hidden neuron outputs $z_i$ are computed as follows:

$$z_i = s(W_i^{[1]} \cdot I + b_i^{[1]}).$$

Where I is an input vector given by:

$$I = [x(t-1) x(t-2) x(t-3) u(t-1) u(t-2) u(t-3)]^T$$

and $W_i^{[1]}$ is a weight vector given by:

$$W_i^{[1]} = [w_{i1}^{[1]} w_{i2}^{[1]} w_{i3}^{[1]} w_{i4}^{[1]} w_{i5}^{[1]} w_{i6}^{[1]}].$$

Figure 22:
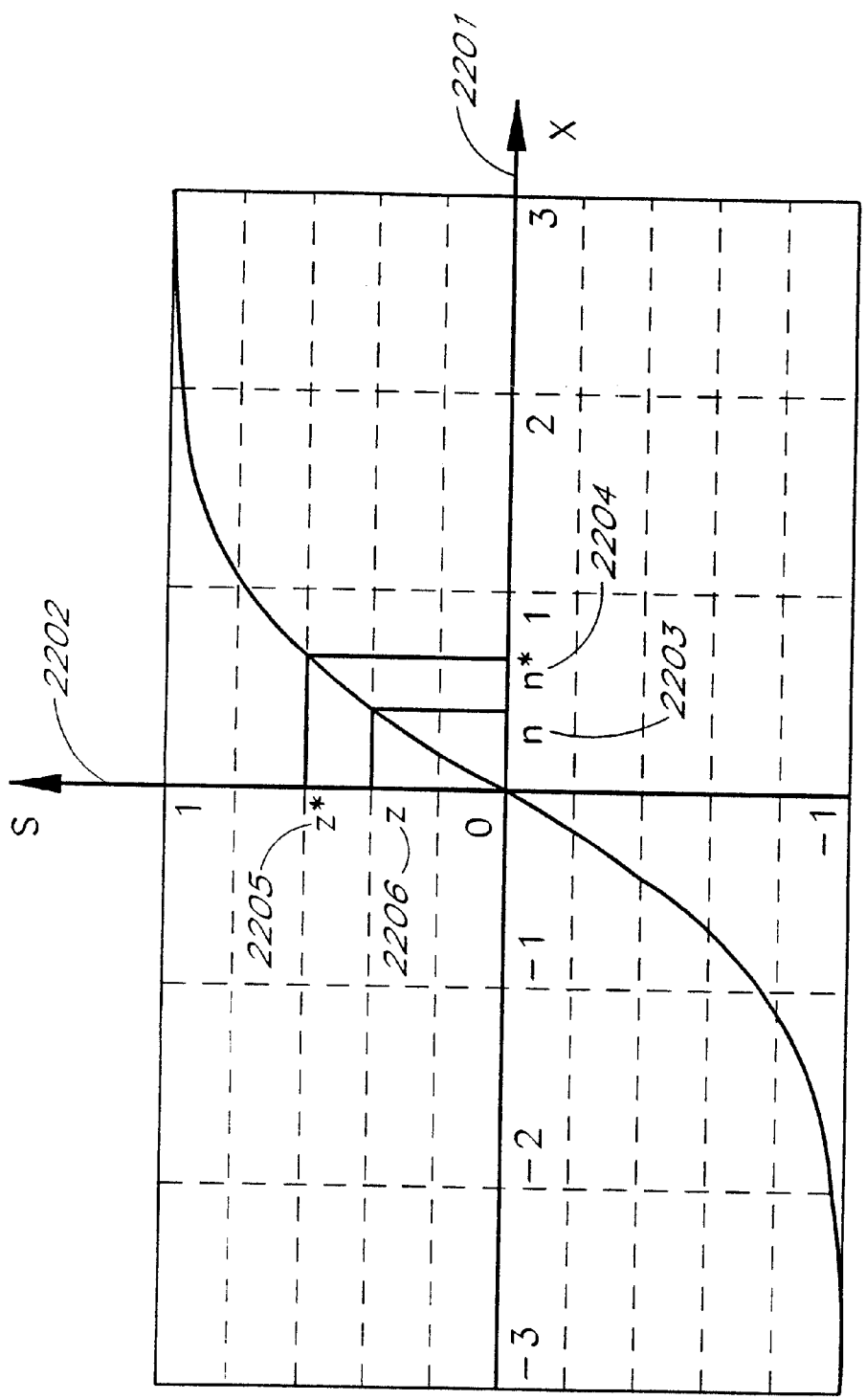
FIG. 22 illustrates the sigmoid function used in the neural network of FIG. 16.

The function s(x) is a sigmoid function shown graphically in FIG. 22 and given mathematically by the equation:

$$s(x) = \frac{1 - e^{-2x}}{1 + e^{-2x}} = \frac{2}{1 + e^{-2x}} - 1.$$

The parameters in the weight vectors $W_i^{[1]}$(i=1 ... n) and the biases $b_i^{[1]}$(i=1 ... n) are unknown and must be estimated from experimental data during the training of the neural net. The biases $b_i^{[1]}$ are used to compensate for an offset in the process model. The offset arises from the fact that, in reality, the output x(t) is not necessarily zero when the input u(t) is zero.

Figure 19:
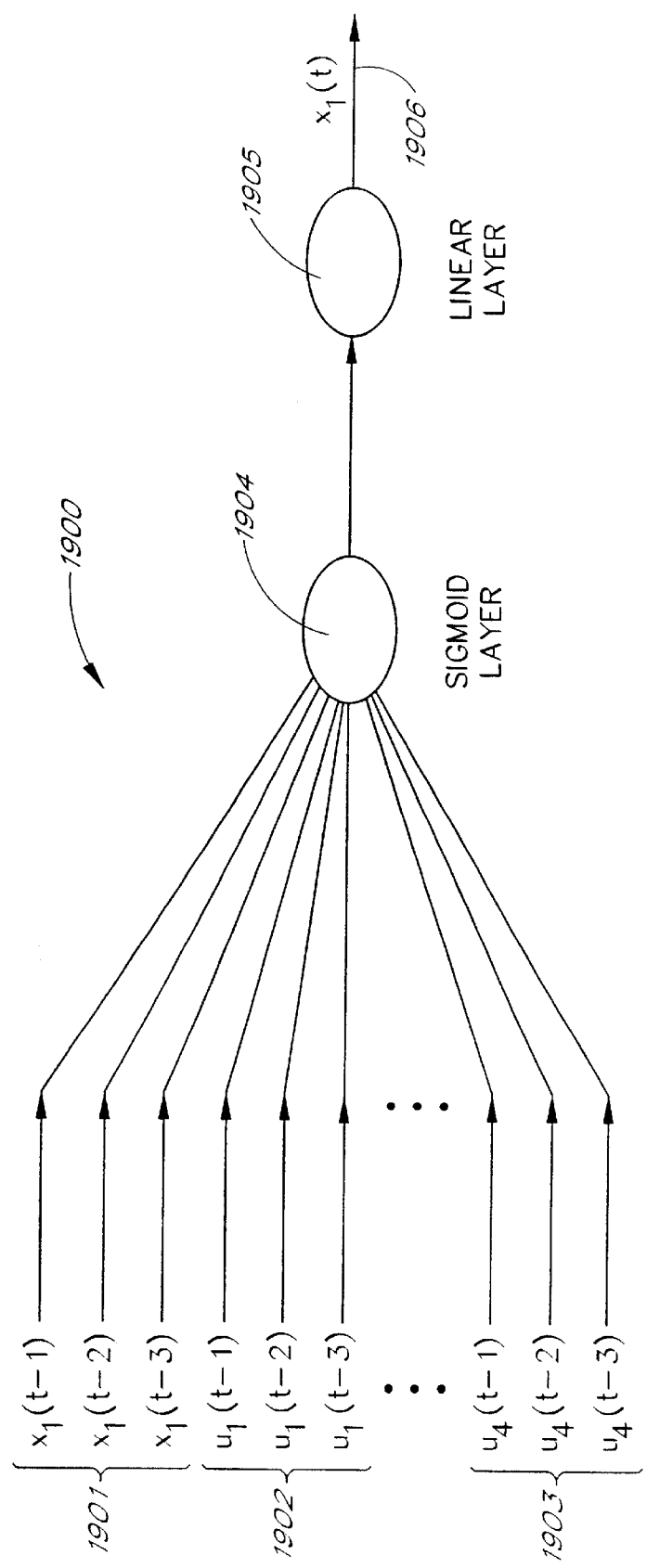
FIG. 19 illustrates a simple neural network having one hidden neuron.

FIG. 19 shows a simple neural network 1900. The simple neural network 1900 comprises a single hidden neuron 1904 of the sigmoid type. The hidden neuron 1904 has a group of inputs 1901 comprised of model outputs $x_1(t-1)$, $x_1(t-2)$, and $x_1(t-3)$. The hidden neuron 1904 also has a group of model inputs 1902 comprised of model inputs $u_1(t-1)$, $u_1(t-2)$, and $u_1(t-3)$. The hidden neuron 1904 also has a group of model inputs 1903 comprised of model inputs $u_4(t-1)$, $u_4(t-2)$, and $u_4(t-3)$. FIG. 19 further illustrates that the hidden neuron 1904 has inputs comprised of model inputs $u_2(t-1)$, $u_2(t-2)$, $u_2(t-3)$, $u_3(t-1)$, $u_3(t-2)$, and $u_3(t-3)$. An output of the hidden neuron 1904 feeds a linear output neuron 1905. The neural network 1900 has a single output $x_1(t)$ 1906.

The most simple neural net has only one neuron in the hidden layer 1602 (n=1) and thus only one output $z_1$. It was found experimentally that the simple neuron network 1900 (where n=1) is a good choice for the ASMA application: Additional hidden neurons provide improvement of the control performance, but the computational load and the modeling effort both increase dramatically.

The output layer contains the single linear output neuron 1613. The output of the output neuron 1613 is computed as follows:

$$x = W^{[2]} \cdot Z + b^{[2]}$$

where $$Z = [z_1 z_2 \ldots z_i \ldots z_n]^T \tag{33}$$

and $$W^{[2]} = [w_1^{[2]} w_2^{[2]} \ldots w_i^{[2]} \ldots w_n^{[2]}]$$

For the ASMA application with only one neuron in the hidden layer (n=1), equation (33) reduces to $$x = w^{[2]} z + b^{[2]}$$

The weight and bias of the output neuron should be identified together with those of the hidden-layer neuron. In fact, all of the weight and bias parameters together constitute the model of the unknown process dynamics.

The Nonlinear Multistep Predictor

As in the linear case, the notation y(t+k|t) denotes the predicted value of y(t+k) at time t, for k=1 ... $N_2$ where $N_2$ is the prediction horizon,. Thus, y(t+k|t) is based on:

measurements available at time t, i.e., {y(t), y(t−1), ..., u(t−1), u(t−2), ... }; and future (postulated) values of the input {u(t|t), u(t−1|t), ... }.

In other words, the notation ( ... |t) means 'postulated at time t'. Using the process model 1500, from FIG. 15, it follows that:

$$y(t+k|t) = x(t+k|t) + n(t+k|t)$$

The Method

Of the many possible configurations known in the art for recursion of a nonlinear network model, the two most preferred configurations for modeling the ASMA reactor are a parallel model and a series-parallel model. There is no requirement that the nonlinear model 1502 be based upon a neural network. However, the preferred embodiment uses a neural network. For convenience and clarity of presentation herein, the model will assumed to be implemented using neural network, with the understanding that other (non-neural network) implementations are possible.

Figure 17A:
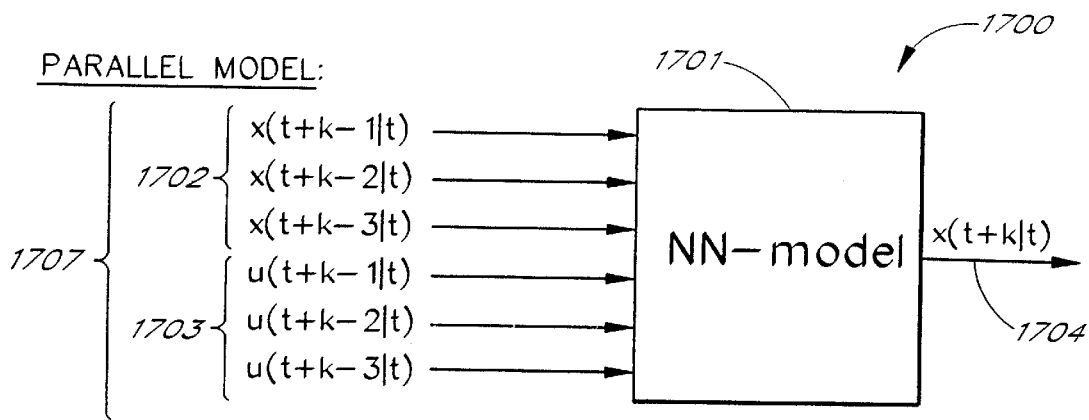
FIG. 17A is a block diagram of the parallel model network.
Figure 17B:
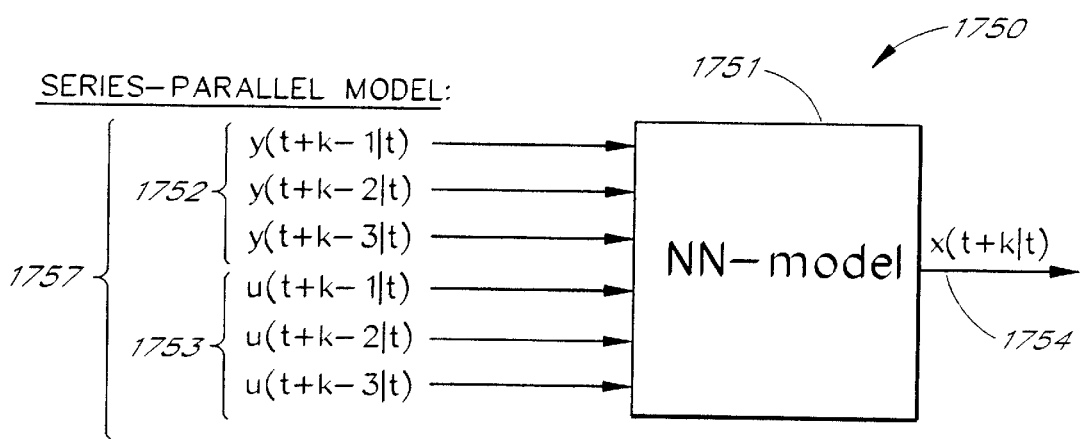
FIG. 17B is a block diagram of the series-parallel model network.

FIGS. 17A and 17B show block diagrams of two common recursion networks. FIG. 17A is a block diagram of the parallel model network. In FIG. 17A, the model 1701 is shown as a neural network (NN) process block with an input vector 1707 and a single output x(t+k)|t) 1704. The input vector 1707 has a group of inputs 1702 comprising model outputs 1504. The model outputs 1504 comprise (x(t+k−1|t), x(t+k−2|t), and x(t+k−3|t). The input vector 1707 has a group of process inputs 1703 comprising process inputs 1501. The inputs 1501 comprise (u(t+k−1|t), u(t+k−2|t), and u(t+k−3|t). FIG. 17B shows the series-parallel model neural network as an NN-block 1751, which is a process block with an NN-input vector 1757 and a single output x(t+k)|t) 1754. The NN-input vector 1757 has a group of inputs 1752 comprising process outputs 1505. The inputs 1505 comprise (y(t+k−1|t), y(t+k−2|t), and y(t+k−3|t). The NN-input vector 1757 also has a group of inputs 1702 comprising process inputs u(t+k−1|t), u(t+k−2|t), and u(t+k−3|t).

The parallel model, also known in the art as the independent model, preferably should be used only for stable processes. The series-parallel model can also be used for unstable processes. To obtain similar control performance with both models, the disturbance model $C(q^{-1})/D(q^{-1})$ should be chosen differently. Both models are useful for the the ASMA application; however, the parallel model is preferred and so it is described in greater detail herein.

The Parallel Model: Prediction of x(t+k|t)

At each sampling instant t, the recursion is started with k=0 and x(t|t) is computed using the NN input vector 1707 [x(t−1) x(t−2) x(t−3) u(t−1) u(t−2) u(t−3)], which contains values from the past, thus known at time t. Notice that x(t)≡x(t|t) and that this value can be saved in the database for further use at future sampling instants.

Then for k=1, the previously computed x(t|t) is used at the NN input to compute x(t+1|t), etc. Notice that x(t+1)≠x(t+1|t), but x(t+1)≡x(t+1|t+1). The value x(t+1|t) can thus be discarded after time t. The recursion is restarted at each sampling instant, because x(t+k|t+1)≠x(t+k|t) for k>0. Indeed, x( ... |t+1) is computed based on information available and postulated at time t+1 while x( ... |t) is based on information that was available and postulated at time t. This information is different, as the knowledge base is updated at every sampling instant with new information coming from the sensor data.

The Parallel Model: Prediction of n(t+k|t)

At time t, using the data [x(t−1), x(t−2), x(t−3), u(t−1), u(t−2), u(t−3)], x(t) is computed using the NN-model 1701. Using the measured value y(t), the current value of the disturbance n(t) 1503 is computed using the process model: n(t)=y(t)−x(t). Notice that the previous values of n(t), namely {n(t−1), n(t−2), ... } are available in the computer memory.

The filtered disturbance signal $$n_f(t) = \frac{D(q^{-1})}{C(q^{-1})} n(t)$$

is computed using the difference equation:

$$n_f(t) = -c_1 \cdot n_f(t-1) - c_2 \cdot n_f(t-2) - \ldots + n(t) + d_1 \cdot n(t-1) + d_2 \cdot n(t-2) + \ldots$$

Since the disturbance model is:

$$n(t) = \frac{C(q^{-1})}{D(q^{-1})} e(t)$$

then the signal $n_f(t) = e(t)$. As white noise is, by definition, uncorrelated, the best prediction of the white noise is the mean value, which is zero. Thus:

$$n_f(t+k|t) \equiv 0, \; k=1 \ldots N_2$$

The best prediction of the disturbance is obtained from:

$$n(t+k|t) = \frac{C(q^{-1})}{D(q^{-1})} n_f(t+k|t)$$

which can be computed using the difference equation:

$$n(t+k|t) = -d_1 \cdot n(t+k-1|t) - d_2 \cdot n(t+k-2|t) - \ldots + n_f(t+k|t) + c_1 \cdot n_f(t+k-1|t) + c_2 \cdot n_f(t+k-2|t) + \ldots$$

The recursion goes from k=1 ... $N_2$. The recursion starts with k=1. The signal values in the right-hand side, namely n(t|t), n(t−1|t), ..., $n_f(t|t)$, $n_f(t-1|t)$, ... are known, while $n_f(t+1|t)=0$. The computed value n(t+1|t) is then used in the right-hand side, together with $n_f(t+2|t)=0$ in order to compute n(t+2|t), etc.

The Algorithms

Figure 18:
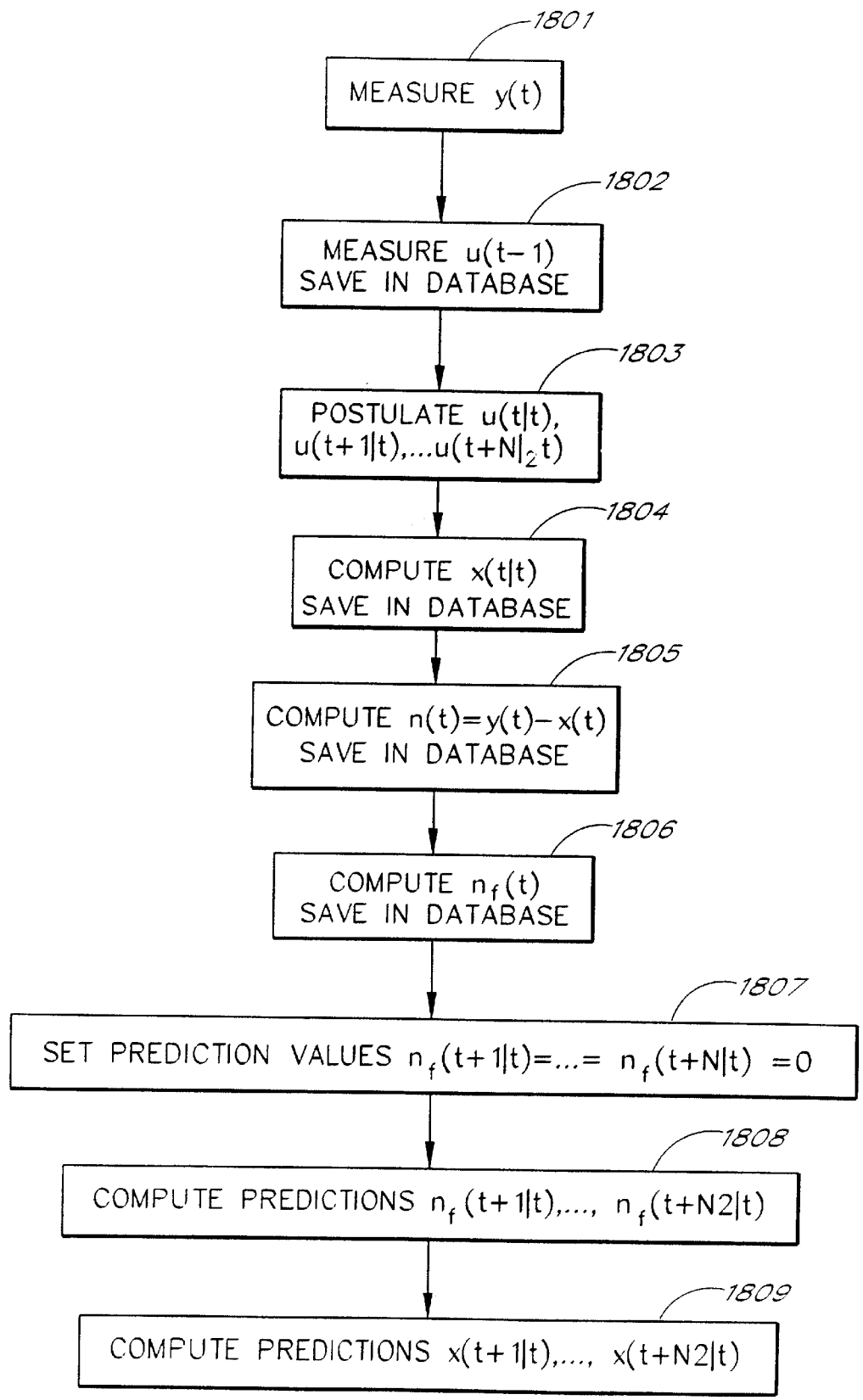
FIG. 18 is a flowchart that illustrates the process for computing a new set of predictions for n(t+k|t), u(t+k|t), and y(t+k|t) at each time-step t.

FIG. 18 is a flowchart that illustrates the process for computing a new set of predictions for n(t+k|t), u(t+k|t), and y(t+k|t) at each time-step t.

(1) Measure y(t) at a process block 1801 and store the data in a database containing {y(t), y(t−1), . . . }.

(2) Measure u(t−1) at a process block 1802 and store in a database containing {u(t−1), u(t−2), . . . }.

(3) Postulate a future control policy {u(t|t), u(t+1|t), . . . , u(t+N$_2$|t)} in a process block 1803.

(4) In a process block 1804, compute the current model output x(t):

$$x(t|t) = s(W^{[1]} \cdot I + b^{[1]}) \cdot w^{[2]} + b^{[2]}$$

where s( . . . ) denotes the sigmoid function;

$$I = [x(t-1) x(t-2) x(t-3) u(t-1) u(t-2) u(t-3)]^T;$$

and $$W^{[1]} = [w_1^{[1]} w_2^{[1]} w_3^{[1]} w_4^{[1]} w_5^{[1]} w_6^{[1]}], b^{[1]}, w^{[2]}, b^{[2]}$$

are the NN weight and bias parameters. Notice that x(t|t) is not really a prediction because it depends only on past values and not on the future control inputs, so x(t|t)≡x(t). The value x(t|t) is saved in a database containing {x(t), x(t−1), x(t−2), . . . } because it is used again at the next sampling instant.

(5) Compute n(t)=y(t)−x(t) in a process block 1805 and save the value in a database containing {n(t), n(t−1), n(t−2), . . . }.

(6) In a process block 1806, compute the filtered disturbance signal n$_f$(t) from:

$$n_f(t) = -c_1 \cdot n_f(t-1) - c_2 \cdot n_f(t-2) - \ldots + n(t) + d_1 \cdot n(t-1) + d_2 \cdot n(t-2) + \ldots$$

and save in a database containing {n$_f$(t), n$_f$(t−1), n$_f$(t−2), . . . }.

(7) In a process block 1807, reset the prediction values $$n_f(t+1|t) = n_f(t+2|t) = \ldots = n_f(t+N_2|t) = 0.$$

(8) In a process block 1808, compute the predictions n(t+1|t), n(t+2|t), . . . , n(t+N$_2$|t) from:

$$n(t+1|t) = -d_1 \cdot n(t) - d_2 \cdot n(t-1) - \ldots + n_f(t+1|t) + c_1 \cdot n_f(t) + c_2 n_f(t-1) + \ldots$$

$$n(t+2|t) = -d_1 \cdot n(t+1|t) - d_2 \cdot n(t) - \ldots + n_f(t+2|t) + c_1 \cdot n_f(t+1|t) + c_2 \cdot n_f(t) + \ldots$$

$$n(t+N_2|t) = -d_1 \cdot n(t+N_2-1|t) - d_2 \cdot n(t+N_2-2|t) - \ldots + n_f(t+N_2|t) + c_1 \cdot n_f(t+N_2-1|t) + c_2 \cdot n_f(t+N_2-2|t) + \ldots$$

(9) In a process block 1809, compute the predictions x(t+1|t), x(t+2|t), . . . , x(t+N$_2$|t) from:

$$x(t+1|t) = s(W^1 \cdot I + b^1) w^{[2]} + b^{[2]}$$

with $$I = [x(t) x(t-1) x(t-2) u(t|t) u(t-1) u(t-2)]^T$$

$$x(t+2|t) = s(W^1 \cdot I + b^1) w^{[2]} + b^{[2]}$$

with $$I = [x(t+1|t) x(t) x(t-1) u(t+1|t) u(t|t) u(t-1)]^T$$

$$x(t+N_2|t) = s(W^1 \cdot I + b^1) w^{[2]} + b^{[2]}$$

with $$I = [x(t+N_2-1|t) \ldots u(t+N_2-3|t)]^T$$

Note that all data indicated with ( . . . |t) can in principle be discarded after time t because these data depend on information available at time t and are recomputed at every sampling instant, after new measurement information is obtained.

The Nonlinear SISO Predictive Controller

Figure 20:
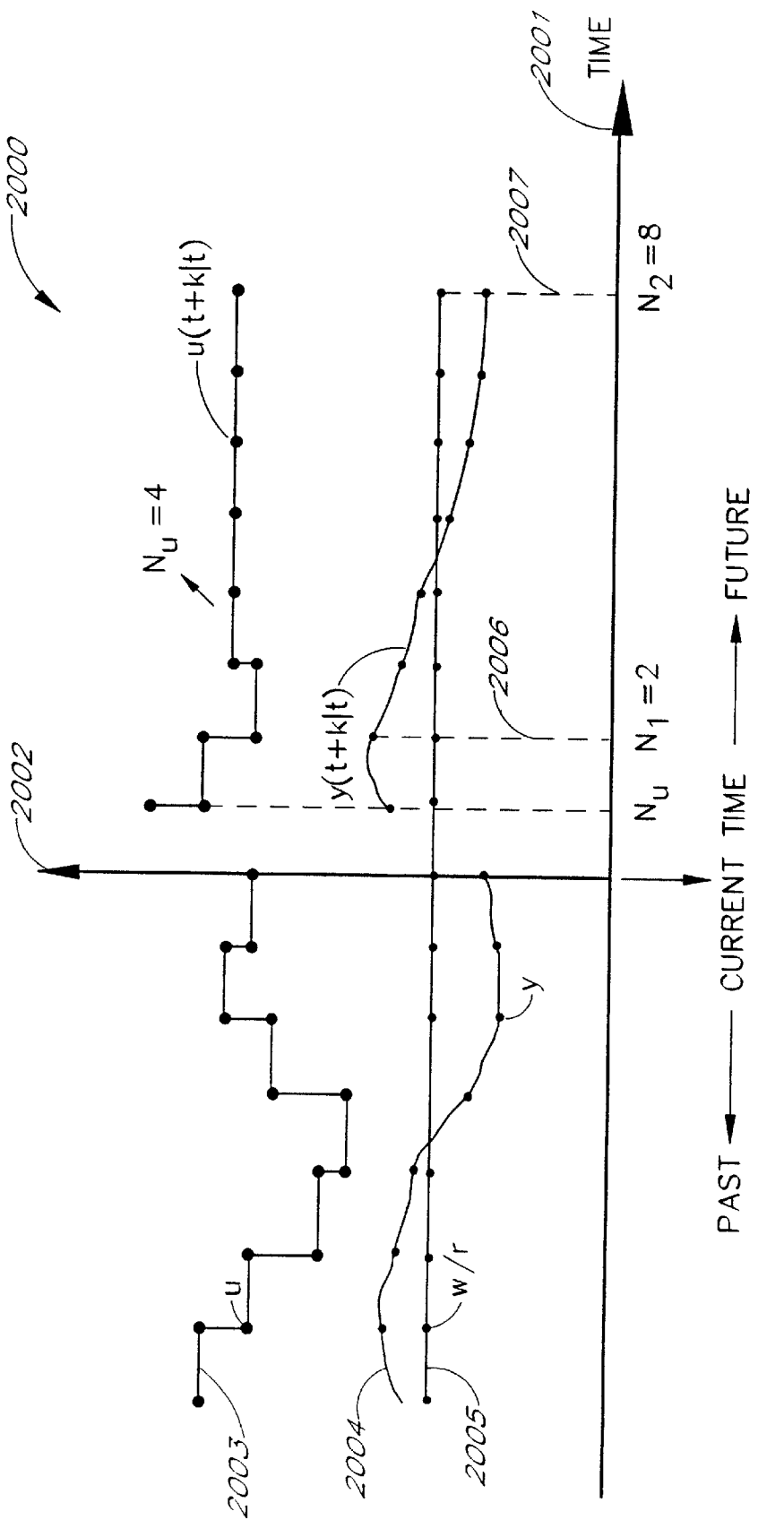
FIG. 20 illustrates the waveforms in the single input, single output (SISO) controller.

As with the linear case, the single input, single output (SISO) controller will be discussed first because it is simpler than the more general multiple input, multiple output model, and yet illustrates the basic principles. FIG. 20 illustrates the waveforms in the SISO controller for α=0 (defined belw). FIG. 20 shows a two-axis plot having an x-axis 2001 showing, having a y-axis 2002 showing a curve 2003 representing u, a curve 2004 representing y, and a horizontal line 2005 representing the curve w/r. The y-axis 2002 is positioned on the x-axis 2001 at time t. Therefore, time values on the x-axis 2001 that lie to the right of the y-axis 2002 represent the future, such as u(t+k|t ). Similarly, points on the x-axis 2001 that lie to the left of the y-axis 2002 represent the past.

The ultimate objective of the SISO controller is to find the control input u(t|t) which minimizes the cost function:

$$J = \sum_{k=N_1}^{N_2} [r(t+k \mid t) - y(t+k \mid t)]^2 + \lambda \sum_{k=0}^{N_u-1} [\Delta u(t+k \mid t)]^2$$

where:

$$\Delta u(t+k|t) = u(t+k|t) - u(t+k-1|t) = 0 \text{ for } k \geq N_u;$$

$$r(t+k|t) = \alpha r(t+k-1|t) + (1-\alpha) \cdot w(t+k|t), \text{ for } k = 1 \ldots N_2;$$

and $$r(t|t) = y(t).$$

The design parameters are and preferred values are:

N$_2$=the prediction horizon (preferred values=3 . . . 9)

N$_u$=the control horizon (preferred value=1)

N$_1$ . . . N$_2$=the coincidence horizon (preferred values=1 . . . N$_2$)

λ=the weight parameter (preferred value=0)

α=the filter parameter (preferred value=0)

Free Response and Forced Response

Conceptually, the future response y(t+k|t) can be considered as the sum of two separable effects, namely the free response and the forced response, where:

$$y(t+k|t) = y_{free}(t+k|t) + y_{forced}(t+k|t).$$

The free response y$_{free}$(t+k|t) is a direct result of: (1) the effect of past control {u(t−1), u(t−2), . . . } as if {Δu(t|t)=Δu(t+1|t)= . . . =Δu(t+N$_u$−1|t)=0} or {u(t|t)=u(t−1),u(t+1|t)=u(t−1), . . . }; and (2) the effect of future disturbances n(t+k|t). The free response y$_{free}$(t+k|t) can be computed with the procedure described in FIG. 18, with $$u(t|t) = u(t+1|t) = \ldots = u(t+N_2|t) = u(t-1).$$

The forced response Y$_{forced}$(t+k|t) is a direct result of: (1) the effect of future control actions {Δu(t|t),Δu(t+1|t), . . . Δu(t+N$_u$−1|t)}. In the preferred embodiment, the forced response y$_{forced}$(t+k|t) is the effect of a sequence of step inputs 1920 having:

(1) a step with amplitude Δu(t|t) at a time t, resulting in a contribution g$_k$Δu(t|t) to the predicted process output at time (t+k) (=k sampling periods later);

(2) a step with amplitude $\Delta u(t+1|t)$ at time (t+1), resulting in a contribution $g_{k-1}\Delta u(t+1|t)$ to the predicted process output at time (t+k) (k−1 sampling periods later);

(3) etc., such that the total effect is:

$$y_{forced}(t+k|t)=g_k\Delta u(t|t)+g_{k-1}\Delta u(t+1|t)+\ldots+g_{k-N_u+1}\Delta u(t+N_u-1|t)$$

The parameters $g_{1,2}, \ldots, g_k, \ldots, GN_2$ are the coefficients of the unit step response of the system. Where the unit step response is the response of the system output for a stepwise change of the system input (with amplitude 1). For a nonlinear system, such as a NN, the unit step response is different for each operating point. Thus it should be computed at each sampling instant by applying a fictitious stepwise change to the current process input 1501 and computing its effect on the process output 1505, using the NN-model 1701. Finally, note that $g_0=g_{-1}=\ldots \equiv 0$.

In expanded matrix notation, the forced response is expressed as:

$$\begin{bmatrix} y_{forced}(t+1)|t) \\ y_{forced}(t+2|t) \\ \vdots \\ y_{forced}(t+N_2|t) \end{bmatrix} = \begin{bmatrix} g_1 & 0 & 0 & \cdots & 0 \\ g_2 & g_1 & 0 & & 0 \\ \vdots & & & \ddots & \vdots \\ g_{N_2} & g_{N_2-1} & g_{N_2-2} & \cdots & g_{N_2-N_u+1} \end{bmatrix}$$

$$\begin{bmatrix} \Delta u(t|t) \\ \Delta u(t+1|t) \\ \vdots \\ \Delta u(t+N_u-1|t) \end{bmatrix}$$

Now changing notation for simplicity let $\bar{y}(t+k|t)=Y_{free}(t+k|t)$ then:

$$\begin{bmatrix} r(t+N_1|t) - y(t+N_1|t) \\ \vdots \\ r(t+N_2|t) - y(t+N_2|t) \end{bmatrix} = \begin{bmatrix} r(t+N_1|t) - \bar{y}(t+N_1|t) \\ \vdots \\ r(t+N_2|t) - \bar{y}(t+N_2|t) \end{bmatrix} -$$

$$\begin{bmatrix} g_{N_1} & g_{N_1-1} & \cdots & \\ \vdots & & \ddots & \\ g_{N_2} & g_{N_2-1} & g_{N_2-2} & g_{N_2-N_u+1} \end{bmatrix} \begin{bmatrix} \Delta u(t|t) \\ \Delta u(t+1|t) \\ \vdots \\ \Delta u(t+N_u-1|t) \end{bmatrix}$$

or using compact matrix notation:

$$(R-Y)=(R-\bar{Y})-G\cdot U.$$

With this notation, the cost function becomes:

$$(R-Y)^T(R-Y)+\lambda U^T U=[(R-\bar{Y})-GU]^T[(R-\bar{Y})-GU]+\lambda U^T U$$

Minimization with respect to U gives an optimal solution:

$$U^*=(G^T G+\lambda I)^{-1}\cdot G^T(R-\bar{Y})$$

where I is the identity matrix.

The following comments are in order. First, only the first element, $\Delta u(t|t)$, in $U^*$ is required to compute the control input $u(t)=u(t-1)+\Delta u(t|t)$. At the next sampling instant (t+1), the whole procedure is repeated taking into account, the new measurement information y(t+1). This is called the "receding horizon" principle of MBPC. Second, the matrix $[G^T G+\lambda I]$ which must be inverted has dimension $N_u\times N_u$. For the default case, where $N_u=1$, this results in the scalar control law:

$$u(t) = u(t-1) + \frac{\sum_{k=N_1}^{N_2} g_k \cdot [r(t+k|t) - \bar{y}(t+k|t)]}{\sum_{k=N_1}^{N_2} g_k^2 + \lambda}.$$

Finally, the notation w( . . . |t) means the future setpoint as postulated at time t. If the setpoint is preprogrammed, the future setpoint values w(t+k) can be used for w(t+k|t): w(t+k|t)=w(t+k), k=1 . . . $N_2$. The predictive control strategy will then take action in advance, before the actual setpoint change occurs. If this is not desired, then the current setpoint value is used for w(t+k|t) is:

$$w(t+k|t)=w(t), \text{ for } k=1 \ldots N_2.$$

The Nonlinear MIMO Predictive Controller

The Method

In this section the SISO principles discussed above are extended to MIMO systems. For simplicity a two input, two output system is discussed first. The extension to the ASMA application with four inputs and four outputs will then follow in a straightforward manner.

With two inputs, and two outputs, the process model is now:

$$y_1(t)=x_1(t)+n_1(t)$$

$$y_2(t)=x_2(t)+n_2(t)$$

where;

$$x_1(t)=f_1[x_1(t-1), \ldots, x_1(t-3), u_1(t-1), \ldots, u_1(t-3), u_2(t-1), \ldots, u_2(t-3)]$$

$$x_2(t)=f_2[x_2(t-1), \ldots, x_2(t-3), u_1(t-1), \ldots, u_1(t-3), u_2(t-1), \ldots, u_2(t-3)]$$

As before, the functions $f_1[\ldots]$ and $f_2[\ldots]$ are nonlinear unknown process models. In the SISO case, only one neural network was necessary, in the present case, with two outputs, two neural networks are necessary.

Assuming a pair of white noise signals $e_1$ and $e_2$, the stochastic disturbances are modeled by colored noise processes:

$$n_1(t) = \frac{C(q^{-1})}{D(q^{-1})}e_1(t) \text{ and } n_2(t) = \frac{C(q^{-1})}{D(q^{-1})}e_2(t)$$

As with the SISO case, the objective is to find the control inputs $u_1(t|t)$ and $u_2(t|t)$ which minimize the cost function $$J = \sum_{k=N_1}^{N_2} \{[r_1(t+k|t) - y_1(t+k|t)]^2 + [r_2(t+k|t) - y_2(t+k|t)]^2\} +$$

$$\lambda \sum_{k=0}^{N_U-1} \{[\Delta u_1(t+k|t)]^2 + [\Delta u_2(t+k|t)]^2\}$$

where $$\Delta u_1(t+k|t)=0 \text{ and } \Delta u_2(t+k|t)=0 \text{ for } k\geq N_u.$$

For a 2×2 system, four step responses can be defined, describing the effect of a stepwise change of each of the two inputs on each of the two outputs. The coefficients of the step response of input j to output i are denoted by: $\{g_1^{ij}\ g_2^{ij}\ g_3^{ij}\ \ldots\}$ Introducing the usual matrix notation, the forced response in $y_1(t+k|t)$ due to postulated future variations for both control inputs is:

$$\begin{bmatrix} y_{1_{forced}}(t+1|t) \\ y_{1_{forced}}(t+2|t) \\ \vdots \\ y_{1_{forced}}(t+N_2|t) \end{bmatrix} = \begin{bmatrix} g_1^{11} & 0 & \cdots & 0 \\ g_2^{11} & g_1^{11} & & 0 \\ \vdots & \vdots & \ddots & \vdots \\ g_{N_2}^{11} & g_{N_2-1}^{11} & \cdots & g_{N_2-N_u+1}^{11} \end{bmatrix} \begin{bmatrix} \Delta u_1(t|t) \\ \Delta u_1(t+1|t) \\ \vdots \\ \Delta u_1(t+N_u-1|t) \end{bmatrix} + \begin{bmatrix} g_1^{12} & 0 & \cdots & 0 \\ g_2^{12} & & & \\ \vdots & & \ddots & \\ g_{N_2}^{12} & g_{N_2-1}^{12} & & g_{N_2-N_u+1}^{12} \end{bmatrix} \begin{bmatrix} \Delta u_2(t|t) \\ \Delta u_2(t+1|t) \\ \vdots \\ \Delta u_2(t+N_u-1|t) \end{bmatrix}$$

A similar expression exists for $y_{2_{forced}}(t+k|t)$

Denote the free response in $y_1(t+k|t)$ by $\bar{y}_1(t+k|t)$. Setting all future input variations equal to 0, such that $u_1(t|t) = u_1(t+1|t) = \ldots = u_1(t-1)$ and $u_2(t|t) = u_2(t+1|t) = \ldots = u_2(t-1)$, gives:

$$\begin{bmatrix} r_1(t+N_1|t) - y_1(t+N_1|t) \\ \cdots \\ \cdots \\ \cdots \\ r_1(t+N_1|t) - y_1(t+N_2|t) \end{bmatrix} = \begin{bmatrix} r_1(t+N_1|t) - \bar{y}_1(t+N_1|t) \\ \cdots \\ \cdots \\ \cdots \\ r_1(t+N_2|t) - \bar{y}_1(t+N_2|t) \end{bmatrix} - \begin{bmatrix} g_{N_1}^{11} & g_{N_1-1}^{11} & \cdots & \cdots & \cdots \\ \cdots & \cdots & \cdots & \cdots & \cdots \\ \cdots & \cdots & \cdots & \cdots & \cdots \\ \cdots & \cdots & \cdots & \cdots & \cdots \\ g_{N_2}^{11} & g_{N_2-1}^{11} & g_{N_2-2}^{11} & \cdots & g_{N_2-N_u+1}^{11} \end{bmatrix} \begin{bmatrix} \Delta u_1(t|t) \\ \Delta u_1(t+1|t) \\ \cdots \\ \cdots \\ \Delta u_1(t+N_u-1|t) \end{bmatrix} - \begin{bmatrix} g_{N_1}^{12} & g_{N_1-1}^{12} & \cdots & \cdots & \cdots \\ \cdots & \cdots & \cdots & \cdots & \cdots \\ \cdots & \cdots & \cdots & \cdots & \cdots \\ \cdots & \cdots & \cdots & \cdots & \cdots \\ g_{N_2}^{12} & g_{N_2-1}^{12} & g_{N_2-2}^{12} & \cdots & g_{N_2-N_u+1}^{12} \end{bmatrix} \begin{bmatrix} \Delta u_2(t|t) \\ \Delta u_2(t+1|t) \\ \cdots \\ \cdots \\ \Delta u_2(t+N_u-1|t) \end{bmatrix}$$

or using matrix notation:

$(R_1-Y_1) = (R_1-\bar{Y}_1) - G_{11} \cdot U_1 - G_{12} \cdot U_2$ and similarly for the 2nd output:

$(R_2-Y_2) = (R_2-\bar{Y}_2) - G_{21} \cdot U_1 - G_{22} \cdot U_2$.

With this compact notation, the cost function introduced above can be rewritten as:

$(R_1-Y_1)^T(R_1-Y_1) + (R_2-Y_2)^T(R_2-Y_2) + \lambda \cdot (U_1^T U_1 + U_2^T U_2)$ A compound matrix $G_1$ is defined as $G_1 = [G_{11} G_{12}]$, a compound matrix $G_2$ is defined as $G_2 = [G_{21} G_{22}]$ and a compound vector U is defined as $U = [U_1^T U_2^T]^T$ Using these compound values, the expressions for the predicted error vectors then become:

$(R_1-Y_1) = (R_1-\bar{Y}_1) - G_1 \cdot U$ $(R_2-Y_2) = (R_2-\bar{Y}_2) - G_2 \cdot U$ and the cost function becomes:

$J = [(R_1-\bar{Y}_1) - G_1 \cdot U]^T[(R_1-\bar{Y}_1) - G_1 \cdot U] + [(R_2-\bar{Y}_2) - G_2 \cdot U]^T[(R_2-\bar{Y}_2) - G_2 \cdot U] + \lambda U^T U$ Minimization of this scalar expression with respect to the vector $U \left( \text{by setting } \frac{\partial J}{\partial U} = 0 \right)$ leads to the optimal solution:

$U^* = [G_1^T G_1 + G_2^T G_2 + \lambda I]^{-1} \cdot [G_1^T(R_1-\bar{Y}_1) + G_2^T(R_2-\bar{Y}_2)]$ Note that even in the preferred case where $N_u=1$, a matrix inversion is required, in this case a 2×2 matrix. In the general case, where $n_u$ is the number of control inputs, a matrix of dimension $(N_u \cdot n_u) \times (N_u \cdot n_u)$ must be inverted. Only two elements in $U^*$ are used for applying the control at time t:

$U^*(1) = \Delta u_1(t|t) \to u_1(t) = u_1(t-1) + U^*$  (1)

$U^*(N_u+1) = \Delta u_2(t|t) \to u_2(t) = u_2(t-1) + U^*(N_u+1)$

Extension of the two input, two output case to four inputs (j=1 ... 4) and four outputs (i=1 ... 4) is straightforward:

$$U^* = \left[ \sum_{i=1}^{4} G_i^T G_i + \lambda I \right]^{-1} \left[ \sum_{i=1}^{4} G_i^T (R_i - \bar{Y}_i) \right]$$

where:

with $\begin{cases} G_i = [G_{i1} \quad G_{i2} \quad G_{i3} \quad G_{i4}], \quad i=1\ldots 4 \\ U = [U_1^T \quad U_2^T \quad U_3^T \quad U_4^T]^T \\ u_j(t) = u_j(t-1) + U_j^*(1), \quad j=1\ldots 4 \end{cases}$ The Algorithms At each sampling instant there are 16 step responses $\{g_1^{ij} \quad g_2^{ij} \quad \cdots \quad g_{N_2}^{ij}\}$, for $\begin{cases} i=1 \ldots 4 \\ j=1 \ldots 4 \end{cases}$ relating each of the four SCR inputs to each of the four susceptor temperature sensor outputs 44, 46, 48, and 50. The step responses are calculated by entering, for each input $u_j$, j=1 ... 4, a step with size $S_j$ in the four process models relating to the four neural nets, one for each output $x_i$, (i=1 ... 4).

Figure 21:
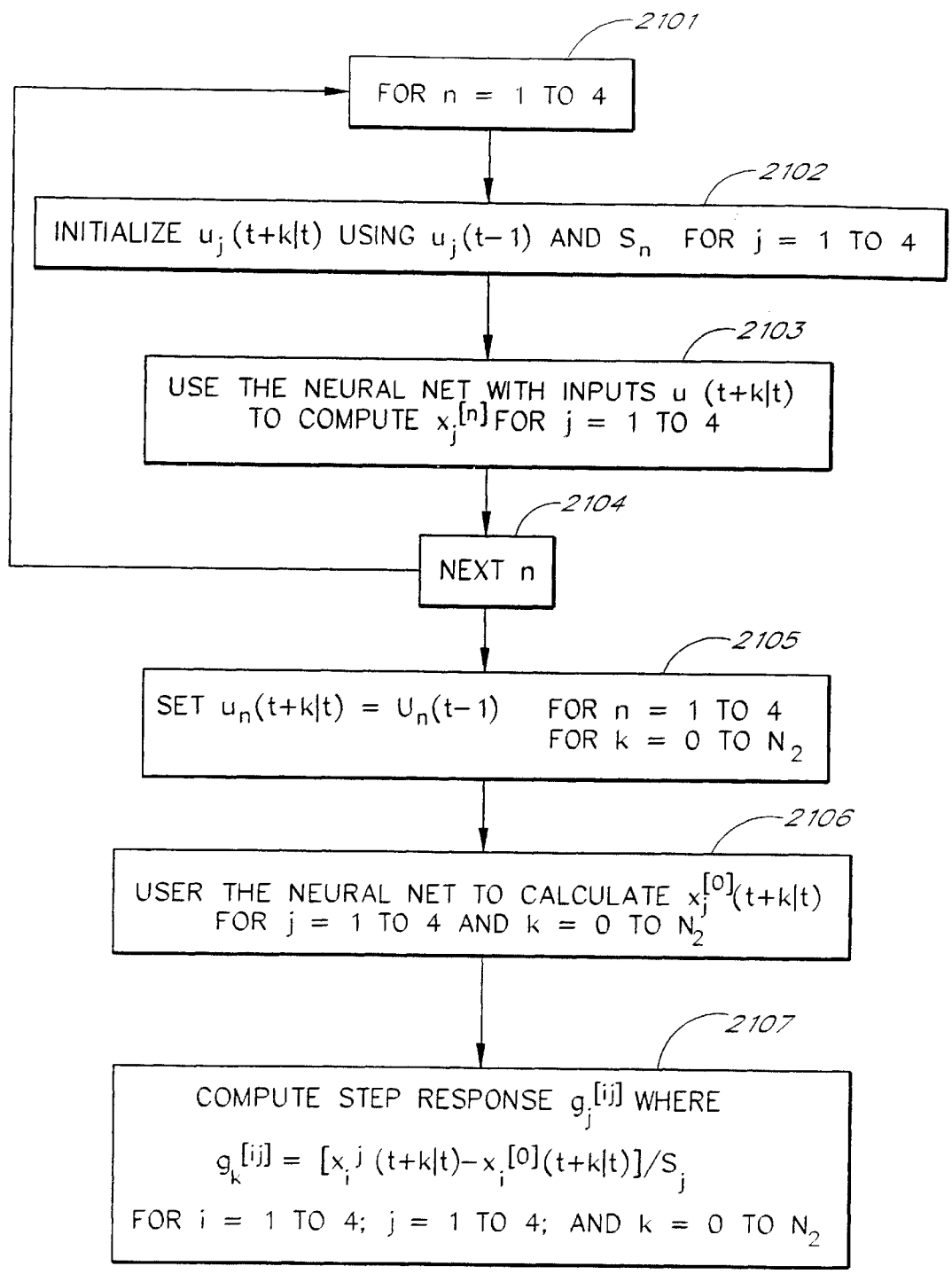
FIG. 21 is a flowchart illustrating the steps necessary to compute the step responses in the MIMO predictor.

FIG. 21 is a flowchart illustrating the steps necessary to compute the step responses. The process begins at a loop control block 2101. In the loop control block 2101, a loop counter n is set to the value 1, representing the first input. The process then advances to a process block 2102 where $u_1(t+k|t)$ is initialized as follows:

$$\begin{cases} u_1(t+k|t) = u_1(t-1) + S_1 \\ u_2(t+k|t) = u_2(t-1) \\ u_3(t+k|t) = u_3(t-1) \\ u_4(t+k|t) = u_4(t-1) \end{cases} \text{ for } k = 0 \ldots N_2.$$

Processing then proceeds to a process block 2103 where the outputs of the neural network are computed, resulting in:

$$\begin{cases} x_1^{[1]}(t+k|t), \text{ output of 1}^{st} NN \\ x_2^{[1]}(t+k|t), \text{ output of 2}^{nd} NN \\ x_3^{[1]}(t+k|t), \text{ output of 3}^{rd} NN \\ x_4^{[1]}(t+k|t), \text{ output of 4}^{th} NN \end{cases} k = 1 \ldots N_2.$$

Processing then proceeds to a loop control block 2104 which increments the loop counter n to indicate the next input. Processing then returns to the process block 2102 where $u_2(t+k|t)$ is initialized as follows:

$$\begin{cases} u_1(t+k|t) = u_1(t-1) \\ u_2(t+k|t) = u_2(t-1) + S_2 \\ u_3(t+k|t) = u_3(t-1) \\ u_4(t+k|t) = u_4(t-1) \end{cases} \text{ for } k = 0 \ldots N_2.$$

Processing then advances to the process block 2103 where the networks are used to calculate:

$$\begin{cases} x_1^{[2]}(t+k|t) \\ x_2^{[2]}(t+k|t) \\ x_3^{[2]}(t+k|t) \\ x_4^{[2]}(t+k|t) \end{cases} k = 1 \ldots N_2.$$

The above process is repeated until all of the inputs have been traversed by the loop counter n. When, in the process block 2104, the loop index n becomes larger than the number of neural networks, then the process proceeds to a process block 2105. In the process block 2105, set:

$$\begin{cases} u_1(t+k)|t) = u_1(t-1) \\ u_2(t+k)|t) = u_2(t-1) \\ u_3(t+k)|t) = u_3(t-1) \\ u_4(t+k)|t) = u_4(t-1) \end{cases} \text{ for } n = 1 \ldots 4 \quad k = 0 \ldots N_2.$$

and then proceed to a process block 2106.

In the process block 2106, calculate with the four NN-models:

$$\begin{cases} x_1^{[0]}(t+k|t) \\ x_2^{[0]}(t+k|t) \\ x_3^{[0]}(t+k|t) \\ x_4^{[0]}(t+k|t) \end{cases} k = 1 \ldots N_2$$

The responses $\{x_1^{[0]}(t+k|t) \ldots x_4^{[0]}(t+k|t)\}$ are the free responses of the neural networks and are used to calculate the system free responses $\bar{y}(t+k|t)$, where $\bar{y}(t+k|t) = x^{[0]}(t+k|t) + n(t+k|t)$. Processing then proceeds to a process block 2107 where the effect of a stepwise variation of an input, meaning the difference between the NN-output with a step input and the NN-output without a step input (the free response), is computed by:

$$\begin{cases} g_1^{ij} = [x_i^{[j]}(t+1|t) - x_i^{[0]}(t+1|t)]/S_j \\ g_2^{ij} = [x_i^{[j]}(t+2|t) - x_i^{[0]}(t+2|t)]/S_j \\ \ldots \\ g_{N_2}^{ij} = [x_i^{[j]}(t+N_2|t) - x_i^{[0]}(t+N_2|t)]/S_j \end{cases}$$

where i=1 . . . 4 denotes output number, j=1 . . . 4 denotes the input number and division by the step size $S_j$ is necessary to obtain the effect of a unit step. For nonlinear systems, the magnitude of the step sizes $S_j$, j=1 . . . 4 should be chosen according to the real input variations $\Delta u_j$ that are expect to apply to the specific system. For the ASMA application, an appropriate choice is $S_1=S_2=S_3=S_4=1$ (as the range for the SCR inputs is (0 . . . 5).

Training the Neural Network

Model Based Predictive Control (MBPC) is a control strategy which relies heavily on the availability of the model 1502. The preceding sections have largely assumed the existence of the model 1502, preferably based on a neural network 1600, without elaborating how the model is generated. This section begins with a brief discussion of the advantages of using a neural network 1600 as the basis for the model 1502 and then describes how the model is generated. Since the model is based on a neural network 1600, generation of the model is largely a process of training of the neural network. Training the neural network corresponds to the training layer 1612 of FIG. 14B, and requires the PLS training method 2300, the pulsetest experiment 1900, and the initial estimates 2400 shown in that Figure.

Modeling of a physical system for control purposes requires the finding of a mathematical relationship (a model) between the system's inputs and outputs. For the ASMA, application modeling entails construction of a mathematical model that describes the effect of the SCR-signals (the inputs) on the susceptor thermocouple signals 44, 46, 48, and 50 (the outputs). The model depends on the underlying physical characteristics of the process, which in this case, is mainly a thermal process. Instead of building a first principles model, starting from complicated physical-chemical laws, the preferred approach is to use a black box model (a neural network) and train that network using experimental data obtained from the reactor during an identification experiment.

The obtained model should be quite general in that it should be valid for other experimental data than those used during the identification experiment, as long as the reactor is operating in similar conditions of temperature range and reactor configuration. If essential changes occur, the process will generally need to be re-modeled. The modeling of a typical ASMA reactor takes less than 1 hour, including the required identification experiment.

In a preferred embodiment, a Pseudo Least Squares (PLS) method is used to train the neural network 1600 as a nonlinear model for the ASMA reactor. The NN-model is then further used in the NEPco predictive control strategy as shown in FIG. 14B.

The training procedure consists of the following general steps of:

(1) performing an experiment with the reactor to obtain the modeling data, in the preferred embodiment this experiment is a pulsetest experiment 1900;

(2) training the neural network (NN) 1600 using the data obtained from the pulsetest experiment 1900, in the preferred embodiment the NN model is trained using a pseudo least squares (PLS) method 2300; and (3) validation of the resulting model.

The pulsetest experiment 1900 and PLS method 2300 are described in detail below. In a preferred embodiment, the software necessary to perform the modeling tasks is implemented using MATLAB®. However, the preferred embodiment could be re-coded in other languages without difficulty.

The Pulsetest Identification Experiment

In the preferred embodiment, the ASMA reactor is a system with four inputs (SCR-signals) and 4 outputs (thermocouple signals) as listed in Table II.

TABLE II

The four input ASMA reactor system

| The inputs are denoted as: | The outputs are denoted as: |
|---|---|
| $u_1(t)$: center SCR signal (0–5 V) | $y_1(t)$: center thermocouple signal (° C.) |
| $u_2(t)$: front SCR signal (0–5 V) | $y_2(t)$: front thermocouple signal (° C.) |
| $u_3(t)$: side SCR signal (0–5 V) | $y_3(t)$: side thermocouple signal (° C.) |
| $u_4(t)$: rear SCR signal (0–5 V) | $y_4(t)$: rear thermocouple signal (° C.) |

The reactor is computer-controlled and all signals are sampled on a discrete-time basis. The symbol t denotes the discrete-time index (1,2,3, . . .). Training the neural network 1600 requires that a set of modeling coefficients $\{W^{[1]}, b^{[1]}, W^{[2]}, b^{[2]}\}$ be generated. The modeling coefficients depend on a sample period, SamplePeriod. In the preferred embodiment, the SamplePeriod is 2 seconds. The numerical values in the model depend on this sampling period. This means that the control, which is based on this model, should also be executed with a sampling period of 2 seconds. The sample period can be changed without ill effect, but if the control sampling period is changed, remodeling to compute a new set of coefficients is prudent.

A characteristic of the model is that each output $\{y_1 \ldots y_4\}$ depends on all four inputs $\{u_1 \ldots u_4\}$. In order to identify these relationships, it is necessary to do an experiment with the reactor in order to obtain useful identification data. A particularly preferred experiment is the pulsetest, which consists of sending consecutively a pulse in each SCR input and measuring each thermocouple reaction. In order to cover the entire nonlinear operating range of the reactor (e.g. 800° C. to 1100° C.), the test is repeated at several base values of the SCR inputs. A parameter Duration determines how many samples each pulse lasts. In a preferred embodiment, the Duration is five samples (10 seconds).

A parameter BaseValues is a row vector containing one or more base values for the SCR inputs, in volts (V). Typical BaseValues are [0.8, 1.3, 2.0], corresponding approximately to reactor temperatures [800, 950, 1100] (in ° C.). More than three base values can be used, leading to higher accuracy, however, this requires a correspondingly longer experiment. The pulses are executed successively for each base value. The time between two pulses, specified as a number of samples in a parameter Period, depends on the settling time of the reactor. For a common reactor, typical values for the parameter Period are between 60 and 120 samples. None of these parameter values are critical and wide variation in values will yield acceptable results.

The duration of the pulsetest experiment is N samples (2*N seconds), where N=Duration*Period*Nbase, where Nbase is the number of entries in the vector BaseValues. The result of the pulsetest experiment 1900 is a dataset containing all input and output samples of the pulsetest experiment. This dataset can be used by the modeling software to train the NN model.

The Pseudo Least Squares NN Training Method

Mathematical Overview of he PLS Method

The preferred embodiment of a feed forward neural network for temperature control, as shown in FIG. 16, comprises: n inputs $x_j$ where j=1 . . . n; one hidden layer with m nonlinear sigmoid type neurons; and a linear output layer with one output y. The input layer is a layer of non-active neurons. The non-active neurons do not perform any computation, they only distribute the input signals to the neurons in the hidden layer. The hidden neurons have outputs $z_i$, where i=1 . . . m; and i refers to a specific hidden neuron. The outputs $z_i$ are computed as follows:

hidden neurons $$\begin{cases} z_i = s(n_i)\ i = 1 \ldots m & \ldots \text{the output} \\ \text{where;}\ n_i = \sum_{j=1}^{n} w_{ij}^{[1]} \cdot x_j + b_i^{[1]} & \ldots \text{a weighted, biased sum of the inputs} \\ \quad\quad\quad\quad = W_i^{[1]} \cdot X + b_i^{[1]} & \\ \text{and;}\ X = [x_1\ x_2 \ldots x_j \ldots x_n]^T & \ldots \text{the inputs} \\ \text{and;}\ W_i^{[1]} = [w_{i1}^{[1]}\ w_{i2}^{[1]} \ldots w_{ij}^{[1]} \ldots w_{in}^{[1]}] & \ldots \text{the weights} \end{cases}$$

The parameters in the weight vectors $W_i^1$ (i=1 . . . m) and the biases $b_i^{[1]}$ (i=1 . . . m) are unknown and must be estimated from experimental data. The biases are desirable in order to compensate for the fact that the output y is not necessarily zero when the input x is zero.

The output layer contains a single linear neuron. The output y is computed as follows:

$$\text{output neuron} \begin{cases} y = \sum_{i=1}^{m} w_i^{[2]} \cdot z_i + b^{[2]} = W^{[2]} \cdot Z + b^{[2]} \\ \text{where;}\ Z = [z_1\ z_2 \ldots z_i \ldots z_m]^T \\ \text{and;}\ W^{[2]} = [w_1^{[2]}\ w_2^{[2]} \ldots w_i^{[2]} \ldots w_m^{[2]}] \end{cases}$$

Here again, training the NN involves estimating the weights W and biases b.

For the estimation of all of these parameters, a set of training data from the pulsetest experiment is used. The data from the pulsetest experiment includes the experimental inputs X(k), and the corresponding outputs T(k); k=1 . . . N. Thus, T(k) are target values and N is the number of samples. The training of the NN consists of estimating a set of parameters $W_i^{[1]}, b_i^{[1]}\ W^{[2]}$, and $b^{[2]}$ where i=1 . . . m and such that, given a set of inputs X(k), the outputs y(k), k=1 . . . N are as close as possible to the target values T(k), k=1 . . . N.

The phrase "as close as possible" is generally quantified by a Sum of Squared Errors (SSE) value V given by:

$$V(W_i^{[1]}, b_i^{[1]}, W^{[2]}, b^{[2]}) = \frac{1}{2}\sum_{k=1}^{N} e^2(k) = \frac{1}{2}\sum_{k=1}^{N} [T(k) - y(k)]^2$$

The NN herein is nonlinear, and thus no closed form method is currently known for estimating $W_i^{[1]}, b_i^{[1]}, W^{[2]}$ and $b^{[2]}$. However, a heuristic training method, called Pseudo Least Squares (PLS), has been found to work well in this application.

The PLS method has the advantages of simplicity, ease of programming and fast training speed. The PLS method, described in more detail below, involves finding an initial set of estimates, and then using an iterative procedure to refine the initial estimates. Briefly, the iterative procedure involves starting at the hidden layer of neurons and working forward, thought the NN, towards the output neuron, refining the parameters W and b for each layer. The following sections herein present the PLS method and a procedure for implementing the method.

PLS Estimation of the Output Layer Parameters

The parameters $\{W^{[2]}, b^{[2]}\}$ of the output layer are estimated in order to minimize the SSE loss value V:

$$V(W^{[2]}, b^{[2]}) = \frac{1}{2}\sum_{k=1}^{N} e^2(k) = \frac{1}{2}\sum_{k=1}^{N}[T(k)-y(k)]^2$$

All other network parameters $\{W_i^{[1]}, b_i^{[1]}; i=1 \ldots m\}$ are assumed to be known at time t. Minimization is obtained by setting the derivatives of $V(W^{[2]}, b^{[2]})$ with respect to $\{W^{[2]}, b^{[2]}\}$ equal to zero:

$$\frac{dV(W^{[2]}, b^{[2]})}{dW^{[2]}} = 0 \text{ and } \frac{dV(W^{[2]}, b^{[2]})}{db^{[2]}} = 0$$

For ease of notation, two extended vectors $\tilde{W}^{[2]}=[W^{[2]}\ b^{[2]}]$ and $$\tilde{Z} = \begin{bmatrix} Z \\ 1 \end{bmatrix}$$

are defined.

Then the output y can be written in terms of the extended vectors as:

$$y(k) = W^{[2]} \cdot Z(k) + b^{[2]} = \tilde{W}^{[2]} \cdot \tilde{Z}(k)$$

and thus the two conditions above can be combined as $$\frac{dV(\tilde{W}^{[2]})}{d\tilde{W}^{[2]}} = 0 \quad (34)$$

leading to $$\sum_{k=1}^{N}[T(k)-y(k)]\frac{dy(k)}{d\tilde{W}^{[2]}} = 0$$

With $$\frac{dy(k)}{d\tilde{W}^{[2]}} = \tilde{Z}^T(k) = [s[n_1(k)], \ldots s[n_i(k)], \ldots s[n_m(k), 1]$$

this gives:

$$\sum_{k=1}^{N}[T(k) - \tilde{W}^{[2]} \cdot \tilde{Z}(k)]\tilde{Z}^T(k) = 0$$

A least squares solution to the above equation is:

$$\tilde{W}^{[2]} = \left[\sum_{k=1}^{N} T(k) \cdot \tilde{Z}^T(k)\right]\left[\sum_{k=1}^{N} \tilde{Z}(k) \cdot \tilde{Z}^T(k)\right]^{-1}$$

PLS Estimation of the Hidden Layer Parameters

The parameters $W_i^{[1]}$ and $b_i^{[1]}$ of neuron i (i=1 ... m) in the hidden layer are estimated in order to minimize the SSE loss function:

$$V(W_i^{[1]}, b_i^{[1]}) = \frac{1}{2}\sum_{k=1}^{N} e^2(k) = \frac{1}{2}\sum_{k=1}^{N}[T(k)-y(k)]^2$$

All other network parameters $W_1^{[1]}, b_1^{[1]}; \ldots; W_{i-1}^{[1]}, b_{i-1}^{[1]}; W_{i+1}^{[1]}, b_{i+1}^{[1]}; \ldots; W_m^{[1]}, b_m^{[2]}; W^{[1]}, b^{[2]}$ are assumed to be known. Minimization is obtained by putting the derivatives of $V(W_i^{[1]}, b_i^{[1]})$ with respect to $\{W_i^{[1]}, b_i^{[1]}\}$ equal to zero, such that:

$$\frac{dV(W_i^{[1]}, b_i^{[1]})}{dW_i^{[1]}} = 0 \text{ and } \frac{dV(W_i^{[1]}, b_i^{[1]})}{db_i^{[1]}} = 0$$

For ease of notation, define two extended vectors $\tilde{W}_i^{[1]}=[W_i^{[1]}\ b_i^{[1]}]$ and $$\tilde{X} = \begin{bmatrix} X \\ 1 \end{bmatrix}$$

are defined. Then, $$n_i(k) = W_i^{[1]} \cdot X(k) + b_i^{[1]} = \tilde{W}_i^{[1]} \cdot \tilde{X}(k).$$

The condition $$\frac{dV(\tilde{W}_i^{[1]})}{d\tilde{W}_i^{[1]}} = 0$$

gives $$\sum_{k=1}^{N}[T(k)-y(k)]\frac{dy(k)}{d\tilde{W}_i^{[1]}} = 0$$

Using the chain rule for differentiation, the above derivative is found to be:

$$\frac{dy}{d\tilde{W}_i^{[1]}} = w_i^2 \cdot s'(n_i(k))\tilde{X}^T(k)$$

leading to the nonlinear estimator equations $$\sum_{k=1}^{N}[T(k)-y(k)]w_i^{[2]} \cdot s'[n_i(k)]\tilde{X}^T(k) = 0$$

Now introducing a back-propagated error term $\delta_i$, defined as:

$$\delta_i(k) = [T(k)-y(k)]w_i^{[2]} \cdot s'[n_i(k)]$$

results in $$\sum_{k=1}^{N} \delta_i(k) \cdot \tilde{X}^T(k) = 0.$$

Now introduce a minimum back-propagation error:

$$\delta_i^*(k) = \varepsilon \frac{\delta_i(k)}{\max(|\delta_i(k)|; k = 1 \ldots N)}$$

where $\epsilon$ is a small number (e.g., $\epsilon=10^{-4}$). This guarantees that each $\delta_i^*(k)$; k=1 . . . N is a small number. The equation for the estimator then becomes:

$$\frac{\max(|\delta_i(k)|; k = 1 \ldots N)}{\varepsilon} \sum_{k=1}^{N} \delta_i^*(k) \cdot \tilde{X}^T(k) = 0$$

or $$\sum_{k=1}^{N} \delta_i^*(k) \cdot \tilde{X}^T(k) = 0$$

FIG. 22 illustrates the sigmoid function. FIG. 22 shows the sigmoid function plotted on an X axis 2201 ranging from −3 to 3, and a Y axis 2202 ranging from −1 to 1. A neuron input n 2203 and corresponding neuron output z 2206 are shown on the X axis 2201 and Y axis 2202 respectively. Slightly displaced from the neuron input n 2203 and corresponding output z 2206 are a fictitious neuron input n* 2204 and a corresponding fictitious neuron output z* 2205.

The neuron output z 2206 corresponds to fictitious neuron output z* 2205 according to the relationship $z_i^*(k)=z_i(k)+\delta_1^*(k)$. Thus $n_i^*(k)$ is such that $z_i^*(k)=s[n_i^*(k)]$.

Note that given z* it is easy to compute n* as:

$$n^* = \frac{1}{2}\log\left(\frac{1+z^*}{1-z^*}\right)$$

Since the difference $z^*-z=\delta^*$ is very small, it can be stated, with arbitrary accuracy, that:

$$\frac{z^* - z}{n^* - n} \cong s'(n) \text{ or } \delta^* \cong s'(n) \cdot (n^* - n).$$

The estimator equations thus become $$\sum_{k=1}^{N} s'[n_i(k)] \cdot [n_i^*(k) - n_i(k)] \cdot \tilde{X}^T(k) = 0$$

and with $n_i(k)=W_i^{[1]} \cdot \tilde{X}(k)$ thus leading to the least squares solution $$\tilde{W}_i^{[1]} = \left[\sum_{k=1}^{N} n_i^*(k) \cdot s'[n_i(k)] \cdot \tilde{X}^T(k)\right]\left[\sum_{k=1}^{N} \tilde{X}(k) \cdot s'[n_i(k)] \cdot \tilde{X}^T(k)\right]^{-1}$$

The PLS Procedure

Figure 23A:
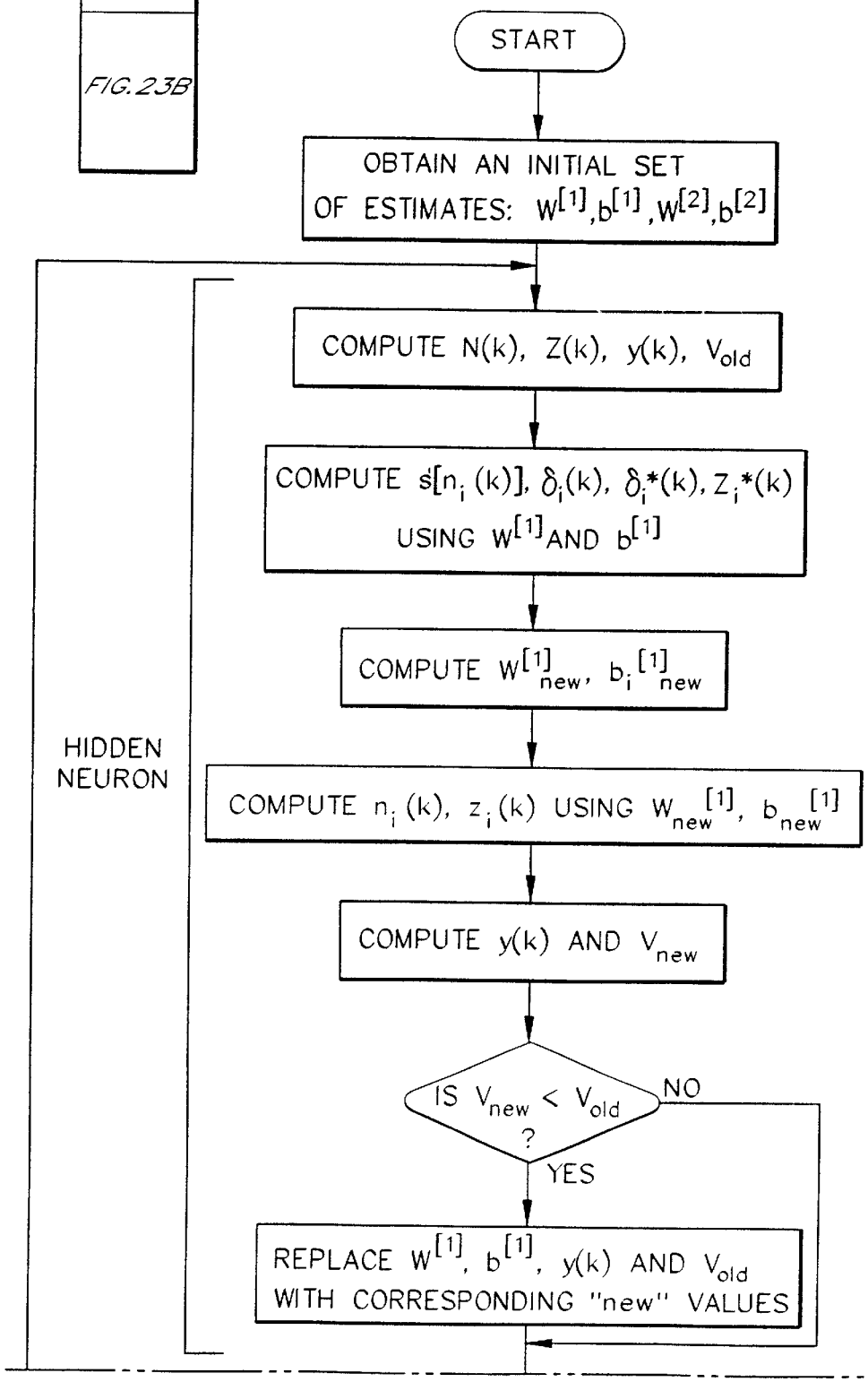
FIG. 23 (comprising FIGS. 23A and 23B) is a flowchart illustrating the pseudo least squares (PLS) procedure.
Figure 23B:
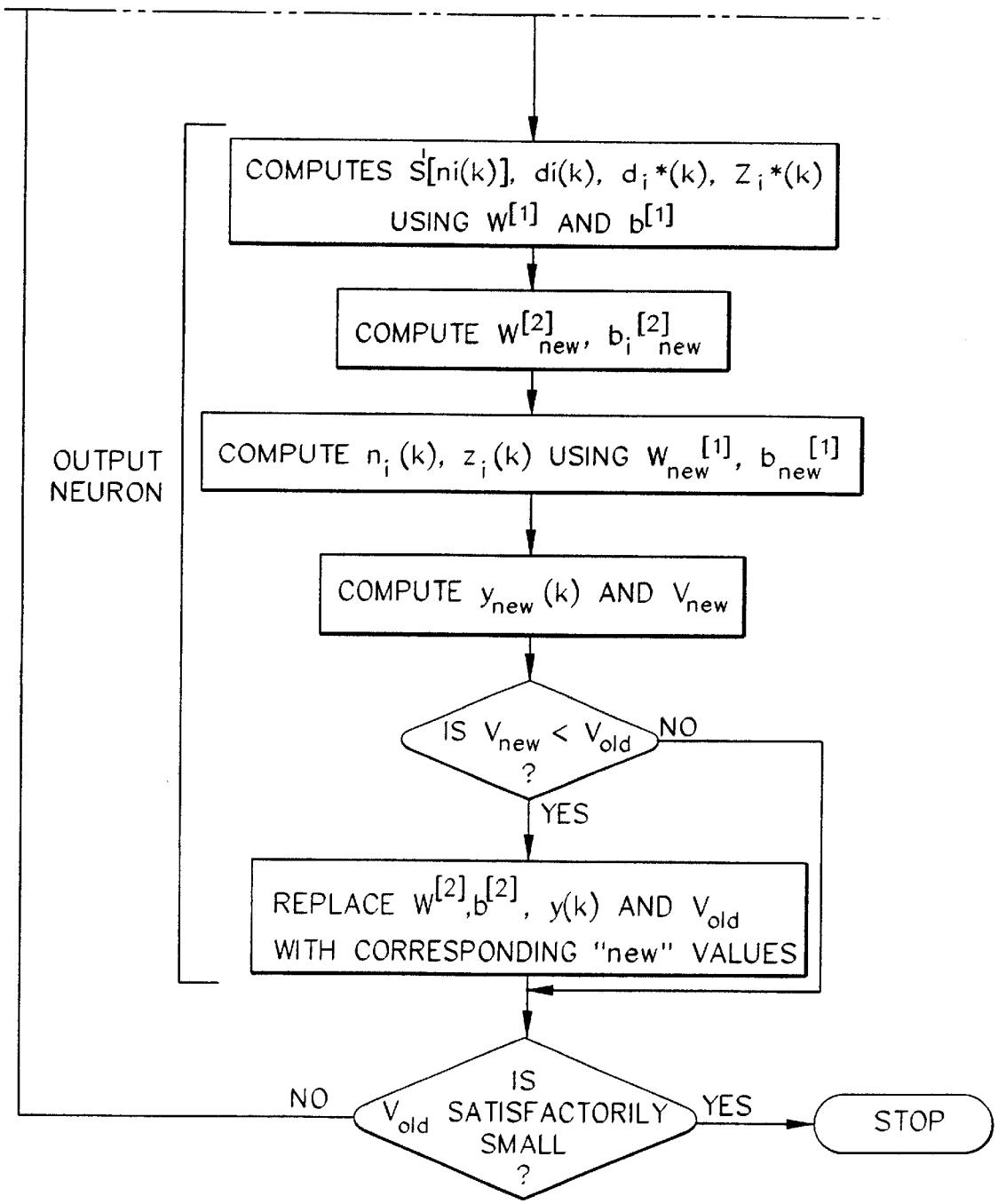

In this section, divorced from the theoretical development above, is a summary of the PLS method to estimate the vectors W and b. FIG. 23 is a flowchart illustrating the PLS procedure. The PLS method does requires an initial estimate for each of the vectors. Since there are many methods that can be employed to develop the initial estimates, the process of developing the estimates is not, strictly speaking, a part of the PLS method. Therefore, the PLS method presented here merely assumes that an initial estimate is available. A preferred method for developing the initial estimates is described below.

In a process block 2301, compute a suitable starting set of initial estimates $\{W_i^{[1]}, b_i^{[1]}, W^{[2]}, b^{[2]}\}$ $$W^{[1]} = \begin{bmatrix} W_1^{[1]} \\ \ldots \\ W_i^{[1]} \\ \ldots \\ W_m^{[1]} \end{bmatrix} \text{ and } b^{[1]} = \begin{bmatrix} b_1^{[1]} \\ \ldots \\ b_i^{[1]} \\ \ldots \\ b_m^{[1]} \end{bmatrix}$$

Proceeding to a process block 2302, compute an initial hidden neuron input vector N(k), for k=1 . . . N from:

$$N(k)=[n_1(k) \ldots n_i(k) \ldots n_m(k)]^T = W^{[1]} \cdot X(k) + b^{[1]}$$

and an initial hidden neuron output vector Z(k), for k=1 . . . N from:

$$Z(k)=[z_1(k) \ldots z_i(k) \ldots z_m(k)]^T=[s[n_1(k)] \ldots s[n_i(k)] \ldots s[n_m(k)]]^T$$

and an initial neural network output y(k) for k=1 . . . N;

$$y(k)=W^{[2]} \cdot Z(k) + b^{[2]}$$

and finally, a current SSE loss value $V_{old}$ from:

$$V_{old} = \sum_{k=1}^{N} [T(k) - y(k)]^2$$

Proceeding to a process block 2303, for each hidden neuron (i=1 . . . m), compute the following items:

the derivative $s'[n_i(k)]=1-s[n_i(k)]^2=1-z_i(k)^2$ for k=1 . . . N
the back propagation error:

$$\delta_i(k)=[T(k)-y(k)]w_i^{[2]} \cdot s'[n_i(k)] \text{ for } k=1 \ldots N$$

the scaled value:

$$\delta_i^*(k) = \varepsilon \frac{\delta_i(k)}{\max(|\delta_i(k)|; k = 1 \ldots N)} \text{ for } k = 1 \ldots N;$$

the fictitious input and output:

$$z_i^*(k) = z_i(k) + \delta_i^*(k) \text{ and } n_i^*(k) = 0.5 * \log\left(\frac{1+z_i^*(k)}{1-z_i^*(k)}\right);$$

new weights and biases for neuron i from:

$$[W_i^{[1]} \; b_i^{[1]}] = \left[\sum_{k=1}^{N} n_i^*(k) \cdot s'[n_i(k)] \cdot \tilde{X}^T(k)\right]\left[\sum_{k=1}^{N} \tilde{X}(k) \cdot s'[n_i(k)] \cdot \tilde{X}^T(k)\right]^{-1}$$

the corresponding new neuron input:

$$n_i(k)=\tilde{W}_i^{[1]} X(k) + b_i^{[1]} \text{ for } k=1 \ldots N$$

the corresponding new neuron output:

$$z_i(k) = \frac{1 - e^{-2n_i(k)}}{1 + e^{-2n_i(k)}} \text{ for } k = 1 \ldots N$$

the new network output:

$$y(k)=W^{[2]} \cdot Z(k) + b^{[2]} \text{ for } k=1 \ldots N$$

and a corresponding new SSE value $V_{new}$:

$$V_{new} = \sum_{k=1}^{N} [T(k) - y(k)]^2$$

Proceeding to a decision block 2307, if $V_{new}$ is smaller than $V_{old}$, then proceed to a process block 2308, otherwise, jump to a process block 2309. In the process block 2308 replace the old values of $W^{[1]}$, $b^{[1]}$, y(k) and $V_{old}$ with the new values of $W^{[1]}$, $b^{[1]}$, y(k), and $V_{new}$. Then proceed to the process block 2309.

In the process block 2309, for the output neuron, compute $s'[n_i(k)]$, $\delta_i(k)$, $\delta_i^*(k)$, $z_i^*(k)$ using $W^{[1]}$, and $b^{[1]}$. Also in the process block 2309, for the output neuron, compute $W_{new}^{[2]}$, and $b_{i,new}^{[2]}$ and use them to compute $z_i(k)$ and $n_i(k)$, $y_{new}(k)$ and $V_{new}$. In the process block 2313, the new weights and bias for the output neuron are given by:

$$[W^{[2]} \; b^2] = \left[\sum_{k=1}^{N} T(k) \cdot \tilde{Z}^T(k)\right]\left[\sum_{k=1}^{N} \tilde{Z}(k) \cdot \tilde{Z}^T(k)\right]^{-1}$$

where $$\tilde{Z}^T(k) = [Z^T(k) \; 1]$$

and the new network output is given by:

$$y(k) = W^{[2]} \cdot Z(k) + b^{[2]} \text{ for } k = 1 \ldots N$$

Then proceed to a decision block 2313. In the decision block 2313, if $V_{new}$ is less than $V_{old}$ then proceed to a process block 2314, otherwise jump to a decision block 2315. In the process block 2314 replace the old values of $W^{[2]}$, $b^{[2]}$, y(k) and $V_{old}$ with the new values of $W^{[2]}$, $b^{[2]}$, y(k), and $V_{new}$.

In the decision block 2315, if the value of $V_{old}$ has not stopped changing or reached some specified small value then processing returns to the process block 2302 for another iteration, otherwise, the process advanced to an end block 2316 and terminates.

The result of the procedure in FIG. 23 is a new set of parameters [$W^{[1]}$,$b^{[1]}$,$W^{[2]}$,$b^{[2]}$] and related network internal variables {N(k), Z(k)} and output values {y(k), V}. As indicated in decision block 2315, The whole procedure can be repeated a number of times until the decrease of V is zero or less than a specified small value. As is always the case with nonlinear search procedures, the choice of a good set of initial values is of utmost importance in order to reduce the number of iterations and to prevent getting stuck in local minima.

Initialization

A preferred approach to the initialization problem is to start from the parameters of the linear model:

$$y(k) = \sum_{j=1}^{n} w_j x_j(k) + b = W \cdot X(k) + b$$

(1) Compute the parameters $\tilde{W} = [W \; b]$ by minimizing the SSE loss V, where:

$$V(\tilde{W}) = \frac{1}{2}\sum_{k=1}^{N} e^2(k) = \frac{1}{2}\sum_{k=1}^{N} [T(k) - y(k)]^2$$

leading to the least squares solution $$\tilde{W} = \left[\sum_{k=1}^{N} T(k) \cdot \tilde{X}^T(k)\right]\left[\sum_{k=1}^{N} (X(k))^T \cdot \tilde{X}(k)\right]^{-1}$$

(2) Select m positive random numbers $\{a_1, \ldots, a_i, \ldots, a_m\}$ such that $$\sum_{i=1}^{m} a_i = \frac{0.1}{\max(|y(k)|); k = 1 \ldots N)}$$

Set $\tilde{W}_i^{[1]} = a_i \cdot \tilde{W}$ and:

$$\tilde{W}^{[2]} = \frac{\max(|y(k)|; k = 1 \ldots N)}{0.1} [1 \ldots 1 \ldots 1 \; 0]$$

This selection assures that each hidden neuron input, being given by $$n_i(k) = \tilde{W}_i^{[1]} X = a_i \tilde{W} \cdot \tilde{X} = a_i y(k)$$

lies between −0.1 and +0.1, so that the values are in the linear zone around 0 on the sigmoid curve, thus:

$$z_i(k) \cong n_i(k) = a_i y(k)$$

The neural net output for this choice of initial values, being given by:

$$\sum_{i=1}^{m} w_i^2 \cdot z_i(k) + b^2 \cong \sum_{i=1}^{m} \frac{\max(|y(k)|; k = 1 \ldots N)}{0.1} \cdot a_i y(k) + 0 \cong y(k)$$

will thus be close to the linear model output, which is a reasonable start condition.

The SoftSensor Embodiment

In yet another embodiment of model based-predictive controllers, the linear and non-linear models disclosed above can be further enhanced by adding a softsensor model to the basic MBPC fabrication system 1400.

The temperature of the wafer surface is of major importance for the deposition process. However, the point-to-point wafer temperature is not measured during normal operation. Experiments have indicated that the susceptor temperatures give a reasonable approximation of the unknown wafer temperature distribution. There are also experimental results which indicate that good susceptor control alone is not sufficient to obtain very tight wafer control.

Temperature transients (ramp-up/ramp-down) are typical situations in which wafer and susceptor temperatures might differ considerably. This is due to the different mass (heat capacity) of susceptor and wafer. Good susceptor control with no (or very low) temperature overshoot does not necessary lead to wafer control with low overshoot. Moreover the front 46, side 48 and rear 50 susceptor setpoints require the specification of an offset with respect to the center 44 susceptor setpoint in order to result in a good temperature uniformity over the wafer surface. In the prior art, these offsets are found by trial and error.

The more systematic method and apparatus presented here, which solves the above problems, is the use of MBPC combined with the softsensor principle. The concept is that the unmeasured wafer temperature can be replaced by the outcome of a model describing the dynamic relationship between susceptor and wafer temperatures. In the preferred embodiment, this softsensor model is identified using data obtained from experiments with an instrumented wafer.

Figure 24:
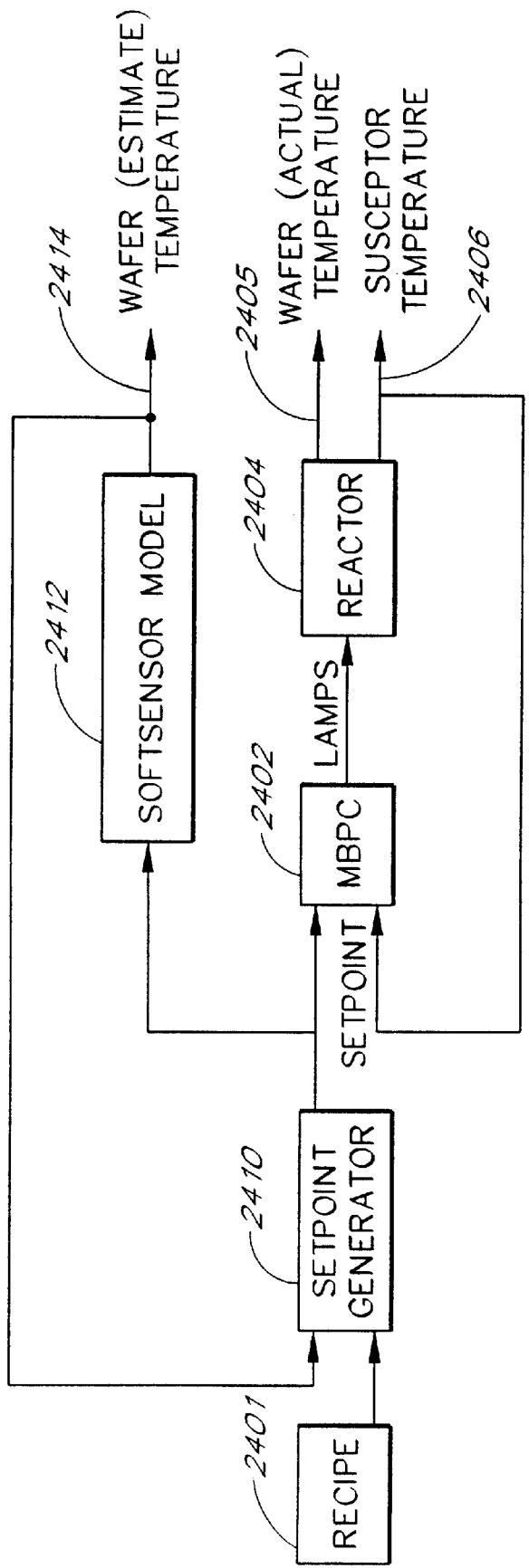
FIG. 24 is a block diagram that illustrates an extension of the basic fabrication system to a softsensor fabrication system.

FIG. 24 is a block diagram that illustrates an extension of the basic fabrication system 1400 to a softsensor fabrication system 2400. A recipe block 2401 provides input into a setpoint generator block 2410. An output of the setpoint generator block provides input to a MBPC process block 2402 and a softsensor process block 2412. An output of the softsensor process block 2412 is a wafer estimate 2414. The output of the wafer estimate 2414 is fed back into the setpoint generator block 2410. The MBPC process block 2402 outputs control signals to a reactor and lamp system 2404. A group of unmeasurable outputs from the reactor process block 2404 are the wafer surface temperatures 2405. A group of measurable outputs from the reactor process block 2404 are the susceptor temperatures 2406. The susceptor temperatures are fed back into the MBPC process block 2402 to facilitate temperature control of the wafer 22 and the susceptor 24.

The recipe is used as setpoint for the susceptor temperature. Then, in the basic control structure, the recipe is interpreted as setpoint for the wafer temperature. The setpoints for the susceptor control are then computed internally in the control strategy, using the softsensor principle.

A model, describing the dynamic relationship between susceptor setpoints and wafer temperatures, is identified using an instrumented wafer. The instrumented wafer is a special wafer which has temperature sensors on the surface of the wafer 20. This allows actual wafer surface temperatures to be measured. These measured values are used to obtain modeling coefficients for the softsensor process block 2412. During normal operation of the reactor, the softsensor process block 2412, being a part of the control software, can be used to generate an estimate of the wafer temperature.

An inverse softsensor model is then used to generate intermediate signals, which are further used as setpoints for the standard susceptor controller. In a preferred embodiment, the setpint generator 2410 is a PID filter and the softsensor block 2412 is a linear FIR filter.

The result is that the wafer temperatures, and not the susceptor temperatures, are controlled towards the values specified in the recipe. This procedure also computes, automatically, the necessary offsets for center 44, front 46, side 48 and rear 50 susceptor setpoints in order to bring all wafer temperatures close to the recipe. This leads to better uniformity of the temperatures over the wafer surface.

Conclusion

While the present invention has been particularly shown and described with reference to preferred embodiments thereof, it will be understood by those skilled in the art that various changes in form and detail may be made therein without departing from the spirit, scope and teaching of the invention. Accordingly, the embodiments herein disclosed are to be considered merely as illustrative and limited in scope only as specified in the appended claims.

We claim:

1. A temperature-controlled thermal process system, comprising:
 a softsensor model for generating an estimated wafer temperature from one or more previous susceptor setpoint temperatures, said softsensor model comprising one or more inputs configured to receive said one or more previous susceptor setpoint temperatures, said softsensor model further comprising at least one output configured to provide said estimated wafer temperature, said estimated wafer temperature computed from at least a portion of said previous susceptor setpoint temperatures;
 a setpoint generator for generating a new susceptor setpoint temperature from a desired wafer temperature provided by a wafer processing recipe and from said estimated wafer temperature; and
 a model-based predictive temperature controller for controlling a wafer heat source, said new susceptor setpoint temperature provided to a control input of said model-based predictive temperature controller, and said susceptor temperature provided to a feedback input of said model-based predictive temperature controller.

2. The temperature-controlled rapid thermal process system of claim 1, wherein said model-based predictive temperature controller comprises:
 a multivariable thermal process model that relates multivariable process input thermal energy to multivariable process output temperature;
 a prediction calculator that uses said thermal process model, to calculate a predicted nominal temperature output over a predetermined future time period; and
 a control calculator that uses said predicted nominal temperature output to calculate an optimum control strategy by which to control said source of thermal energy.

3. The temperature-controlled thermal process system of claim 2, wherein said prediction calculator calculates the predicted nominal temperature output using an autoregressive moving average, having a predetermined prediction horizon.

4. The temperature-controlled thermal process system of claim 3, wherein the prediction calculator assumes a future control strategy.

5. The temperature-controlled thermal process system of claim 4, wherein said predicted nominal temperature output is calculated recursively over a predetermined future time period.

6. The temperature-controlled thermal process system of claim 2, wherein the control calculator compares said predicted nominal temperature output to a desired future temperature output to derive said optimum control strategy.

7. The temperature-controlled thermal process system of claim 2, wherein the control calculator compares said predicted nominal temperature output to a desired future temperature output to derive said optimum control strategy.

8. The temperature-controlled thermal process system of claim 1, wherein the model-based predictive temperature controller comprises nonlinear multivariable temperature control.

9. The temperature-controlled rapid thermal process system of 8, wherein the nonlinear model-based predictive temperature controller comprises:
 a nonlinear multivariable thermal process model that relates multivariable process input thermal energy to multivariable process output temperature;
 a prediction calculator that uses said thermal process model, to calculate a predicted nominal temperature output over a predetermined future time period; and
 a control calculator that uses said predicted nominal temperature output to calculate an optimum control strategy by which to control said source of thermal energy.

10. The temperature-controlled thermal process system of claim 9, wherein said prediction calculator calculates the predicted nominal temperature output using a neural network.

11. The temperature-controlled thermal process system of claim 10, wherein said neural network is a feed-forward network.

12. The temperature-controlled thermal process system of claim 11, wherein said neural network is trained using a pseudo-least-squares method.

13. The temperature-controlled thermal process system of claim 9, wherein the control calculator compares said predicted nominal temperature output to a desired future temperature output to compute said optimum control strategy.

14. The temperature-controlled thermal process system of claim 1, wherein said softsensor model generates an estimated wafer temperature from one or more previous susceptor setpoint temperatures according to a difference in a heat capacity of the susceptor and a heat capacity of a wafer.

15. The temperature-controlled thermal process system of claim 1, wherein said softsensor model generates an estimated wafer temperature from one or more previous susceptor setpoint temperatures according to a dynamic relationship between susceptor temperatures and wafer temperatures.

16. The softsensor model of claim 15, wherein a model of said dynamic relationship is obtained from wafer temperature data provided from an instrumented wafer.

17. The temperature-controlled thermal process system of claim 1, wherein said setpoint generator provides a correction to said desired wafer temperature, said correction facilitating control of actual wafer surface temperatures.

18. The setpoint generator of claim 17, said correction facilitating improved control of actual wafer surface temperatures based on measurement of susceptor temperatures.

19. A temperature control system for controlling a thermal process comprising:
a controllable source of thermal energy which comprises multiple independently controllable thermal energy generators to heat a wafer;
a plurality of temperature sensors to produce signals corresponding to a set of measured temperatures related to an actual temperature of said wafer;
a softsensor model which estimates said actual temperature from at least one setpoint temperature to produce an estimated temperature;
a setpoint generator which calculates said setpoint temperature based on a recipe temperature and said estimated temperature; and
a model-based predictive temperature controller which receives said setpoint temperature as an input and said measured temperatures as feedback inputs, and which controls said source of thermal energy in response to said measured temperatures according to said setpoint temperature.

20. The temperature control system of claim 19, said temperature controller comprising:
a nonlinear thermal process model which relates process input thermal energy to a process output temperature;
a prediction calculator which uses said nonlinear thermal process model to calculate a predicted nominal temperature output over a predetermined future time period; and
a control calculator which uses said predicted nominal temperature output to calculate an optimum strategy by which to control said source of thermal energy to minimize spatial thermal gradients across said object, said controller generating output signals to said source of thermal energy in response to said optimum strategy, said control calculator configured to compare a predicted nominal temperature output to a desired future temperature output and use said comparison in an algorithm to compute said optimum strategy.

21. The temperature control system of claim 19, wherein said softsensor model calculates said estimated temperature from a time history of previous setpoint temperatures.

22. The temperature control system of claim 19, wherein said softsensor model comprises a linear finite impulse response filter.

23. The temperature control system of claim 19, wherein said softsensor model calculates said estimated temperature from a time history of previous setpoint temperatures according to data obtained from an instrumented wafer.

24. The temperature control system of claim 19, wherein said softsensor model comprises a linear finite impulse response filter, said linear finite impulse response filter having filter coefficients calculated from data obtained from an instrumented wafer.

25. The temperature control system of claim 20, wherein said nonlinear thermal process model comprises a neural network, said neural network comprising one or more nonlinear sigmoid-type neurons.

26. The temperature control system of claim 25, wherein said thermal process model substantially decouples the influence of system input variables from system input disturbances in a system where input recipe temperatures correspond to actual wafer temperatures that cannot be measured directly.

27. The temperature control system of claim 20, wherein said prediction calculator comprises a neural network.

28. A method of controlling a thermal process comprising the steps of:
obtaining a recipe temperature;
providing said recipe temperature to a setpoint generator to produce a setpoint temperature;
estimating an actual temperature from said setpoint temperature to produce an estimated temperature;
adjusting said setpoint temperature to bring an estimate of said actual temperature closer to said recipe temperature;
providing said setpoint temperature to a model-based predictive controller that controls one or more heat sources;
measuring one or more output temperatures;
using said one or more measured process output temperatures and predicted future process temperatures to calculate an optimum process input control strategy by comparing one or more of said predicted future process output temperatures to a desired future temperature and using said comparison in an algorithm to compute said optimum process input control strategy; and
using said model-based predictive controller to control process input thermal energy using the calculated optimum process input control strategy.

29. The method of claim 28, wherein the step of predicting a future process output temperature comprises:

obtaining a thermal process model which relates process input thermal energy to process output temperature; and recursively predicting future process output temperatures using said thermal process model, said process output temperature predicted over a predetermined future time period.

30. The method of claim 29, wherein the step of predicting future process output temperatures further comprises periodically updating said predictions in accordance with a receding horizon calculation.

31. The method of claim 29, wherein the step of predicting a future process output temperature comprises postulating a stationary future control strategy.

32. The method of claim 28, wherein said estimated temperature is calculated from a time-history of setpoint temperatures.

33. The method of claim 28, wherein said estimated temperature is calculated from a time-history of setpoint temperatures using a finite impulse response filter.

34. The method of claim 33, wherein filter coefficients of said finite impulse response filter are obtained from data measured on an instrumented wafer.

35. The method of claim 28, wherein said setpoint temperature is a susceptor temperature and said actual temperature is a wafer temperature.

* * * * *